(12) United States Patent
Yamakawa et al.

(10) Patent No.: US 11,100,775 B2
(45) Date of Patent: Aug. 24, 2021

(54) DOORBELL SYSTEM, LOCATION NOTIFICATION SYSTEM, AND INTERCOM SYSTEM

(71) Applicant: AIPHONE CO., LTD., Nagoya (JP)

(72) Inventors: Seiya Yamakawa, Nagoya (JP); Kazuma Wakabayashi, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 0 days.

(21) Appl. No.: 16/975,022

(22) PCT Filed: Apr. 6, 2018

(86) PCT No.: PCT/JP2018/014756
§ 371 (c)(1),
(2) Date: Aug. 21, 2020

(87) PCT Pub. No.: WO2019/163149
PCT Pub. Date: Aug. 29, 2019

(65) Prior Publication Data
US 2021/0035424 A1    Feb. 4, 2021

(30) Foreign Application Priority Data

Feb. 22, 2018 (JP) .............................. JP2018-029976
Feb. 22, 2018 (JP) .............................. JP2018-029977
(Continued)

(51) Int. Cl.
*G08B 13/196* (2006.01)
*G06K 9/00* (2006.01)
*H04N 7/18* (2006.01)

(52) U.S. Cl.
CPC ... *G08B 13/19656* (2013.01); *G06K 9/00771* (2013.01); *H04N 7/181* (2013.01)

(58) Field of Classification Search
None
See application file for complete search history.

(56) References Cited

U.S. PATENT DOCUMENTS 8,144,183 B2    3/2012 Carter
8,872,915 B1    10/2014 Scalisi et al.
(Continued)

FOREIGN PATENT DOCUMENTS

JP    2000217099 A    8/2000
JP    2004054536 A    2/2004
(Continued)

OTHER PUBLICATIONS

Extended European Search Report for related EP App No. 18907137.6 dated Dec. 18, 2020, 7 pgs.
(Continued)

*Primary Examiner* — James M Anderson, II
(74) *Attorney, Agent, or Firm* — Procopio, Cory, Hargreaves & Savitch LLP

(57) ABSTRACT

A doorbell system (1) includes a plurality of doorbells (2-1 to **2-*n*) each of which is attached to each residence and includes an operation unit (22) and a camera (26), and a control unit (4) capable of performing communication with the plurality of doorbells (2-1 to 2-*n*). The control unit (4) is configured to acquire position information of each of the plurality of doorbells (2-1 to 2-*n*) and an image captured by the camera (26), to generate target information about a target, based on the position information and the image, and to transmit the target information to an external device (3-1 to 30*n***) associated with a specific user.

6 Claims, 33 Drawing Sheets

(30) Foreign Application Priority Data

Feb. 22, 2018 (JP) .............................. JP2018-029978
Feb. 22, 2018 (JP) .............................. JP2018-029979

(56) References Cited

U.S. PATENT DOCUMENTS

| | | |
|---|---|---|
| 9,094,584 B2 | 7/2015 | Scalisi et al. |
| 9,237,318 B2 | 1/2016 | Kasmir et al. |
| 9,432,638 B2 | 8/2016 | Carter |
| 9,485,478 B2 | 11/2016 | Carter |
| 9,516,284 B2 | 12/2016 | Carter |
| 2017/0251182 A1 | 8/2017 | Siminoff et al. |
| 2018/0040208 A1* | 2/2018 | Scalisi ................ H04L 12/2818 |
| 2018/0068506 A1* | 3/2018 | Lee ......................... G07C 9/27 |

FOREIGN PATENT DOCUMENTS

| | | | |
|---|---|---|---|
| JP | 2006303806 A | 11/2006 | |
| JP | 2009093400 A | 4/2009 | |
| JP | 2010114544 A | 5/2010 | |
| JP | 2010122772 A | 6/2010 | |
| JP | 2012054784 A | 3/2012 | |
| JP | 2013107749 A | 6/2013 | |
| JP | 2017092726 A | 5/2017 | |
| WO | WO-2012029895 A1 * | 3/2012 | .............. H04M 9/00 |

OTHER PUBLICATIONS

International Search Report and Written Opinion for related Int, App. No. WO2019163149; dated Jul. 10, 2018. English translation provided; 12 pages.

* cited by examiner

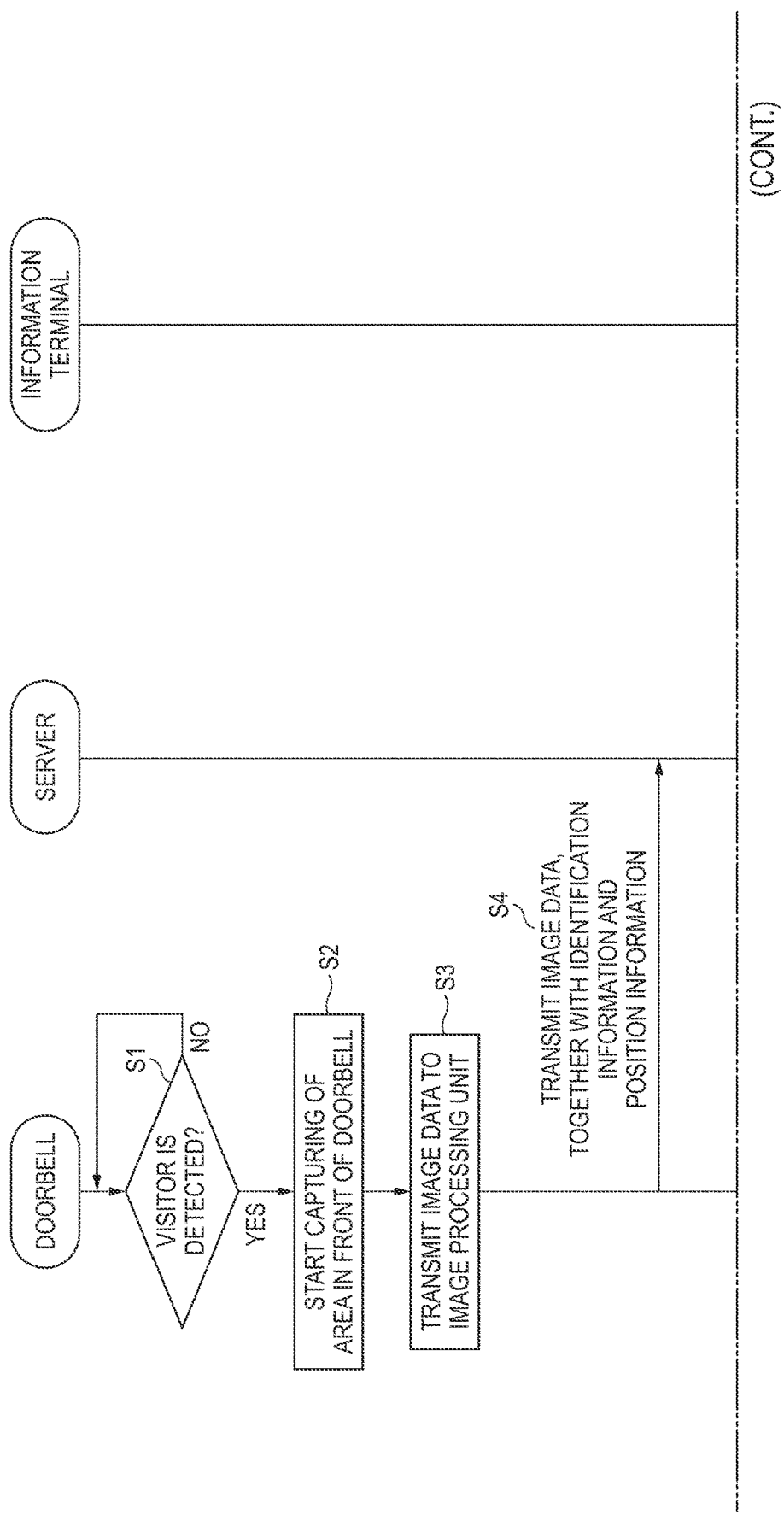

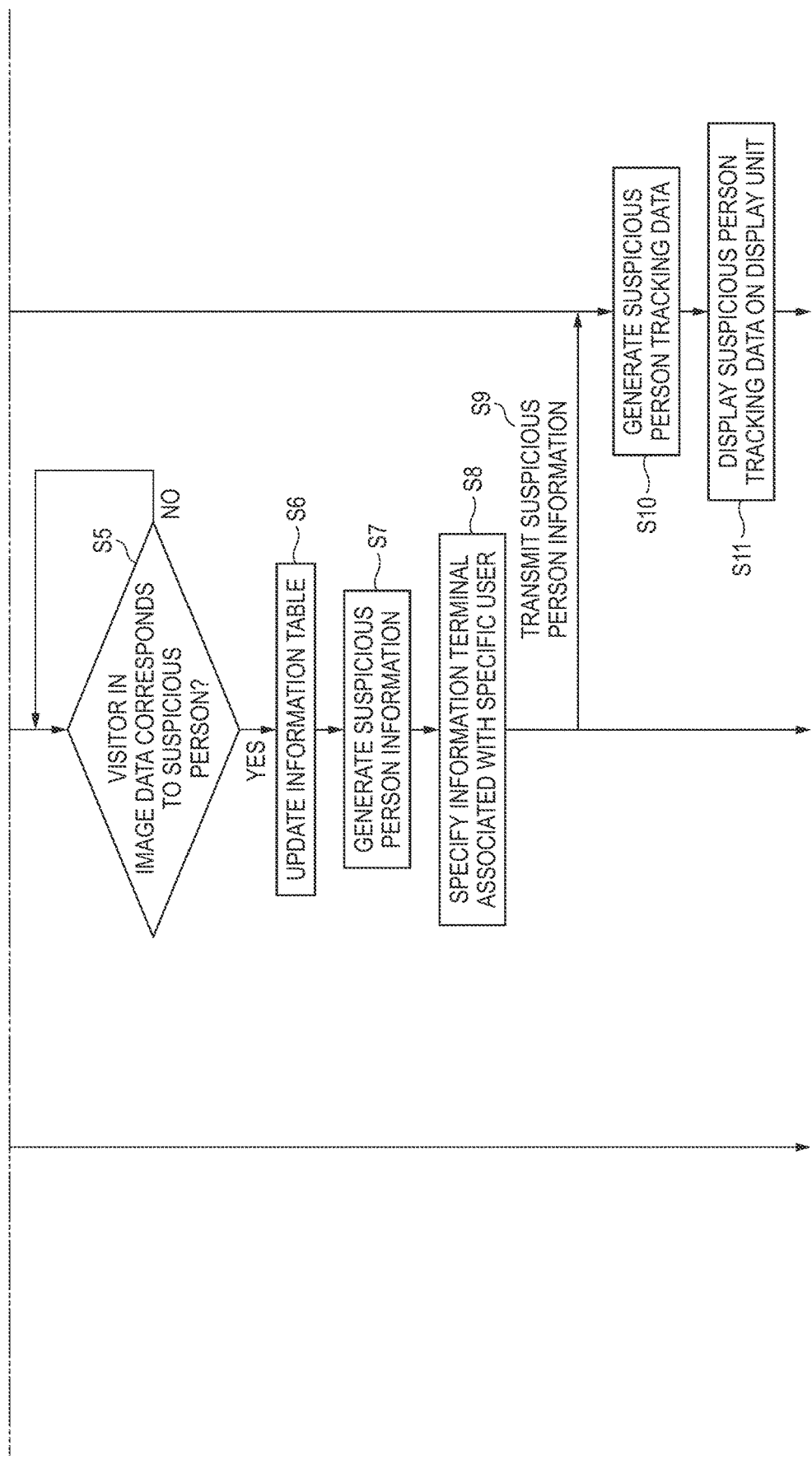
(FIG. 4 CONTINUED)

FIG. 5

| INFORMATION TABLE | | | | | |
|---|---|---|---|---|---|
| DOORBELL IDENTIFICATION INFORMATION | D2-1 | D2-2 | D2-3 | ... | D2-n |
| DOORBELL POSITION INFORMATION | MINATO-KU, TOKYO... | MINATO-KU, TOKYO... | MINATO-KU, TOKYO... | | MINATO-KU, TOKYO... |
| SUSPICIOUS PERSON CORRESPONDING TIME | 12:40 | 12:42 | 12:46 | | 12:55 |

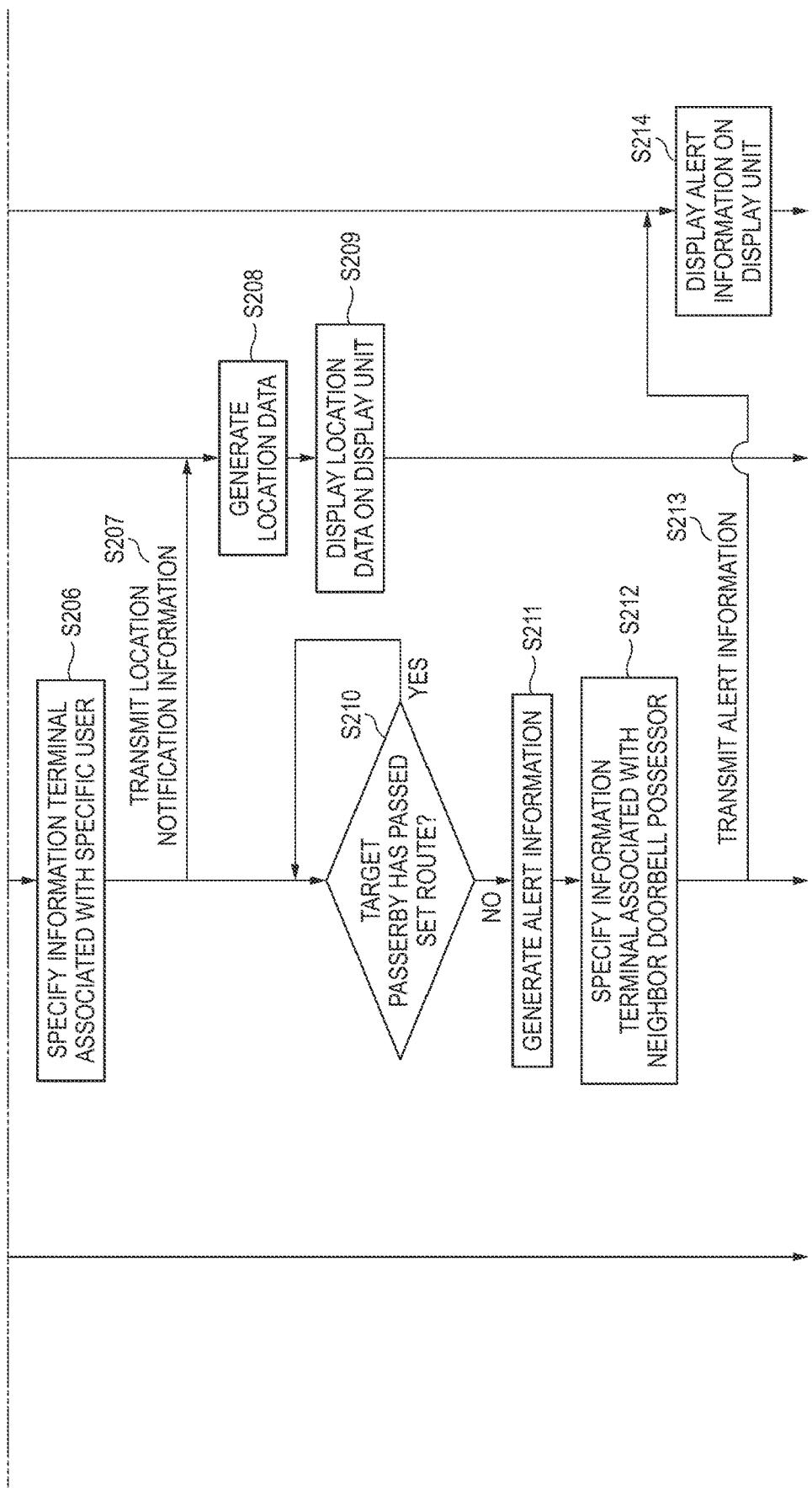

FIG. 11

| DOORBELL ID INFORMATION | D202-1 | D202-2 | D202-3 | ..... | D202-n |
|---|---|---|---|---|---|
| DOORBELL POSITION INFORMATION | MINATO-KU, TOKYO ... | MINATO-KU, TOKYO ... | MINATO-KU, TOKYO ... | ..... | MINATO-KU, TOKYO ... |
| TAG ID INFORMATION | T101 | T101 | T101 | ..... | T101 |
| TAG READING TIME | 12:40 | 12:42 | 12:46 | ..... | 12:55 |

| IMAGE DATA | IMAGE A | IMAGE B | IMAGE C | .... | IMAGE N |
|---|---|---|---|---|---|
| VISITOR CATEGORY | FAMILY | FAMILY | ACQUAINTANCE | .... | TRADER |

ENTRANCE SLAVE UNIT ID : 305-1    VISITOR FOLDER

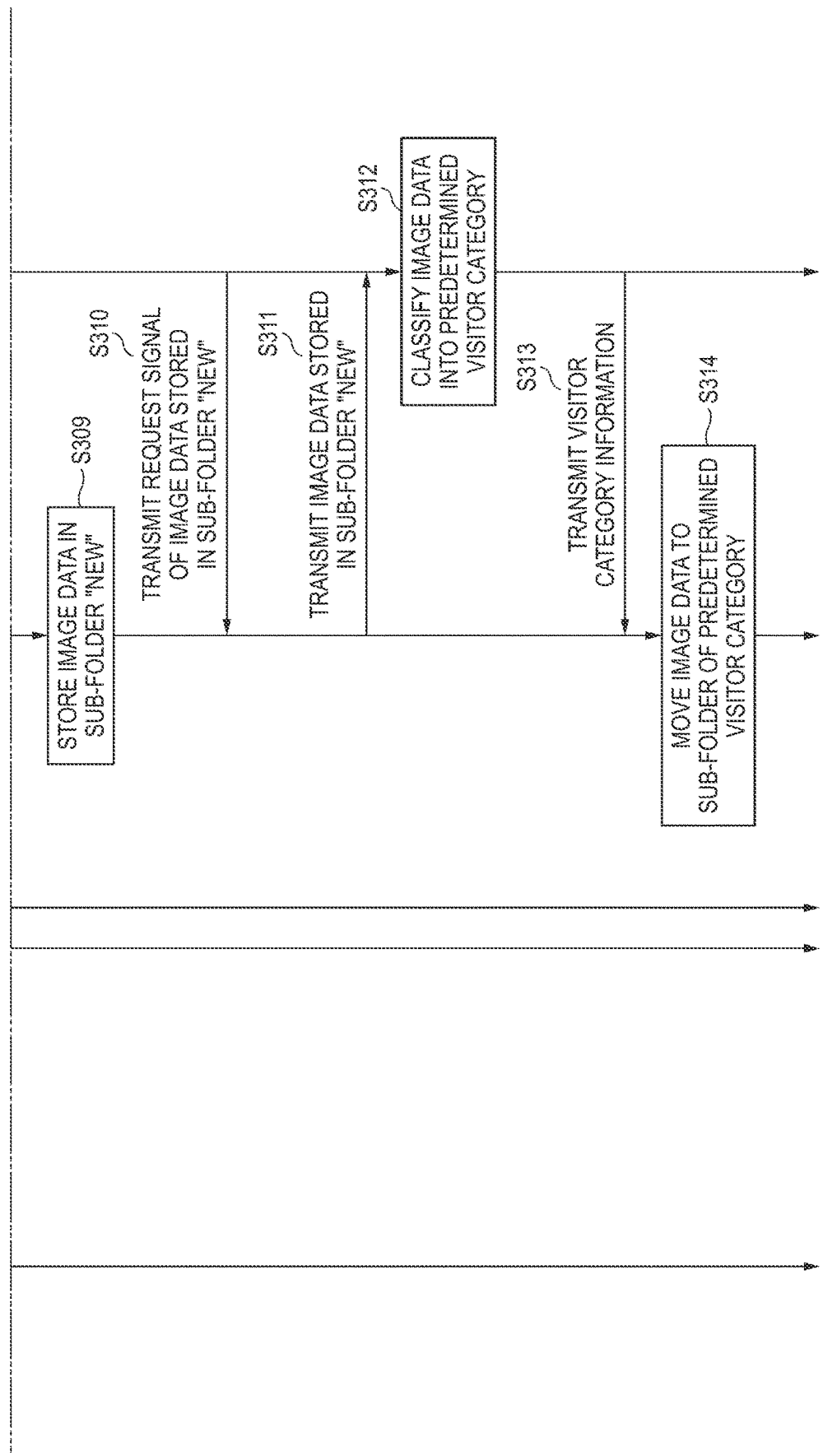

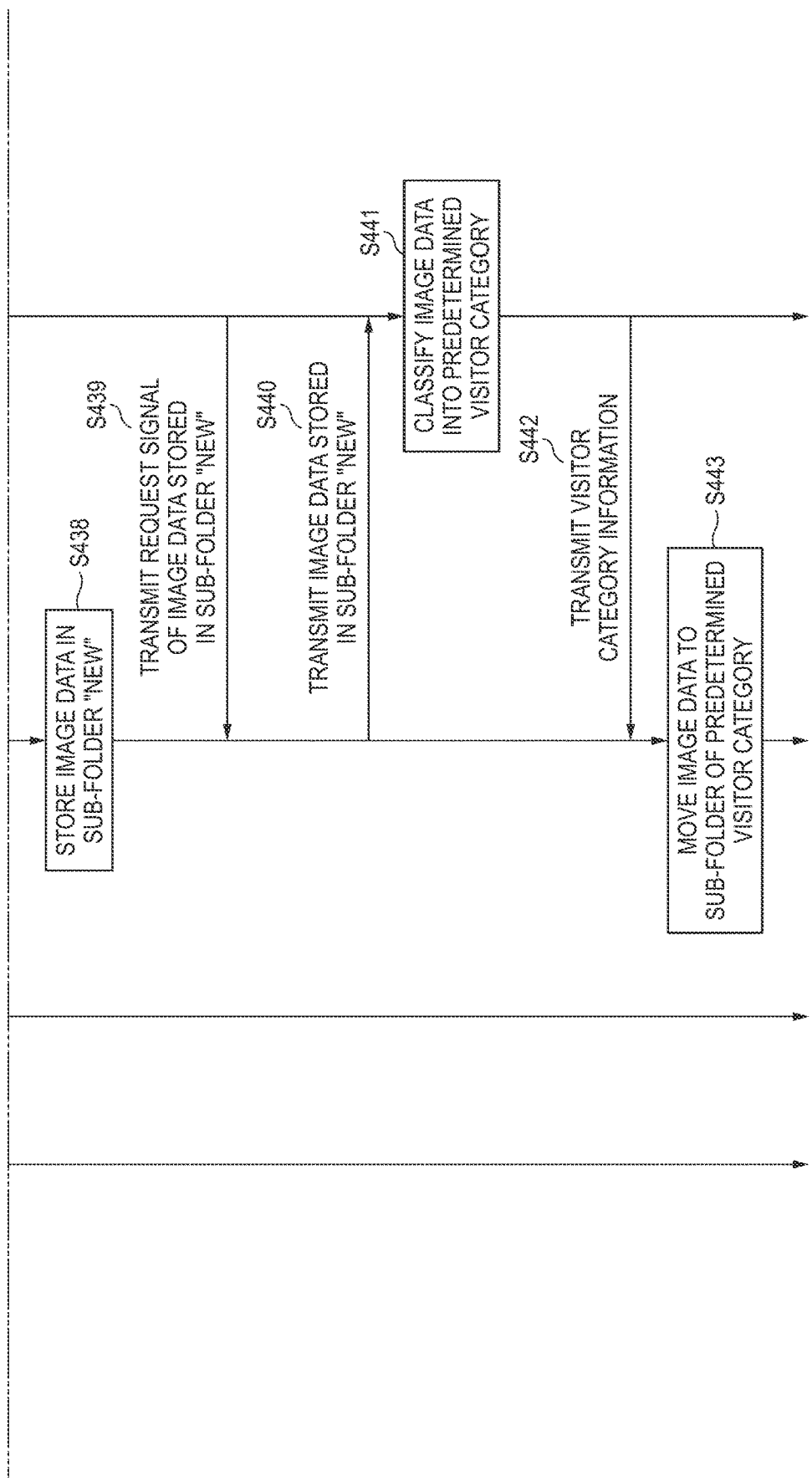

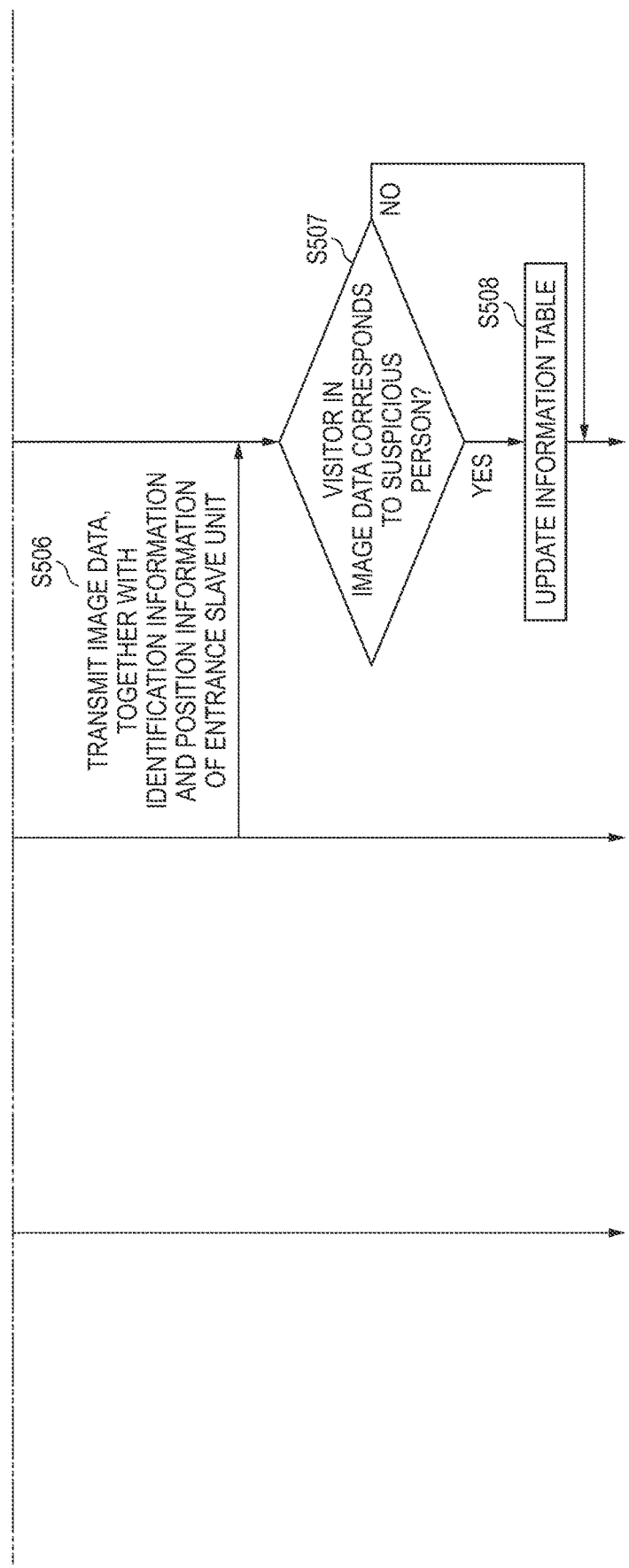

FIG. 27

| | | | | | |
|---|---|---|---|---|---|
| ENTRANCE SLAVE UNIT IDENTIFICATION INFORMATION | 305-1 | 305-2 | 305-3 | .... | 305-n |
| ENTRANCE SLAVE UNIT POSITION INFORMATION | MINATO-KU, TOKYO ... | MINATO-KU, TOKYO ... | MINATO-KU, TOKYO ... | | MINATO-KU, TOKYO ... |
| SUSPICIOUS PERSON CORRESPONDING TIME | 12:40 | 12:42 | 12:46 | | 12:55 |

INFORMATION TABLE

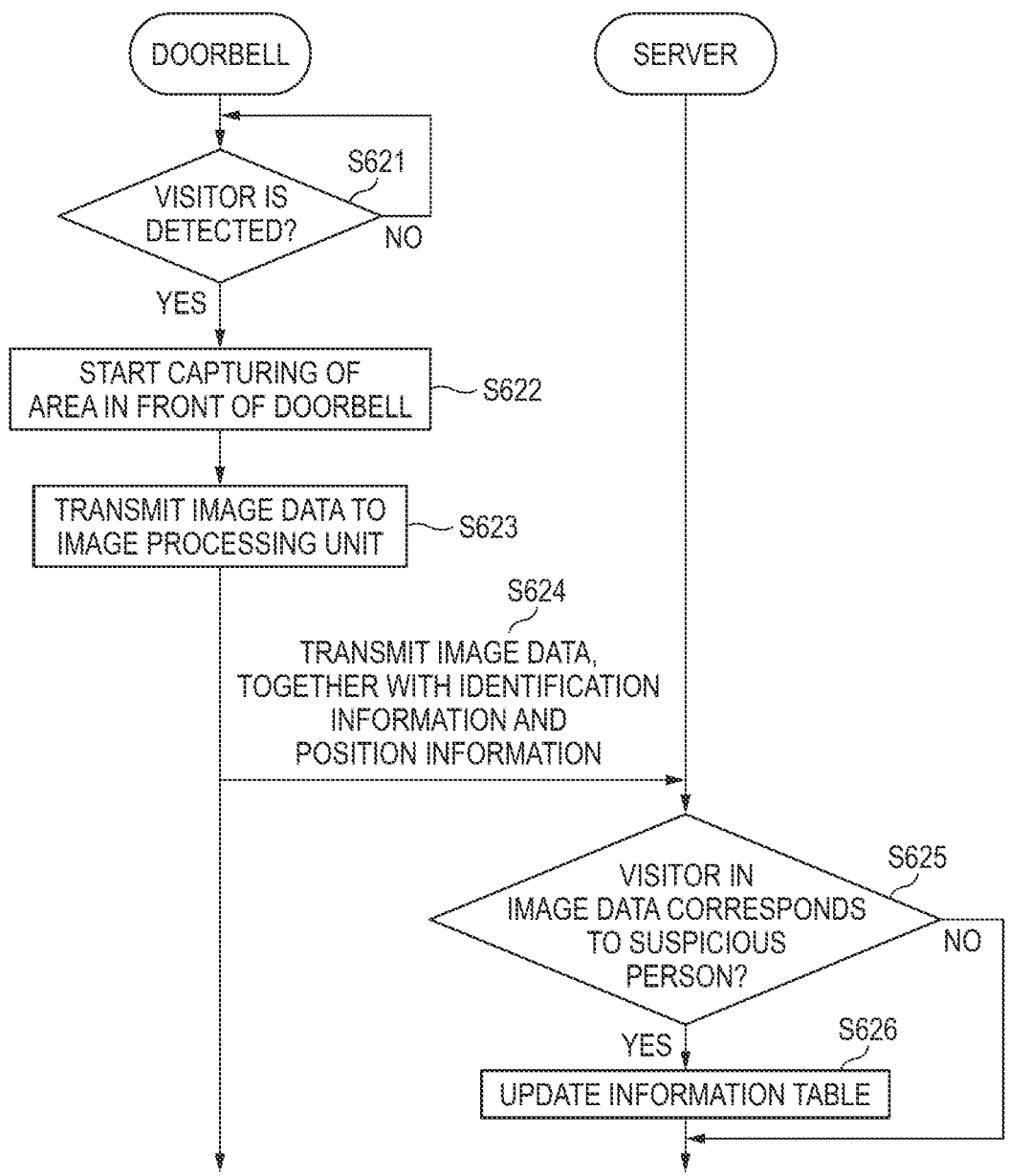

DOORBELL SYSTEM, LOCATION NOTIFICATION SYSTEM, AND INTERCOM SYSTEM

CROSS-REFERENCE TO RELATED APPLICATIONS

This application is a U.S. National Stage entry of PCT Application No. PCT/JP2018/014756, filed on Apr. 6, 2018, which claims priority to JP Application No. 2018-029976, filed on Feb. 22, 2018 which claims priority to JP Application No. 2018-029977, filed on Feb. 22, 2018 which claims priority to JP Application No. 2018-029978, filed on Feb. 22, 2018 which claims priority to JP Application No. 2018-029979, filed on Feb. 22, 2018. The contents of the foregoing are incorporated by reference.

TECHNICAL FIELD

The present disclosure relates to a doorbell system and an intercom system.

Also, the present invention relates to a location notification system.

BACKGROUND ART

Known is a Wi-Fi doorbell including a speaker, a microphone, a camera, and an operation unit and capable of performing wireless communication with a remotely disposed computing device (refer to PTL 1 and the like).

Also, known is an intercom system including an entrance slave unit having a speaker, a microphone, a camera, and an operation unit, and a living room master unit configured to perform communication with the entrance slave unit and capable of performing wireless communication with a remotely disposed computing device (refer to PTL 8 and the like).

CITATION LIST

Patent Literature

[PTL 1] U.S. Pat. No. 9,094,584
[PTL 2] U.S. Pat. No. 8,872,915
[PTL 3] U.S. Pat. No. 9,237,318
[PTL 4] U.S. Pat. No. 8,144,183
[PTL 5] U.S. Pat. No. 9,432,638
[PTL 6] U.S. Pat. No. 9,485,478
[PTL 7] U.S. Pat. No. 9,516,284
[PTL 8] JP-A-2017-92726

SUMMARY OF INVENTION

Technical Problem

In recent years, it is said that nuclear families increase and local crime prevention is weakened. In the meantime, crimes by suspicious persons are not disappearing at present, and it is needed to improve local crime prevention.

Also, it is needed a service by which protectors can protect children, elderly persons and the like.

It is therefore an object of the present invention to provide a doorbell system and an intercom system having a configuration capable of contributing to improvement on local crime prevention.

Also, an object of the present invention is to provide a location notification system capable of acquiring position information of a target by a simple configuration.

Solution to Problem

In order to achieve the object, a doorbell system of the present invention includes:
a plurality of doorbells each of which is attached to each residence and includes an operation unit and a camera, and
a control unit capable of performing communication with the plurality of doorbells,
wherein the control unit is configured to acquire position information of each of the plurality of doorbells and an image captured by the camera, to generate target information about a target, based on the position information and the image, and to transmit the target information to an external device associated with a specific user.

According to the above configuration, it is possible to provide the doorbell system having a configuration capable of contributing to improvement on local crime prevention by generating and notifying suspicious person information about a suspicious person as the target information to the specific user.

Also, in the above doorbell system,
the target information may include at least one of a current position of the target, a moving route of the target and a time at which the target has passed the moving route.

According to the above configuration, the user can recognize the information about a current position and a moving route of the target, so that it is possible to contribute to improvement on local crime prevention.

Also, in the above doorbell system.
the external device may display data in which the target information and map information are combined.

According to the above configuration, for example, the moving route and time of the target are superimposed on a map displayed on a display unit of the external device, so that the user can easily perceive the target information.

Also, in the above doorbell system,
the target may include at least one of a visitor, a suspicious person, and a delivery associated with a user.

According to the above configuration, for example, it is possible to easily track a suspicious person and a stolen delivery.

Also, in the above doorbell system,
the specific user may be a user associated with a doorbell within a predetermined radius from a current position of the target.

According to the above configuration, since the target information can be notified only to a user who needs to know existence of the target, it is possible to effectively provide information.

Also, in order to achieve the above object, the location notification system of the present invention includes:
a reading device that can read an identification signal from a transmitter associated with a target when the target approaches a predetermined distance; and
a control unit capable of performing communication with the reading device.
wherein the control unit is configured to acquire position information of the reading device and the identification signal read by the reading device, to generate target information about a target, based on the position information and the identification signal, and to transmit the target information to a first external device associated with a specific user associated with the target.

According to the above configuration, it is possible to generate position information about current positions and moving routes of children and elderly persons, for example, as the target information, and to notify the same to protectors by the simple configuration.

Also, in the location notification system, the reading device may be mounted to at least one of a doorbell attached to a residence, bending machines and security poles installed in various places in a region, and portable information terminals carried by persons.

According to the above configuration, it is possible to easily generate the target information by mounting the reading device to the device (a doorbell, a bending machine, a security pole, a smartphone and the like) having a function of acquiring its own position information.

Also, in the location notification system, the transmitter may include a portable tag having the identification signal or an information terminal in which the portable tag is incorporated.

According to the above configuration, it is possible to easily generate the target information by allowing the target to carry the portable tag.

Also, in the location notification system, the portable tag may include at least one of a Bluetooth tag, an RFID tag, a Wi-Fi tag, a ZigBee tag, and a cellular tag.

It is preferably to use the above described tag, as the portable tag that is carried by the target.

Also, in the location notification system, the target information may include at least one of a current position of the target, a moving route of the target and a time at which the target has passed the moving route.

According to the above configuration, since the specific user can recognize the information about a current position and a moving route of the target, it is possible to assist watching on the target.

Also, in the location notification system, the first external device can display data in which the target information and map information are combined.

According to the above configuration, for example, the moving route and time of the target are superimposed on a map displayed on an information device, so that the user can easily perceive the information about the target.

Also, in the location notification system.

the target may include at least one of a person, an animal and a delivery associated with the user.

According to the above configuration, for example, it is possible to easily perform watching on children, elderly persons, pets and the like and tracking on a stolen delivery.

Also, in the location notification system, the reading device is mounted to each of a plurality of doorbells each of which is attached to each residence, and the control unit may transmit the target information to a second external device associated with a possessor of a doorbell located in a predetermined range from the target among the plurality of doorbells when the target information satisfies a predetermined condition.

Also, in the location notification system, the predetermined condition may include a case where the target does not pass a preset route.

According to the above configuration, for example, when the target does not move according to a specified route, the possessor of the doorbell is alerted, so that it is possible to contribute to improvement on crime prevention.

Also, in order to achieve the above object, an intercom system of the present invention includes:

a plurality of entrance slave units each of which is attached to each residence and includes an operation unit and a camera, a plurality of living room master units each of which is associated with the corresponding entrance slave unit and is configured to perform communication with the associated entrance slave unit, a plurality of external devices each of which is associated with the corresponding entrance slave unit, and a control unit having a storage unit and capable of performing communication with the plurality of living room master units and the plurality of external devices, wherein the control unit is configured:

to receive, from each of the plurality of entrance slave units, identification information of the entrance slave unit and image data captured by the camera via each of the plurality of associated living room master units, to receive, from each of the plurality of external devices or each of the plurality of living room master units, visitor category information of the image data captured by the camera of the associated entrance slave unit, and to store the image data and the corresponding visitor category information in the storage unit in association with the identification information of each of the entrance slave units.

According to the above configuration, it is possible to provide the intercom system having a configuration capable of collectively managing the information associated with the plurality of entrance slave units and contributing to improvement on local crime prevention by storing the image data captured by the camera of each entrance slave unit and the visitor category information in the storage unit of the control unit.

Also, in the intercom system, the control unit may be configured to transmit the image data of which the visitor category is a suspicious person to an external device or a living room master unit associated with an entrance slave unit different from an entrance slave unit that is a transmission source of the image data.

According to the above configuration, since it is possible to check the image data classified as a suspicious person by a user of a different entrance slave unit, it is possible to assist improvement on local crime prevention.

Also, in the intercom system, the external device or the living room master unit may be configured to transmit the visitor category information of the image data classified by a user input and captured by the camera of the entrance slave unit different from the associated entrance slave unit.

According to the above configuration, since it is possible to classify the image data, which is classified as a suspicious person by the user of the different entrance slave unit, into a predetermined visitor category, it is possible to classify the image data into an appropriate visitor category, in accordance with a situation of the user.

Also, in the intercom system, the control unit may be configured to authenticate the received image data, based on the image data stored in the storage unit, and when the authentication is not satisfied, the control unit may receive visitor category information corresponding to the image data from the external device or living room master unit associated with an entrance slave unit that is a transmission source of the image data.

According to the above configuration, the image data captured by the camera is subjected to the authentication, and when the authentication is not satisfied, the visitor category information is received from the external device or the living room master unit. Therefore, since the user of the entrance slave unit only needs to classify the visitor category for a first visitor, for example, it is possible to efficiently perform the classifying operation.

Also, in the intercom system,
the control unit may be configured to authenticate the received image data, based on the image data stored in the storage unit, and
when the authentication is satisfied, the control unit may transmit visitor category information of the image data stored in the storage unit to an entrance slave unit that is a transmission source of the image data, via the living room master unit, and
the entrance slave unit that is a transmission source of the image data may perform a predetermined operation, in accordance with the received visitor category information of the image data.

According to the above configuration, the image data captured by the camera is subjected to the authentication, and when the authentication is satisfied, the entrance slave unit that is a transmission source of the image data performs the predetermined operation, based on the visitor category information. Thereby, for example, the user of the entrance slave unit can respond to a visitor without performing a response operation via the external device or the living room master unit, so that convenience of the intercom system is improved.

Also, in order to achieve the above object, a doorbell system of the present invention includes:
a plurality of doorbells each of which is attached to each residence and includes an operation unit and a camera,
a plurality of external devices each of which is associated with each of the plurality of corresponding doorbells, and
a control unit having a storage unit and capable of performing communication with the plurality of doorbells and the plurality of external devices,
wherein the control unit is configured:
to receive, from each of the plurality of doorbells, identification information of the doorbell and image data captured by the camera,
to receive, from each of the plurality of external devices, visitor category information of the image data captured by the camera of the associated doorbell, and
to store the image data and the corresponding visitor category information in the storage unit in association with the identification information of each of the doorbells.

According to the above configuration, it is possible to provide the doorbell system having a configuration capable of collectively managing the information associated with the plurality of doorbells and contributing to improvement on local crime prevention by storing the image data captured by the camera of each doorbell and the visitor category information in the storage unit of the control unit.

Also, in the above doorbell system.
the control unit may be configured to transmit the image data of which the visitor category is a suspicious person to an external device associated with a doorbell different from a doorbell that is a transmission source of the image data.

According to the above configuration, since it is possible to check the image data classified as a suspicious person by a user of a different doorbell, it is possible to assist improvement on local crime prevention.

Also, in the above doorbell system,
the external device may be configured to transmit the visitor category information of the image data classified by a user input and captured by the camera of the doorbell different from the associated doorbell.

According to the above configuration, since it is possible to classify the image data, which is classified as a suspicious person by the user of the different doorbell, into a desired visitor category, it is possible to classify the image data into an appropriate visitor category, in accordance with a situation of the user.

Also, in the above doorbell system,
the control unit may be configured to authenticate the received image data, based on the image data stored in the storage unit, and
when the authentication is not satisfied, the control unit may receive visitor category information corresponding to the image data from the external device associated with a doorbell that is a transmission source of the image data.

According to the above configuration, the image data captured by the camera is subjected to the authentication, and when the authentication is not satisfied, the visitor category information is received from the external device. Therefore, since the user of the doorbell only needs to classify the visitor category for a first visitor, for example, it is possible to efficiently perform the classifying operation.

Also, in the above doorbell system,
the control unit may be configured to authenticate the received image data, based on the image data stored in the storage unit, and
when the authentication is satisfied, the control unit may transmit visitor category information of the image data stored in the storage unit to a doorbell that is a transmission source of the image data, and
the doorbell that is a transmission source of the image data may perform a predetermined operation, in accordance with the received visitor category information of the image data.

According to the above configuration, the image data captured by the camera is subjected to the authentication, and when the authentication is satisfied, the doorbell that is a transmission source of the image data performs the predetermined operation, based on the visitor category information. Thereby, for example, the user of the doorbell can respond to a visitor without performing a response operation via the external device, so that convenience of the doorbell system is improved.

Also, in order to achieve the above object, an intercom system of the present invention includes:
a plurality of entrance slave units each of which is attached to each residence and includes an operation unit and a camera,
a plurality of living room master units each of which is configured to perform communication with the corresponding entrance slave unit,
a control unit capable of performing communication with the plurality of living room master units, and
an external device having a display unit, and configured to perform communication with the control unit and to transmit a request signal including user input information to the control unit,
wherein the control unit is configured to acquire identification information of each of the plurality of entrance slave units and image data captured by the camera via each of the plurality of living room master units, to generate suspicious person information about a suspicious person, based on the identification information and the image data, and to transmit, to the external device, the suspicious person information associated with the external device among the generated suspicious person information, based on the user input information included in the request signal from the external device, and wherein the external device is configured to display, on the display unit, information of a guide route set based on the user input information, the suspicious person information, and map information.

According to the above configuration, it is possible to provide the intercom system having a configuration capable of contributing to improvement on local crime prevention by generating the suspicious person information based on the identification information and image data from the plurality of entrance slave units each of which is attached to each residence, and notifying the user of the suspicious person information associated with the external device. Also, the suspicious person information is displayed together with the map and guide route displayed on the display unit of the external device, so that the user can easily perceive the suspicious person information near the guide route.

Also, in the intercom system,
the suspicious person information associated with the external device may be the suspicious person information generated based on the identification information and the image data acquired from an entrance slave unit existing in a predetermined region including the guide route.

According to the above configuration, since the user can perceive the suspicious person information in the predetermined region including the guide route, it is possible to effectively provide the information.

Also, in the intercom system,
the suspicious person information associated with the external device may include a position and a time up to a predetermined past time from a current time of the suspicious person.

According to the above configuration, since it is possible to perceive a position and a time up to a predetermined past time from a current time of the suspicious person, it is possible to effectively provide the information.

Also, in the intercom system,
the guide route may be set based on input information from the user and the suspicious person information.

According to the above configuration, for example, when there is a plurality of the suspicious person information near the shortest route, since it is possible to set another route with less suspicious person information as the guide route, it is possible to assist improvement on local crime prevention.

Also, in the intercom system,
when the control unit newly generates suspicious person information associated with the external device until a stop signal is received from the external device, the control unit may transmit the newly generated suspicious person information to the external device.

According to the above configuration, since the user can perceive the suspicious person information in real time, local crime prevention is improved.

Also, in the intercom system,
when the external device or the control unit determines that a suspicious person is approaching the guide route or the external device, based on the suspicious person information, the external device may output an alarm.

According to the above configuration, when it is determined that a suspicious person is approaching the guide route or the external device (a position of the user), the external device outputs an alarm. Therefore, local crime prevention is improved.

Also, in order to achieve the above object, a doorbell system of the present invention includes:
a plurality of doorbells each of which is attached to each residence and includes an operation unit and a camera,
a control unit capable of performing communication with the plurality of doorbells, and
an external device having a display unit, and configured to perform communication with the control unit and to transmit a request signal including user input information to the control unit,
wherein the control unit is configured to acquire identification information of each of the plurality of doorbells and image data captured by the camera, to generate suspicious person information about a suspicious person, based on the identification information and the image data, and to transmit, to the external device, the suspicious person information associated with the external device among the generated suspicious person information, based on the user input information included in the request signal from the external device, and
wherein the external device is configured to display, on the display unit, information of a guide route set based on the user input information, the suspicious person information, and map information.

According to the above configuration, it is possible to provide the doorbell system having a configuration capable of contributing to improvement on local crime prevention by generating the suspicious person information based on the identification information and image data from the plurality of doorbells each of which is attached to each residence, and notifying the user of the suspicious person information associated with the external device. Also, the suspicious person information is displayed together with the map and guide route displayed on the display unit of the external device, so that the user can easily perceive the suspicious person information near the guide route.

Also, in the above doorbell system,
the suspicious person information associated with the external device may be the suspicious person information generated based on the identification information and the image data acquired from a doorbell existing in a predetermined region including the guide route.

According to the above configuration, since the user can perceive the suspicious person information in the predetermined region including the guide route, it is possible to effectively provide the information.

Also, in the above doorbell system,
the suspicious person information associated with the external device may include a position and a time up to a predetermined past time from a current time of the suspicious person.

According to the above configuration, since it is possible to perceive a position and a time up to a predetermined past time from a current time of the suspicious person, it is possible to effectively provide the information.

Also, in the above doorbell system,
the guide route may be set based on input information from the user and the suspicious person information.

According to the above configuration, for example, when there is a plurality of the suspicious person information near the shortest route, since it is possible to set another route with less suspicious person information as the guide route, it is possible to assist improvement on local crime prevention.

Also, in the above doorbell system, when the control unit newly generates suspicious person information associated with the external device until a stop signal is received from the external device, the control unit may transmit the newly generated suspicious person information to the external device.

According to the above configuration, since the user can perceive the suspicious person information in real time, local crime prevention is improved.

Also, in the above doorbell system.

when the external device or the control unit determines that a suspicious person is approaching the guide route or the external device, based on the suspicious person information, the external device may output an alarm.

According to the above configuration, when it is determined that a suspicious person is approaching the guide route or the external device (a position of the user), the external device outputs an alarm. Therefore, local crime prevention is improved.

Advantageous Effects of Invention

According to the present invention, it is possible to provide the doorbell system and the intercom system having a function capable of contributing to improvement on local crime prevention.

Also, according to the present invention, it is possible to provide the location notification system capable of acquiring the position information of a target with a simple configuration.

BRIEF DESCRIPTION OF DRAWINGS

FIG. 4 is a flowchart for illustrating operations of a suspicious person tracking function that is executed by the doorbell system shown in FIG. 1.

FIG. 5 depicts an example of an information table that is stored in a storage unit of a server.

FIG. 11 depicts an example of an information table that is stored in a storage unit of a server.

FIG. 27 depicts an example of an information table that is stored in a storage unit of a server provided for the intercom system shown in FIG. 13.

FIG. 29 is a flowchart for illustrating operations of a suspicious person information registering function that is executed by the doorbell system shown in FIG. 20.

DESCRIPTION OF EMBODIMENTS

First Embodiment

Hereinbelow, an example of a first embodiment is described with reference to the drawings.

Figure 1:
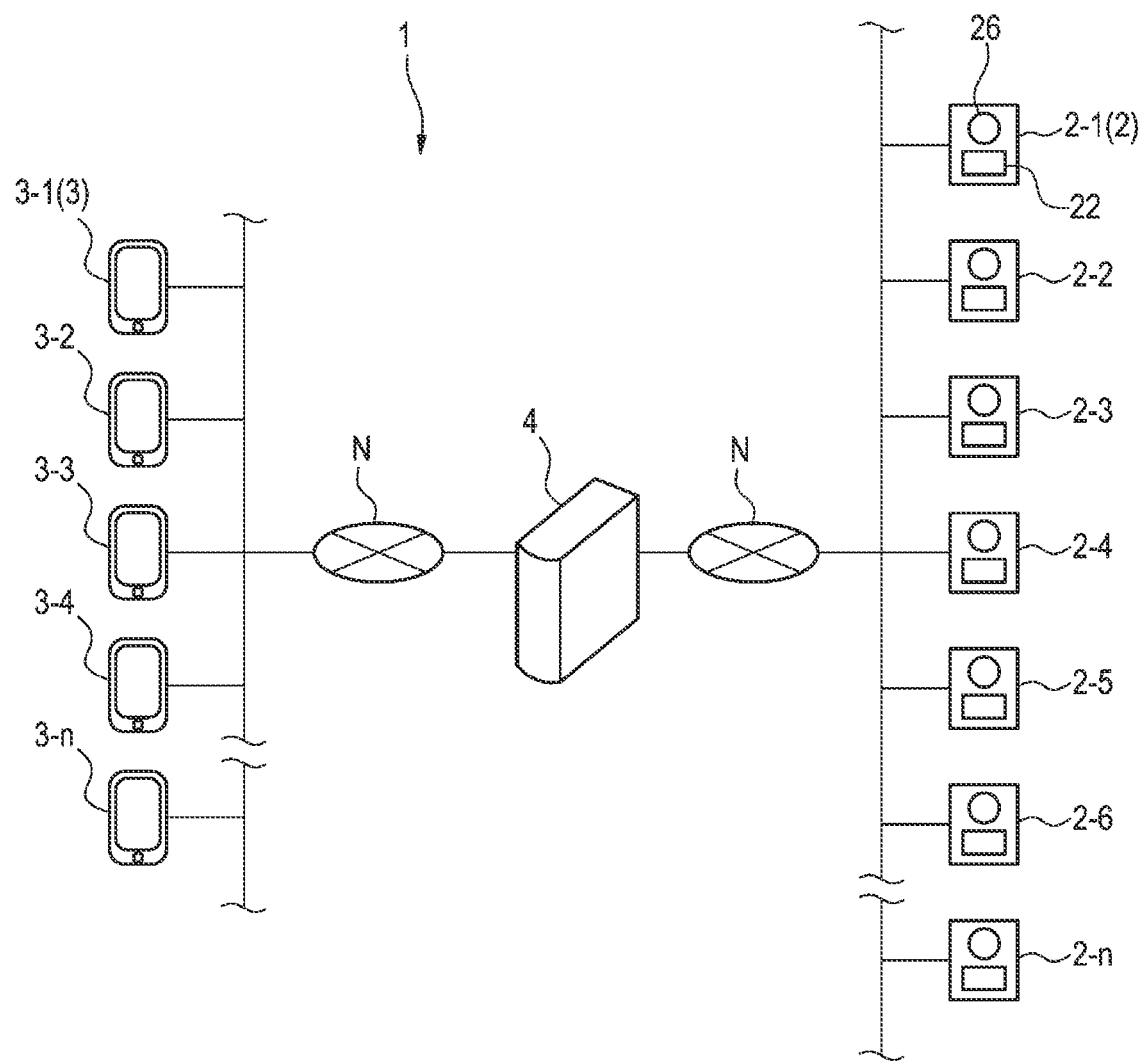
FIG. 1 depicts a configuration of a doorbell system in accordance with a first embodiment of the present invention.

FIG. 1 depicts a configuration of a doorbell system in accordance with a first embodiment.

As shown in FIG. 1, a doorbell system 1 includes a plurality of doorbells 2-1 to 2-n, a plurality of information terminals 3-1 to 3-n (an example of the external device), and a server 4. The plurality of doorbells 2-1 to 2-n and the plurality of information terminals 3-1 to 3-n can perform communication with the server 4 on an external network via a network N. As a communication device configured to relay each of the doorbells 2-1 to 2-*n* and each of the information terminals 3-1 to 3-*n* and the network N, for example, a Wi-Fi router may be used. Hereinbelow, the doorbell 2-1 (hereinbelow, referred to as the doorbell 2) of the plurality of doorbells 2-1 to 2-*n* is representatively described. Also, the information terminal 3-1 (hereinbelow, referred to as the information terminal 3) of the plurality of information terminals 3-1 to 3-*n* is representatively described.

Figure 2:
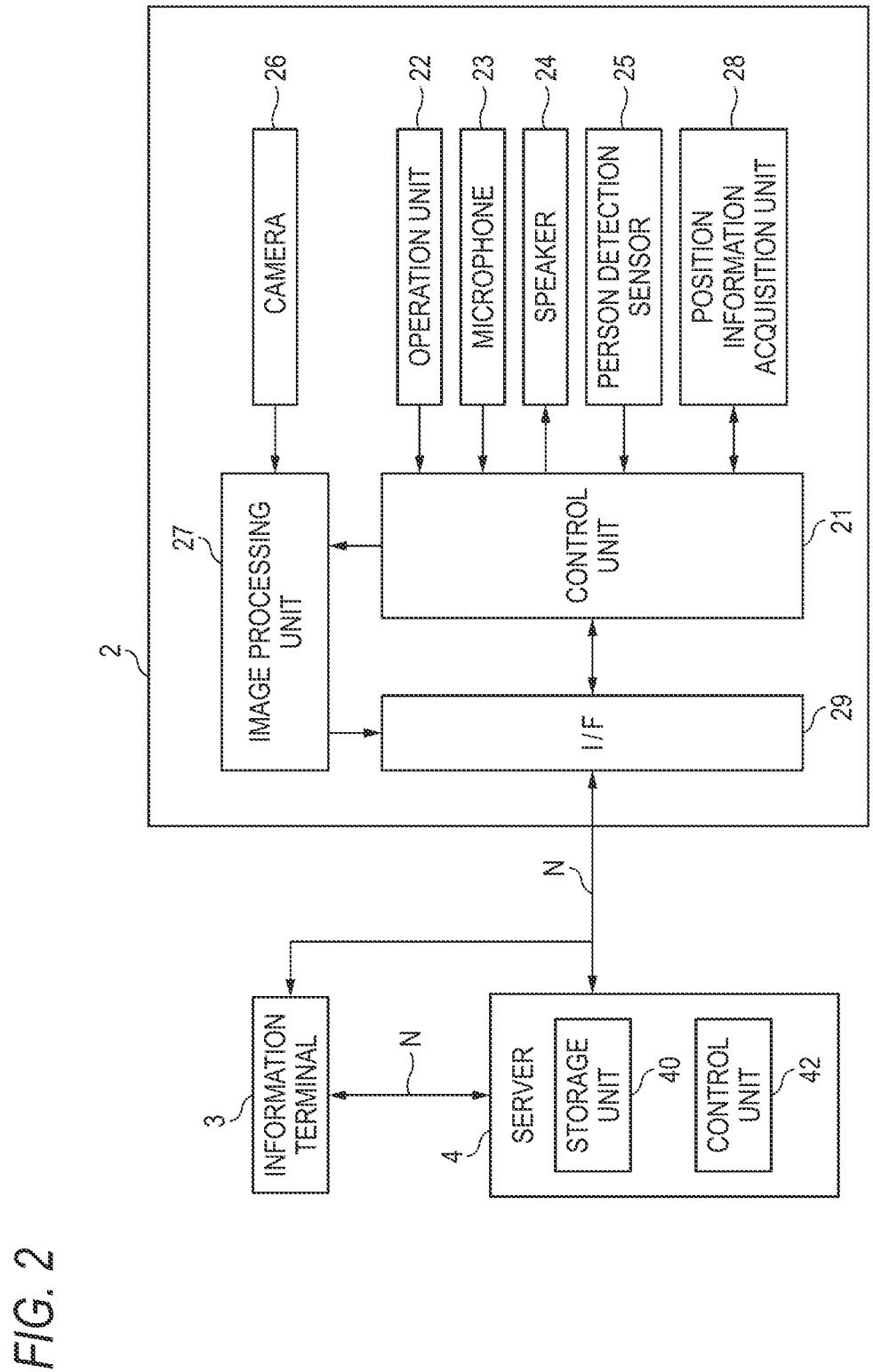
FIG. 2 is a functional block diagram depicting a configuration of a doorbell of the doorbell system shown in FIG. 1.

FIG. 2 is a functional block diagram depicting a configuration of the doorbell 2.

The doorbell 2 is used so as for a visitor to call a resident for phone call, and is installed in an entrance of each building (a detached house or the like), for example. In the present example, it is assumed that the plurality of doorbells 2-1 to 2-*n* is each installed in an entrance of each building within a predetermined range (predetermined region). The doorbell 2 is electrically connected to a power system of the building, to which the doorbell is attached, by a predetermined wire, so that power is supplied thereto from the power system. In the meantime, the doorbell 2 may include a battery for backup and/or primary power.

As shown in FIG. 2, the doorbell 2 includes a control unit 21, an operation unit (calling button) 22, a microphone 23, a speaker 24, a person detection sensor 25, a camera 26, an image processing unit 27, a position information acquisition unit 28, and an interface circuit (hereinbelow, the interface circuit is referred to as "I/F") 29.

The control unit 21 is a control unit for controlling operations of each unit of the doorbell 2, and may include at least one microcontroller including one or more processors and one or more memories, and other electronic circuit including an active element such as a transistor and a passive element. The processor is, for example, a CPU (Central Processing Unit), an MPU (Micro Processing Unit), a GPU (Graphics Processing Unit) and/or a TPU (Tensor Processing Unit). The CPU may include a plurality of CPU cores. The GPU may include a plurality of GPU cores. The memory includes a ROM (Read Only Memory) and a RAM (Random Access Memory). In the ROM, a doorbell control program may be stored. In the RAM, the doorbell control program may be temporarily stored. The processor may be configured to develop a program designated from the doorbell control program stored in a storage device or the ROM onto the RAM, and to execute a variety of processing in cooperation with the RAM.

Also, the control unit 21 may be configured by an integrated circuit (hardware resource) such as an ASIC (Application Specific Integrated Circuit), FPGA (Field-Programmable Gate Array) and the like. Also, the control unit 21 may be configured by a combination of at least one microcontroller and an integrated circuit.

The operation unit 22 is configured to receive a variety of input operations of a visitor. The diverse input operations include a calling to a resident, for example. The microphone 23 and the speaker 24 configure a phone call unit for transmitting voice data of a message and the like of a visitor toward a resident (in the present example, the information terminal 3 of a resident in a building in which the doorbell 102 is installed) and outputting voice data of a message and the like of the resident toward the visitor.

The person detection sensor 25 is a sensor for detecting a person in front of the doorbell 2, and is configured by an infrared sensor, for example. The person detection sensor 25 is connected to the camera 26 via the control unit 21. The person detection sensor 25 is configured to output a detection signal for notifying detection of a person to the camera 26. The camera 26 is a capturing device for capturing a person such as a visitor. The camera 26 may be configured by a video camera that is a web camera. For example, the camera 26 is activated by the detection signal that is output from the person detection sensor 25. An image captured by the camera 26 is output to the image processing unit 27. The image processing unit 27 is configured by a processor and a memory, for example, and is configured to transmit the image data acquired from the camera 26 to the server 4 via the I/F 29.

The position information acquisition unit 28 is configured to acquire position information of the doorbell 2. The position information is acquired using a GPS (Global Positioning System), for example. In the meantime, upon initial setting at the time the doorbell 2 is installed in a building, the position information of the doorbell 2 may be registered in advance in the position information acquisition unit 28 by a resident. The control unit 21 is configured to transmit the position information acquired by the position information acquisition unit 28 to the server 4. In the meantime, when the position information of the doorbell 2 is updated, the control unit 21 can transmit the updated position information to the server 4.

The I/F 29 can perform communication with the server 4 via the network N. Specifically, the I/F 29 can perform communication with the server 4 by a network communication means such as wireless local area network (LAN), radio, cellular, the Internet, Bluetooth (registered trademark), electromagnetic wave, infrared light, sonic wave, microwave and the like. Like this, the doorbell 2 can transmit predetermined data (for example, voice data and image data) to the server 4 and start communication by a two-way voice call or the like between a visitor and a user of the information terminal 3. In the meantime, the IF 29 of the doorbell 2 may also be configured to directly perform communication with the information terminal 3.

Figure 3:
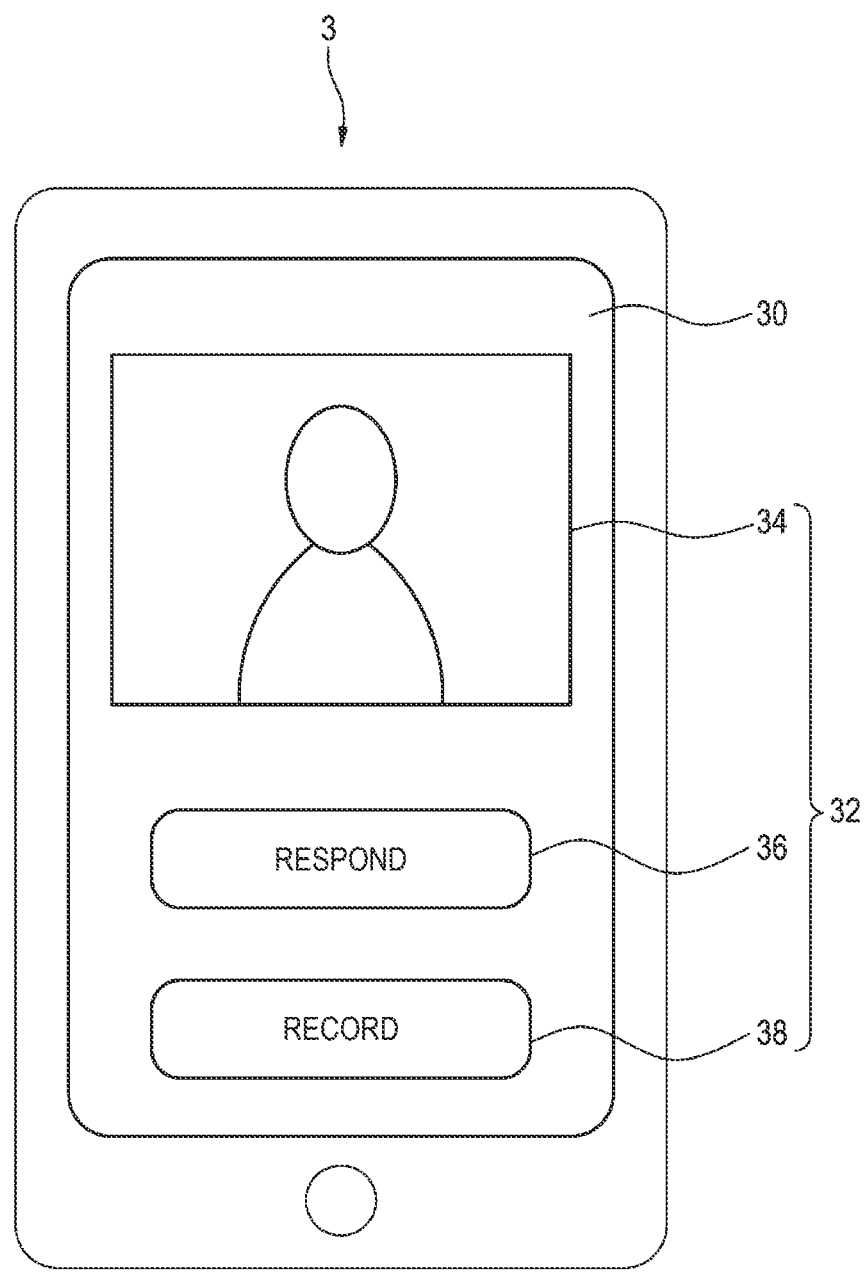
FIG. 3 depicts a configuration of an information terminal provided for the doorbell system shown in FIG. 1.

FIG. 3 depicts a configuration of the information terminal 3.

The information terminal 3 is a device that is used so that a resident (user) in a residence in which the doorbell 2 is installed responds to a calling from the doorbell 2, for example. The information terminal 3 includes, for example, a smartphone, a tablet computer and other portable information terminal carried by the resident. The doorbell 2 and the information terminal 3 can perform communication with each other via the server 4.

The information terminal 3 includes a display unit 30 capable of displaying a predetermined user interface 32, as shown in FIG. 3. The display unit 30 is a touch screen type display such as a liquid crystal monitor, an organic EL display and the like, and is configured to display an image (operation image and the like). The information terminal 3 is configured to execute predetermined computer software (for example, application software for voice call and image display), based on data transmitted from the doorbell 2. For example, the information terminal 3 can execute the predetermined application software, based on an input on the user interface 32 displayed on the display unit 30. The user interface 32 includes an image display unit 34 on which a display image of a still image or a moving picture is displayed based on image data of a front area captured by the camera 26 of the doorbell 2. Also, the user interface 32 includes a response permission receiving unit 36 for permitting a user to respond to a calling of a visitor. When the user touches the response permission receiving unit 36, a two-way voice communication starts so as to respond to a calling of the visitor. Also, the user interface 32 includes a recording receiving unit 38 for allowing the user to select recording of a display image displayed on the image display unit 34. When the user touches the recording receiving unit 38, a display image that is displayed on the image display unit 34 can be recorded.

As shown in FIG. 2, the server 4 includes a storage unit 40, and a control unit 42. The storage unit 40 is configured by a memory including a ROM and a RAM, for example. The control unit 42 includes at least one microcontroller including one or more processors and one or more memories, and other electronic circuit including an active element such as a transistor and a passive element. Also, the control unit 42 may be configured by an integrated circuit (hardware resource) or may be configured by a combination of at least one microcontroller and an integrated circuit.

The control unit 42 can store data (image data and voice data) transmitted from the doorbell 2 in the storage unit 40 and transmit the data to the information terminal 3. Also, the control unit 42 can store the data transmitted from the information terminal 3 in the storage unit 40, and transmit the data to the doorbell 2. Like this, the server 104 can start communication by a two-way voice call or the like between a visitor who visits a building in which the doorbell 2 is installed and a user of the information terminal 3 by transmitting and receiving predetermined data (for example, voice data and image data) between the doorbell 2 and the information terminal 3. In the meantime, as described above, the data can also be directly transmitted and received between the doorbell 2 and the information terminal 3 without via the server 4.

Also, in the storage unit 40 of the server 4, suspicious person determination data for determining whether a visitor is a suspicious person (an example of the target) is stored. As the suspicious person determination data, for example, an image of a suspicious person stored in advance in the storage unit 40 may be included. Also, the suspicious person determination data may include an action pattern for determining a suspicious person. As the action pattern for determining a suspicious person, a case where a visitor enters from a place other than a qualified entry is included. Also, in the storage unit 40, for example, an information table including identification information of the doorbell 2, position information of the doorbell 2, and a suspicious person determination time is stored (refer to FIG. 5).

The control unit 42 is configured to execute suspicious person determination processing by using the data received from the doorbell 2 and the suspicious person determination data stored in the storage unit 40. Also, the control unit 42 is configured to update the information table stored in the storage unit 40, based on the data received from the doorbell 2, and to generate suspicious person information, which will be described later.

Figure 6:
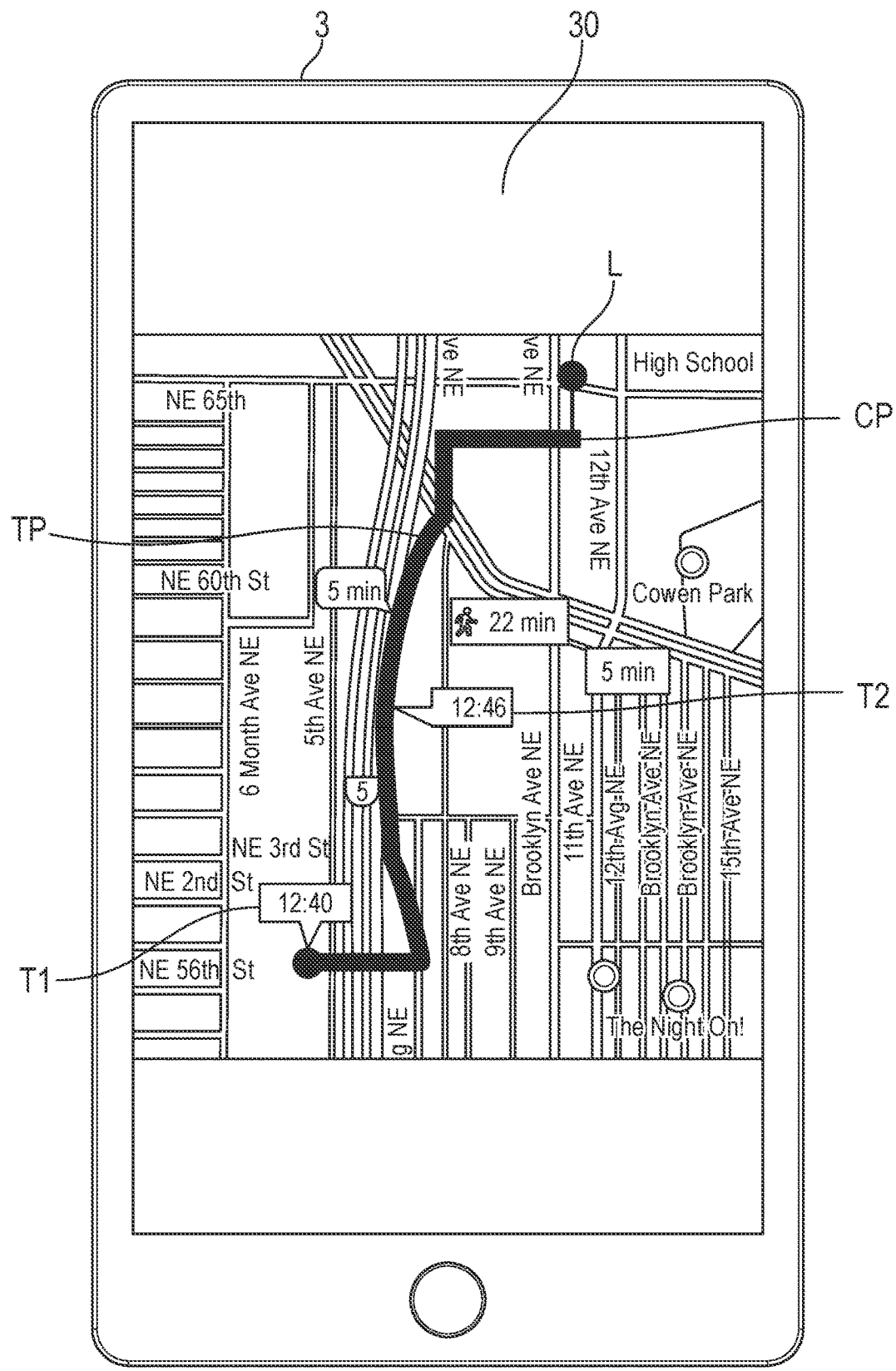
FIG. 6 depicts an example of a screen of the information terminal for displaying suspicious person tracking information.

Subsequently, operations of a suspicious person tracking function that is executed by the doorbell system 1 are described with reference to FIGS. 4 to 6.

First, the control unit 21 of the doorbell 2 determines whether a visitor is detected by the person detection sensor 25 (step S1). When it is determined in step S1 that a visitor is detected by the person detection sensor 25 (Yes in step S1), the control unit 21 starts capturing of an area (specifically, a visitor) in front of the doorbell 2 by the camera 26 (step S2). Then, the camera 26 transmits the captured image data to the image processing unit 27 (step S3). Then, the control unit 21 transmits the image data received by the image processing unit 27 to the server 4 via the I/F 29, together with the identification information of the doorbell 2 and the position information acquired by the position information acquisition unit 28 of the doorbell 2 (step S4).

The control unit 42 of the server 4 compares the image data received from the doorbell 2 with the suspicious person determination data stored in the storage unit 40, and determines whether the visitor included in the image data corresponds to a suspicious person (step S5). When it is determined in step S5 that the visitor included in the image data corresponds to a suspicious person (Yes in step S5), the control unit 42 updates the information table stored in the storage unit 40, based on the identification information of the doorbell 2, the position information and the image data (step S6). Specifically, doorbell identification information, doorbell position information and a suspicious person corresponding time are written in the information table shown in FIG. 5.

Then, the control unit 42 generates suspicious person information (an example of the target information) indicative of information about a corresponding suspicious person, based on the updated information table (step S7). In the suspicious person information, a current position of a suspicious person, a moving route of a suspicious person, a time at which a suspicious person has passed the moving route, and the like are included. In the meantime, the suspicious person information may include at least one of the information.

Then, the control unit 42 of the server 4 specifies, based on the position information of the doorbell 2 having transmitted the image data that has been determined to correspond to a suspicious person, an information terminal 3 associated with a specific user among the plurality of information terminals 3-1 to 3-*n* communicatively connected to the server by the network N (step S8). In step S8, the control unit 42 may specify the information terminal 3 carried by a user (for example, a resident in a building within a radius 500 m from the doorbell 2) associated with a building within a predetermined radius from a place at which the doorbell 2 is installed, for example. Then, the control unit 42 transmits the suspicious person information generated in step S7 to the information terminal 3 of the user specified in step S8 (step S9).

Then, the specific information terminal 3 having received the suspicious person information from the control unit 42 of the server 4 generates suspicious person tracking data by combining the suspicious person information and the map information with a predetermined application software (step S10). Then, the information terminal 3 displays the suspicious person tracking data on the display unit 30 (step S11). As shown in FIG. 6, the suspicious person tracking data is data in which a current position CP of a suspicious person L, a moving route TP of the suspicious person L and times T1 and T2 at which the suspicious person L has passed each point on the moving route TP are superimposed on map data.

As described above, the doorbell system 1 in accordance with the present embodiment includes the plurality of doorbells 2-1 to 2-*n* each of which is attached to each residence and includes the operation unit 22 and the camera 26, and the server 4 (control unit 42) capable of performing communication with the plurality of doorbells 2-1 to 2-*n*. The server 4 is configured to acquire the position information of each of the plurality of doorbells 2-1 to 2-*n* and the image captured by the camera 26, to generate the suspicious person information about a suspicious person, based on the position information and the image, and to transmit the suspicious person information to the information terminal 3 associated with the specific user. In this way, it is possible to provide the doorbell system 1 having a configuration capable of contributing to improvement on local crime prevention by generating and notifying the information about a suspicious person to the specific user, for example.

Also, the suspicious person information preferably includes at least one of the current position CP of the suspicious person L, the moving route TP of the suspicious person L and times T1 and T2 at which the suspicious person L has passed each point on the moving route TP. Thereby, the user of the information terminal 3 can recognize the information about the current position CP and moving route TP of the suspicious person L, so that it is possible to assist improvement on local crime prevention.

Also, the information terminal 3 can display the suspicious person tracking data in which the suspicious person information and the map information are combined. In this way, the moving route TP of the suspicious person L and passing times T1 and T2 at each point on the route are superimposed on the map displayed on the display unit 30 of the information terminal 3, so that the user can easily perceive the information about a suspicious person.

Also, the user specified in step S8 of FIG. 4 is preferably a user associated with the doorbell 2 that exists within the predetermined radius from the current position P of the suspicious person L. Thereby, since the suspicious person information can be notified only to the user who needs to know existence of the suspicious person L, it is possible to effectively provide information.

In the first embodiment, when a visitor is detected by the person detection sensor 25, it is determined whether the visitor corresponds to a suspicious person. However, the present invention is not limited thereto. For example, when the operation unit 22 of the doorbell 2 is pressed by a visitor, it may be determined whether the visitor corresponds to a suspicious person.

Also, in the first embodiment, when it is determined that the visitor corresponds to a suspicious person, the suspicious person information and the suspicious person tracking data are generated. However, the present invention is not limited thereto. For example, visitor information and visitor tracking data may be generated for a specific visitor (not a suspicious person), and the visitor tracking data may be displayed on the information terminal 3 of the specific user. This visitor tracking data may be used for watching of children, elderly persons and the like, for example.

Also, the target to be tracked is not limited to a visitor (a suspicious person), and may include a delivery and the like. In order to reduce man-hour and cost of re-delivery, a service is provided in which when a customer is absent, a delivery is placed at an entrance of a delivery destination such as a house (so-called "safe drop" service). However, in the "safe drop" service, a delivery may be stolen or missed. Therefore, when the present example is used to generate delivery tracking data for tracking a delivery, for example, it is possible to easily track the stolen or missed delivery.

In the doorbell system 1 of the first embodiment, the information terminal 3 associated with the resident is exemplified as the external device, and the doorbell 2 is exemplified as the Wi-Fi doorbell capable of performing wireless communication with the information terminal 3. However, the present invention is not limited thereto. For example, the external device may include a living room master unit provided in a living room of a house in which the doorbell 2 is installed. That is, the doorbell 2 may be configured as a doorbell capable of performing communication with the living room master unit via an intercom line, for example.

Second Embodiment

Hereinbelow, an example of a second embodiment is described with reference to the drawings. In the second embodiment, the detailed descriptions of the same/similar elements and same/similar processes as/to the first embodiment are omitted.

Figure 7:
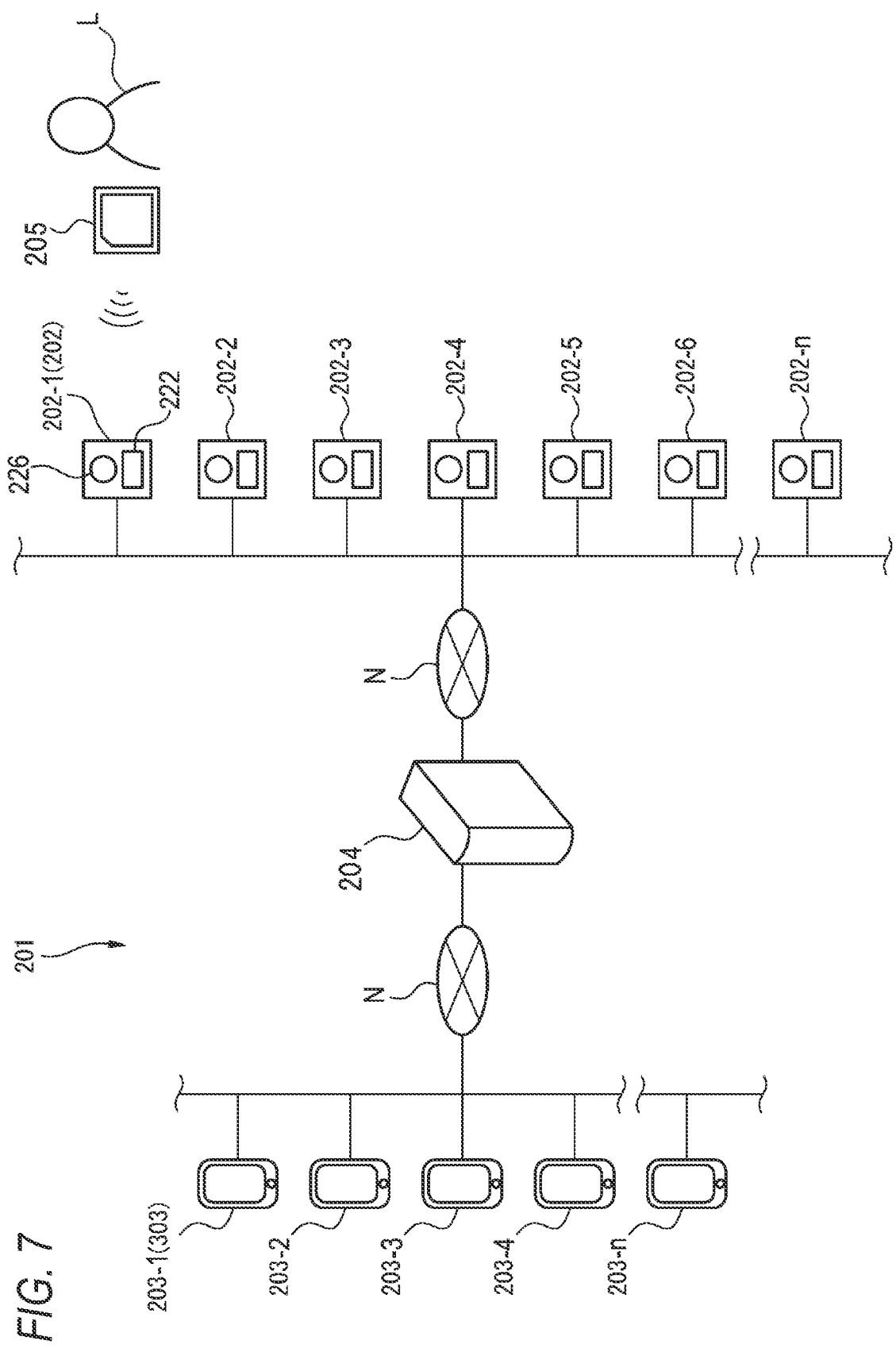
FIG. 7 depicts a configuration of a location notification system in accordance with a second embodiment of the present invention.

FIG. 7 depicts a configuration of a location notification system in accordance with the second embodiment.

As shown in FIG. 7, a location notification system 201 includes a plurality of doorbells 202-1 to 202-n, a plurality of information terminals 203-1 to 203-n, a server 204, and an IC tag 205 (an example of the transmitter and the portable tag). The plurality of doorbells 202-1 to 202-n, and the plurality of information terminals 203-1 to 203-n can perform communication with the server 204 on an external network via a network N. As a communication device configured to relay each of the doorbells 202-1 to 202-n and each of the information terminals 203-1 to 203-n and the network N, for example, a Wi-Fi router may be used. Hereinbelow, the doorbell 202-1 (hereinbelow, referred to as the doorbell 202) of the plurality of doorbells 202-1 to 202-n is representatively described. Also, the information terminal 203-1 (hereinbelow, referred to as the information terminal 203) of the plurality of information terminals 203-1 to 203-n is representatively described.

The IC tag 205 is an electronic tag that is carried by a specific passerby of passersby who pass near the doorbell 202. The specific passerby indicates a target to be watched (hereinbelow, referred to as a target passerby L), and is, for example, a child or an elderly person. The IC tag 205 is incorporated into an IC card, a cloth, a mobile phone or the like carried by the target passerby L, for example. The IC tag 205 is configured by any one of a Bluetooth (registered trademark) tag, an RFID tag, a Wi-Fi tag, a ZigBee tag, and a cellular tag. The IC tag 205 has inherent identification information (hereinbelow, referred to as tag ID information) embedded therein, and can transmit the tag ID information to a reader (in the present example, the doorbell 202) via near field communication (several centimeters to several meters) using an electromagnetic field, radio waves or the like.

Figure 8:
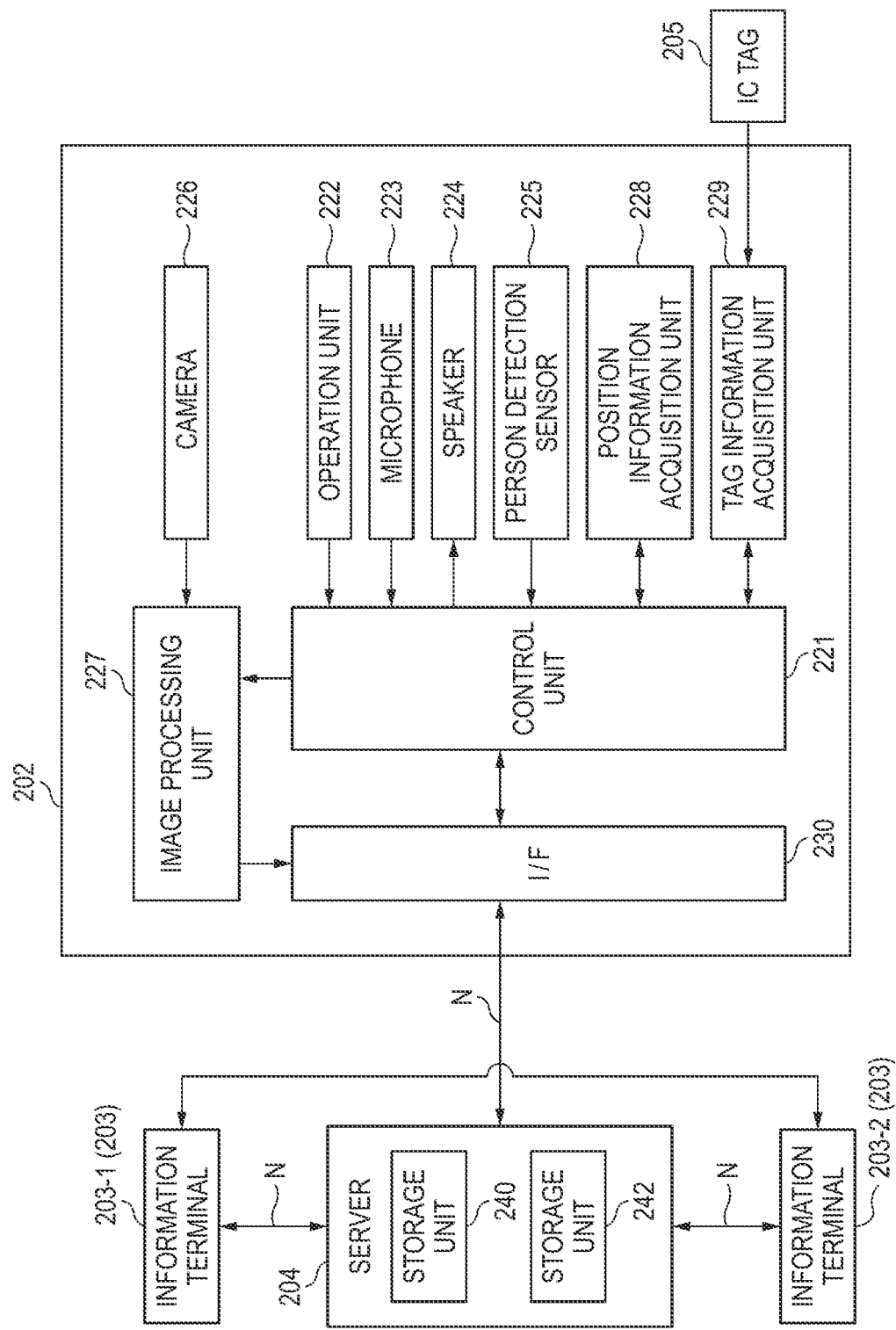
FIG. 8 is a functional block diagram depicting a configuration of a doorbell and a server provided for the location notification system shown in FIG. 7.

FIG. 8 is a functional block diagram depicting a configuration of the doorbell 202 and the server 204.

The doorbell 202 is used so as for a visitor to call a resident for phone call, and is installed in an entrance of each building (a detached house or the like), for example. In the present example, it is assumed that the plurality of doorbells 201-1 to 202-n is each installed in an entrance of each building within a predetermined range (predetermined region). The doorbell 202 is electrically connected to a power system of the building, to which the doorbell is attached, by a predetermined wire, so that power is supplied thereto from the power system. In the meantime, the doorbell 202 may include a battery for backup and/or primary power.

As shown in FIG. 8, the doorbell 202 includes a control unit 221, an operation unit 222, a microphone 223, a speaker 224, a person detection sensor 225, a camera 226, an image processing unit 227, a position information acquisition unit 228, a tag information reading unit 229, and an I/F 230. Since the configurations of the control unit 221, the operation unit 222, the microphone 223, the speaker 224, the person detection sensor 225, the camera 226, the image processing unit 227, the position information acquisition unit 228, and the I/F 230 are the same as the configurations of the control unit 21, the operation unit 22, the microphone 23, the speaker 24, the person detection sensor 25, the camera 26, the image processing unit 27, the position information acquisition unit 28, and the I/F 30 of the doorbell 2 of the first embodiment, the descriptions thereof are omitted.

The tag information reading unit 229 is configured to read the tag ID information of the IC tag 205 located within a predetermined range from the doorbell 202. The tag information reading unit 229 has an antenna for near field communication such as Bluetooth, RFID, Wi-Fi, ZigBee, cellular and the like, for example. The control unit 221 is configured to transmit the tag ID information read by the tag information reading unit 229 to the server 204.

Figure 9:
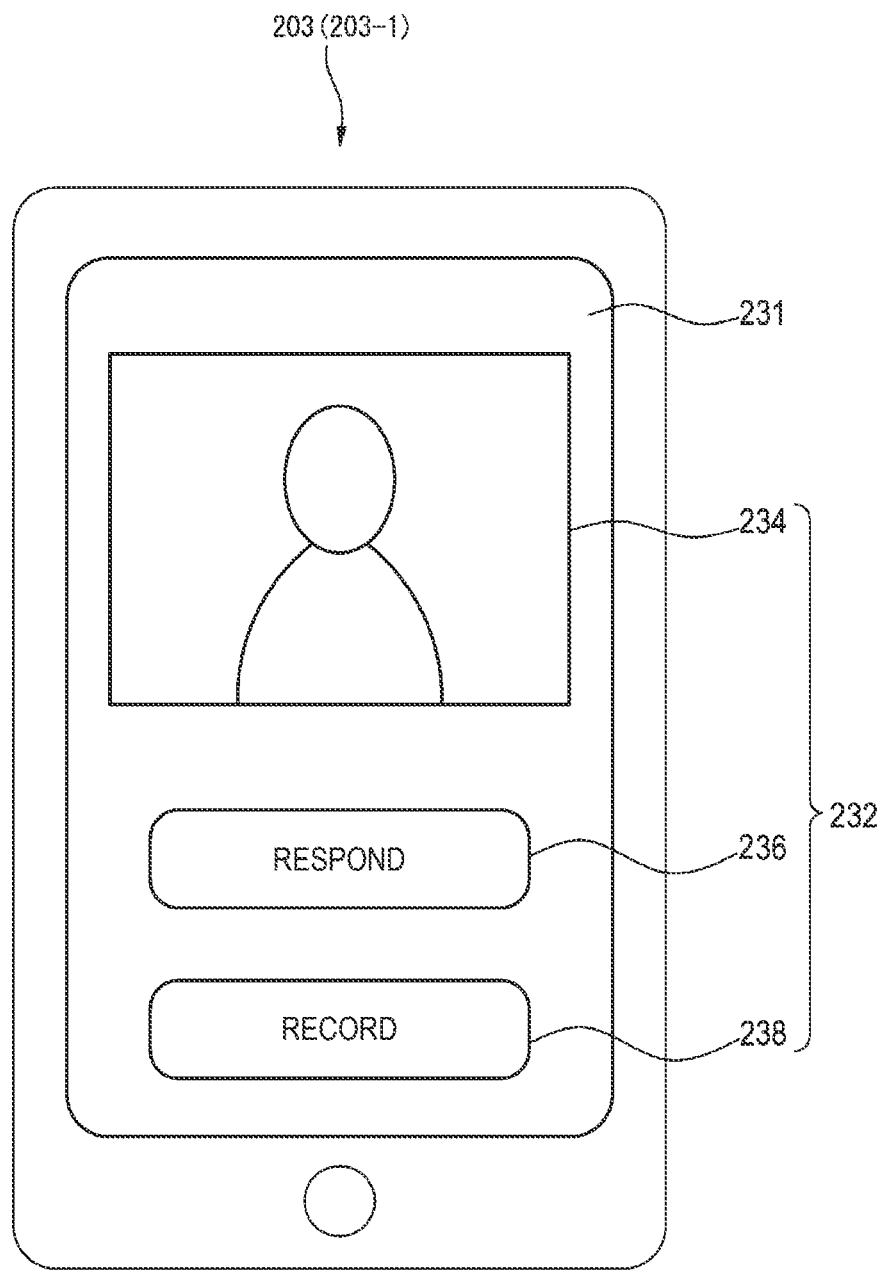
FIG. 9 depicts a configuration of an information terminal provided for the location notification system shown in FIG. 7.

FIG. 9 depicts a schematic configuration of the information terminal 203-1, which is carried by a resident in a residence in which the doorbell 202 is attached, of the plurality of information terminals 203-1 to 203-n.

Since the information terminal 203-1 has a similar configuration to the information terminal 3-1 of the first embodiment, the descriptions thereof are omitted.

As shown in FIG. 8, the server 204 includes a storage unit 240, and a control unit 242. Since the server 204 has a similar configuration to the server 4 of the first embodiment, the descriptions thereof are omitted.

In the meantime, the control unit 242 can also transmit data (image data and voice data) transmitted from the doorbell 202 to the information terminal 203-2. In the present example, the information terminal 203-2 is a terminal device that is carried by a user (for example, a protector of a child or an elderly person carrying the IC tag 205) associated with the target passerby L who carries the IC tag 205.

Also, in the storage unit 240 of the server 204, an information table (refer to FIG. 11) having tag ID information of the IC tag 205, doorbell ID information of the doorbell 202 having read the tag ID information, position information of the doorbell 202, and information about reading time of the tag ID information by the doorbell 202 is stored. The control unit 242 is configured to update the information table stored in the storage unit 240, based on data received from the doorbell 202, and to generate location notification information, which will be described later.

Figure 10:
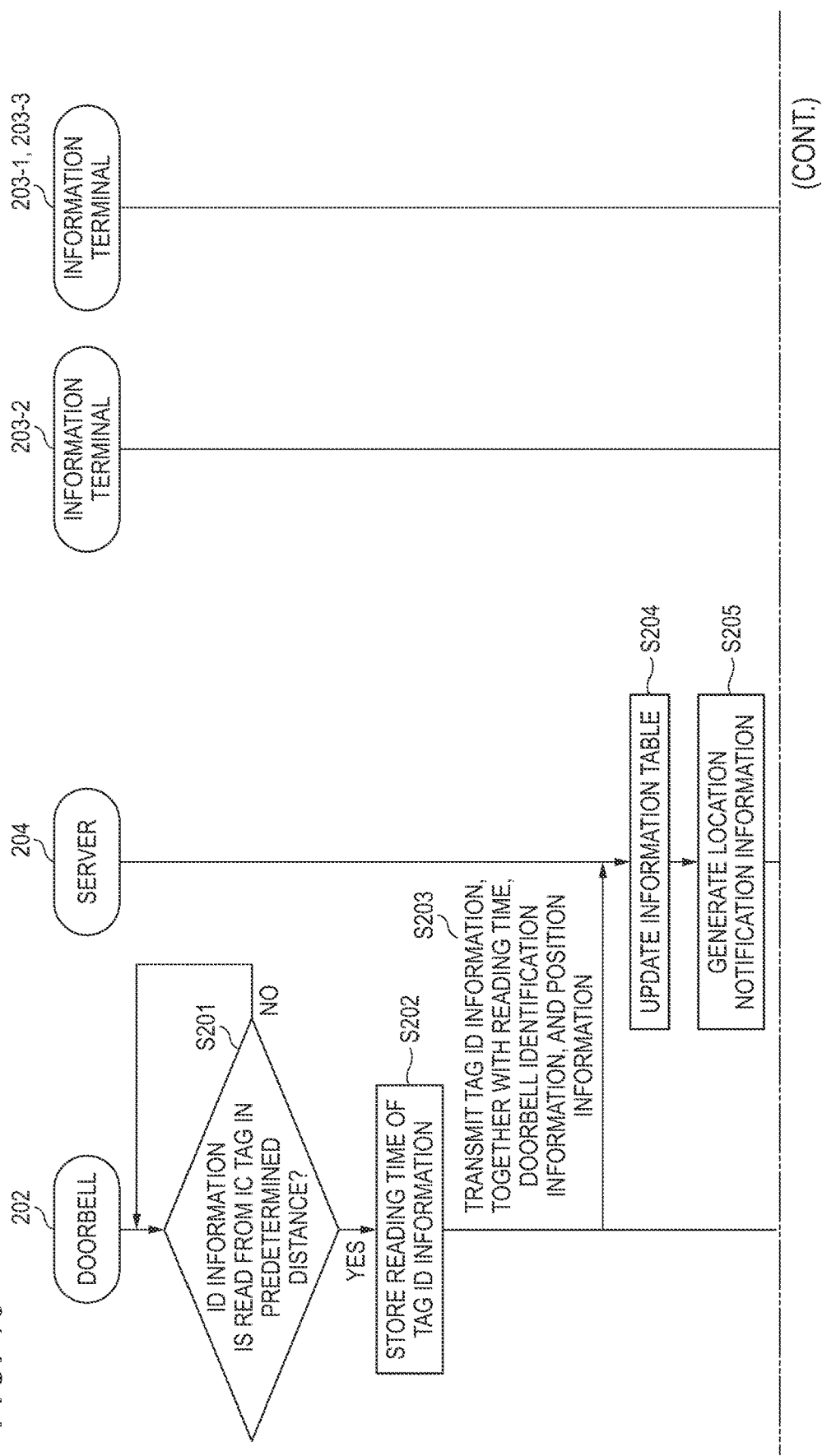
FIG. 10 is a flowchart for illustrating operations of a location notifying function that is executed by the location notification system shown in FIG. 7.
Figure 12:
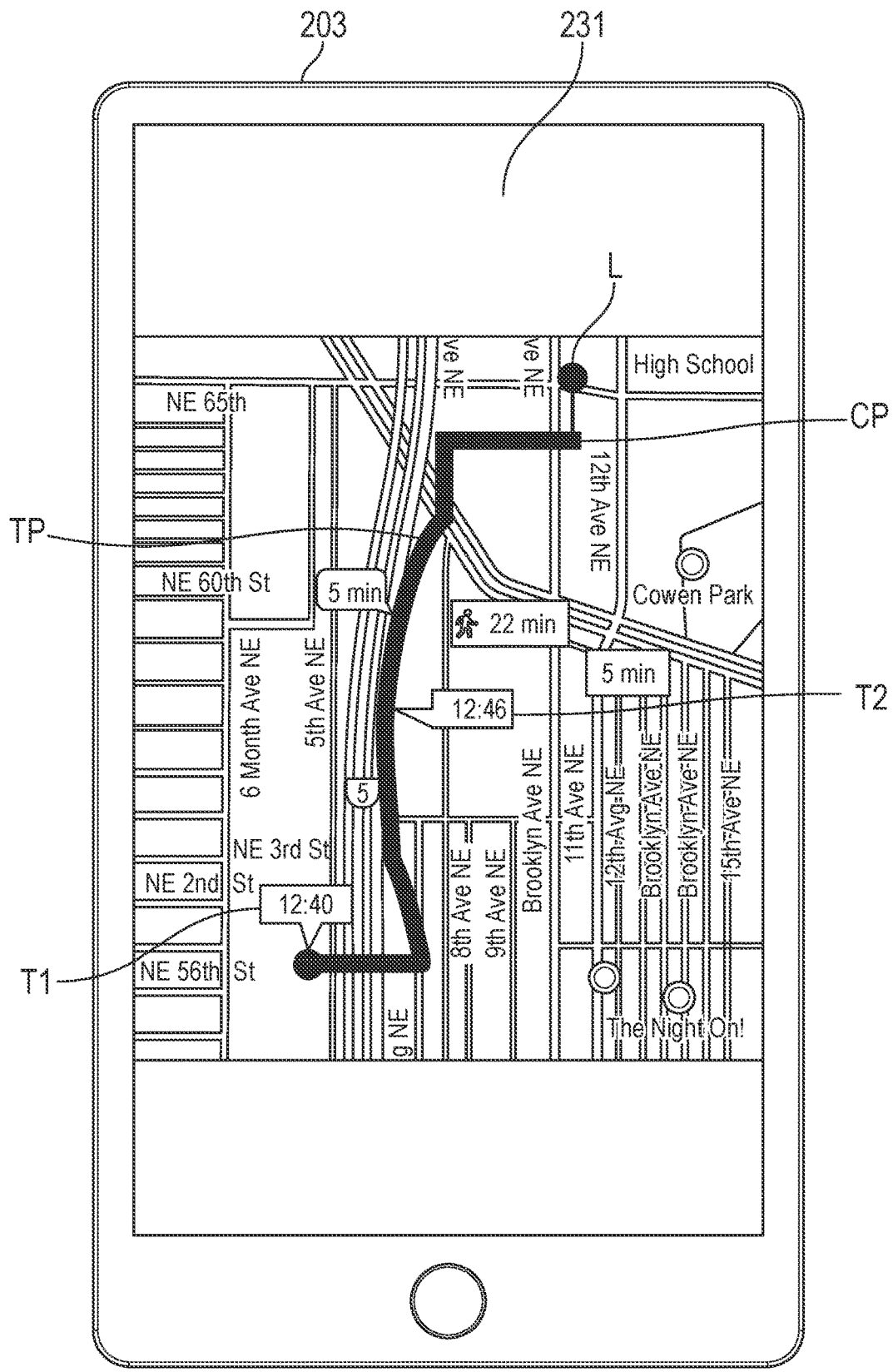
FIG. 12 depicts an example of a screen of the information terminal for displaying location notification information.

Subsequently, operations of a location notifying function that is executed by the location notification system 201 are described with reference to FIGS. 10 to 12.

First, in step S201, the control unit 221 of the doorbell 202 determines whether the tag ID information of the IC tag 205 carried by the target passerby L within a predetermined distance from the doorbell 202 is read by the tag information reading unit 229. When it is determined that the tag ID information is read by the tag information reading unit 229 (Yes in step S201), the control unit 221 stores a reading time of the tag ID information, in step S202.

In step S203, the control unit 221 transmits the read tag ID information to the server 204 via the I/F 230, together with the reading time of the tag ID information, the identification information of the doorbell 202 (hereinbelow, referred to as doorbell ID information) and the position information acquired by the position information acquisition unit 228 of the doorbell 202.

In step S204, the control unit 242 of the server 204 updates the information table stored in the storage unit 240, based on the tag ID information, tag reading time, doorbell ID information and doorbell position information received from the doorbell 202. Specifically, the doorbell ID information, the doorbell position information, the tag ID information and the tag reading time are written in the information table of FIG. 11.

In step S205, the control unit 242 generates, based on the updated information table, location notification information (an example of the target information) indicative of information about a location of the target passerby L associated with the tag ID information. In the location notification information, a current position of the target passerby L, a moving route of the target passerby L, a time at which the target passerby L has passed the moving route, and the like are included. In the meantime, the location notification information may include at least one of the information.

In step S206, the control unit 242 of the server 204 specifies, based on the tag ID information, the information terminal 203-2, for example, as the information terminal 203 (an example of the first external device) of the user (specific user) associated with the target passerby L among the plurality of information terminals 203-1 to 203-n communicatively connected to the server by the network N. As described above, the user associated with the target passerby L is, for example, a protector of the target passerby L. The control unit 242 can specify the information terminal 203-2 carried by the specific user (for example, a protector of the target passerby L associated with the tag ID information) by comparing the tag ID information received from the doorbell 202 and the information about the plurality of information terminals 203-1 to 203-n stored in advance in the storage unit 240.

In step S207, the control unit 242 transmits the location notification information generated in step S205 to the information terminal 203-2 of the user specified in step S206.

In step S208, the information terminal 203-2 having received the location notification information from the control unit 242 of the server 204 generates data about the location of the target passerby L (hereinbelow, referred to as location data) by combining the location notification information and the map information with predetermined application software.

In step S209, the information terminal 203-2 displays the location data on the display unit 231. As shown in FIG. 12, the location data is data in which a current position of the target passerby L CP, a moving route TP of the target passerby L and times T1 and T2 at which the target passerby L has passed each point on the moving route TP are superimposed on map data. By seeing the location data, the protector of the target passerby L who is a possessor of the information terminal 203-2 can perceive the position information.

Back to the processing of the server 204, in step S210, the control unit 242 of the server 204 determines whether the target passerby L is passing a preset route (hereinbelow, referred to as a set route), based on the location notification information. When it is determined that the target passerby L is passing the set route (Yes in step S210), the control unit 242 repeats the processing of step S210 until it is determined that the target passerby L is not passing the set route.

On the other hand, when it is determined that the target passerby L is not passing the set route, i.e., is moving on a route other than the set route (No in step S210), the control unit 242 generates alert information, in step S211. In the alert information, information indicating that the target passerby L is not passing the set route is included. In the alert information, the tag ID information of the target passerby L may also be included.

In step S212, the control unit 242 specifies an information terminal (an example of the second external device) associated with a possessor of the doorbell 202 (hereinbelow, referred to as a neighbor doorbell possessor) located within a predetermined range from a current position of the target passerby L among the plurality of information terminals 203-1 to 203-*n*. In the present example, it is assumed that the information terminals 203-1 and 203-3 of the plurality of information terminals 203-1 to 203-*n* shown in FIG. 7 are located within the predetermined range from a current position of the target passerby L.

In step S213, the control unit 242 transmits the alert information to the information terminals 203-1 and 203-3 specified in step S212.

In step S214, each of the information terminals 203-1 and 203-3 displays the alert information received from the control unit 242 of the server 204 on the display unit 231. The alert information that is displayed on the display unit 231 of each of the information terminals 203-1 and 203-3 may be the same as the location data that is displayed on the display unit 231 of the information terminal 203-2 as shown in FIG. 12. By seeing the location data displayed on the display unit 231, neighbors who are possessor of the information terminals 203-1 and 203-3 can perceive the position information of the target passerby L. In the meantime, the alert information that is displayed on the display unit 231 of each of the information terminals 203-1 and 203-3 may include attention-seeking information (for example, a message "The target passerby L does not pass the set route. If you see it, please contact the following point of contact.") indicating that the target passerby L does not pass the set route, differently from the location data shown in FIG. 12.

As described above, the location notification system 201 of the second embodiment includes the doorbell 202 including the tag information reading unit 229 that can read the identification signal associated with the tag ID information from the IC tag 205 (an example of the transmitter) associated with the target passerby L when the target passerby L approaches within a predetermined distance, and the server 204 capable of performing communication with the doorbell 202. The server 204 is configured to acquire the position information of the doorbell 202 and the tag ID information read by the tag information reading unit 229, to generate the location notification information about the target passerby L based on the doorbell position information and the tag ID information, and to transmit the location notification information to the information terminal 203-2 associated with the specific user who is a protector of the target passerby L. Thereby, it is possible to generate the location data about a current position and a moving route of a child or an elderly person, for example, based on the location notification information of the target passerby L and to notify the same to a protector by the simple configuration, which can contribute to improvement on crime prevention.

Also, in the present embodiment, the location notification information can be easily generated by causing the target passerby L to carry the IC tag 205 and reading the tag ID information of the IC tag 205 by the tag information reading unit 229 of the doorbell 202.

Also, the location notification information may include at least one of a current position of the target passerby L, a moving route of the target passerby L, and time at which the target passerby L has passed the moving route. Thereby, since the protector can recognize the information about the current position and moving route of the target passerby L, it is possible to assist the watching on the target passerby L.

Also, the information terminal 203 (for example, the information terminal 203-2) carried by the protector may display data in which the location notification information and the map information are combined. For example, a moving route and a passing time of the target passerby L are displayed on a map displayed on the display unit 231 of the information terminal 203-2, so that the protector can easily perceive the information about the target passerby L.

Also, in the location notification system 201, the tag information reading unit (an example of the reading device) is mounted to the doorbell 202 attached to each residence, and when the location notification information satisfies a predetermined condition, the control unit 242 of the server 204 may transmit the alert information (an example of the target information) to the information terminals 203-1 and 203-3 (an example of the second external device) associated with the possessor of the doorbell 202 located with the predetermined range from the target passerby L among the plurality of doorbells 202. According to this above configuration, it is possible to easily generate the location notification information by mounting a reading device capable of reading the tag ID information of the IC tag 205 to a device capable of acquiring its own position information, such as the doorbell 202. Also, when the target passerby L does not move along the set route, a possessor of the neighboring doorbell 202 is alerted, which can contribute to improvement on crime prevention.

In the meantime, the reading device of the tag ID information may be mounted to a device having a function of acquiring its own position information, and may also be mounted to a bending machine, a security pole, a smartphone and the like, in addition to the doorbell 202.

In the second embodiment, when it is determined in step S201 that the tag ID information is read, the control unit 221 of the doorbell 202 stores the reading time of the tag ID information in step S202, and transmits the tag ID information to the server 204 together with the reading time, the doorbell ID information and the position information, in step S203. However, the present invention is not limited thereto. For example, when it is determined that the tag ID information is detected, the control unit 221 of the doorbell 202 may start capturing of the area (specifically, the target passerby L) in front of the doorbell 202 by the camera 226, and transmit the captured image data to the server 204 via the I/F 230, together with the tag ID information and the doorbell ID information. Thereby, the server 204 can generate more advanced location data and transmit the location data to the specific information terminal 203.

Also, the target of the location data is not limited to the target passerby L such as a child, an elderly person and the like, and may include a delivery and the like. In order to reduce man-hour and cost of re-delivery, a service is provided in which when a customer is absent, a delivery is placed at an entrance of a delivery destination such as a house (so-called "safe drop" service). However, in the "safe drop" service, a delivery may be stolen or missed. Therefore, when the present example is used to generate delivery location data for perceiving a location of a delivery, for example, it is possible to easily track the stolen or missed delivery. Also, the target of the location data may include an animal (for example, a pet).

In the meantime, in the location notification system 201 of the second embodiment, the information terminal 203 associated with a protector of the target passerby L or a resident in a residence in which a doorbell is mounted is exemplified as the external device, and the doorbell 202 is configured as a Wi-Fi doorbell capable of performing wireless communication with the information terminal 203. However, the present invention is not limited thereto. For example, as the external device, a living room master unit provided in a living room of a house in which the doorbell 202 is mounted may also be included. That is, the doorbell 202 may be configured as a doorbell capable of performing communication with the living room master unit via an intercom line, for example.

Hereinbelow, a third embodiment and a fourth embodiment are described with reference to the accompanying drawings.

Third Embodiment

Figure 13:
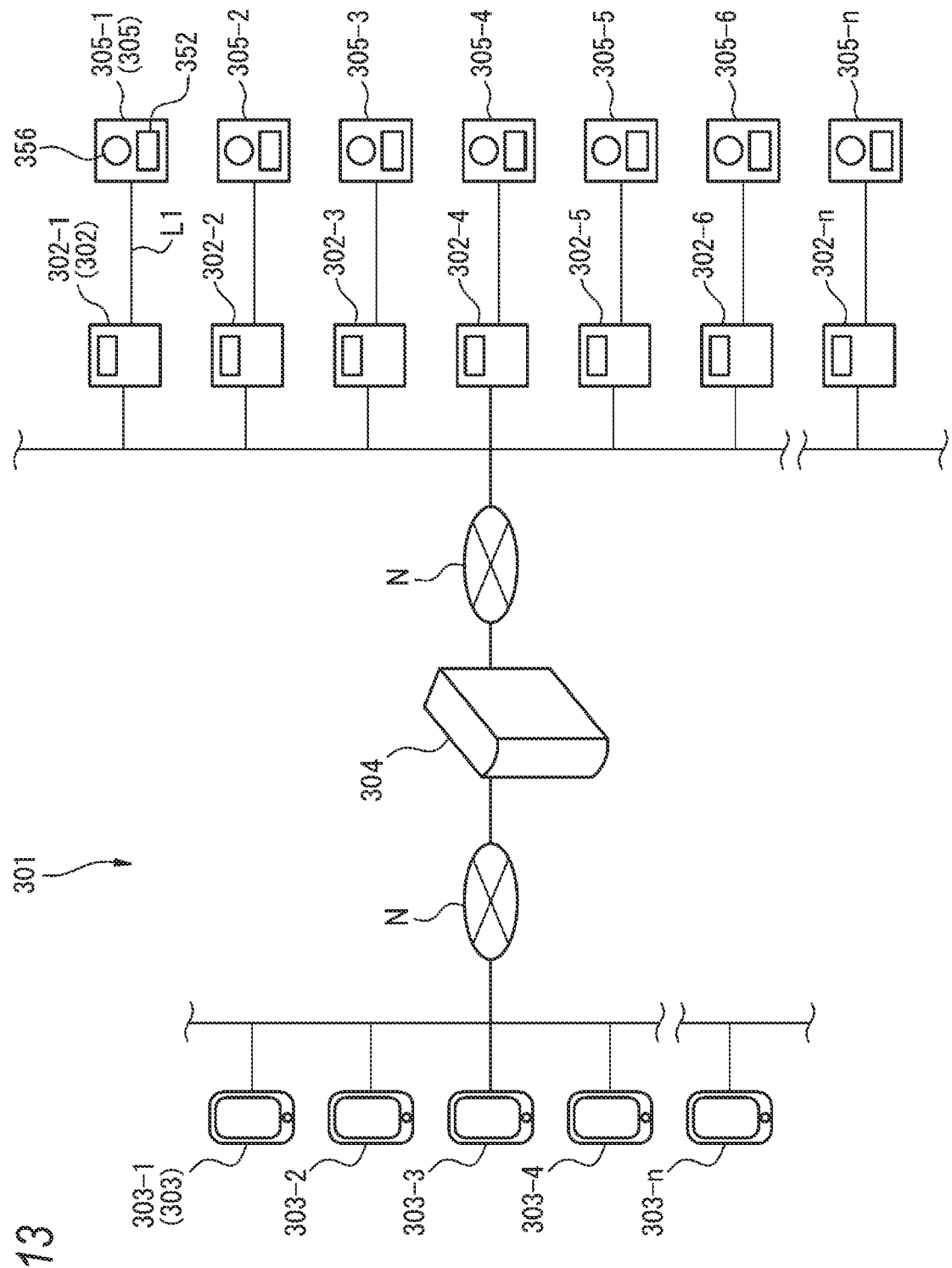
FIG. 13 depicts a configuration of an intercom system in accordance with a third embodiment and a fifth embodiment of the present invention.

FIG. 13 depicts a configuration of an intercom system in accordance with a third embodiment.

As shown in FIG. 13, an intercom system 301 includes a plurality of living room master units 302-1 to 302-n, a plurality of information terminals 303-1 to 303-n (an example of the external device), a server 304, and a plurality of entrance slave units 305-1 to 305-n. The plurality of living room master units 302-1 to 302-n and the plurality of information terminals 303-1 to 303-n can perform communication with the server 304 on an external network via a network N. As a communication device configured to relay each of the living room master unit 302-1 to 302-n and each of the information terminal 303-1 to 330-n and the network N, for example, a Wi-Fi router may be used. The plurality of living room master units 302-1 to 302-n and the plurality of corresponding entrance slave units 305-1 to 305-n are configured to perform communication via signal lines L1, respectively. Hereinbelow, the living room master unit 302-1 (hereinbelow, referred to as the living room master unit 302) of the plurality of living room master units 302-1 to 302-n is representatively described. Also, the information terminal 303-1 (hereinbelow, referred to as the information terminal 303) of the plurality of information terminals 303-1 to 303-n is representatively described. Also, the entrance slave unit 305-1 (hereinbelow, referred to as the entrance slave unit 305) of the plurality of entrance slave units 305-1 to 305-n is representatively described.

Figure 14:
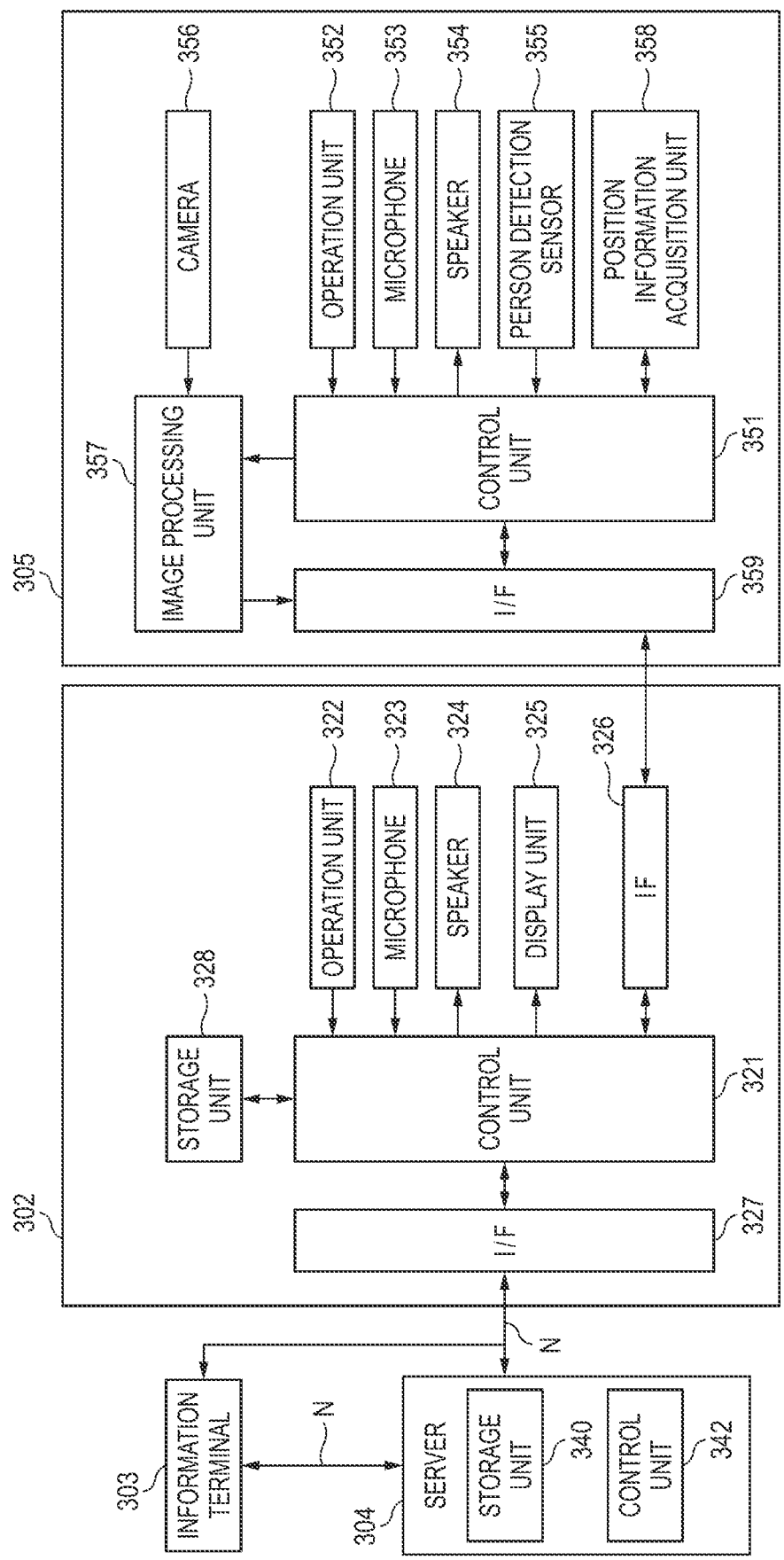
FIG. 14 is a functional block diagram depicting a configuration of a living room master unit and an entrance slave unit of the intercom system shown in FIG. 13.

FIG. 14 is a functional block diagram depicting a configuration of the living room master unit 302 and the entrance slave unit 305.

The entrance slave unit 305 is used so as for a visitor to call a resident for phone call, and is installed in an entrance of each building (a detached house or the like), for example. In the present example, it is assumed that the plurality of entrance slave units 305-1 to 305-n is each installed in an entrance of each building within a predetermined range (predetermined region). The entrance slave unit 305 is electrically connected to a power system of the building, to which the entrance slave unit is attached, by a predetermined wire, so that power is supplied thereto from the power system. In the meantime, the entrance slave unit 305 may include a battery for backup and/or primary power. The living room master unit 2 is used so as to respond to a visitor calling from the entrance slave unit 305, and is installed in a living room of each building (a detached house or the like), for example.

As shown in FIG. 14, the entrance slave unit 305 includes a control unit 351, an operation unit (calling button) 352, a microphone 353, a speaker 354, a person detection sensor 355, a camera 356, an image processing unit 357, a position information acquisition unit 358, and an interface circuit (hereinbelow, the interface circuit is referred to as "I/F") 359.

The control unit 351 is a control unit for controlling operations of each unit of the entrance slave unit 305 and includes at least one microcontroller including one or more processors and one or more memories, and other electronic circuit including an active element such as a transistor and a passive element. Also, the control unit 351 may be configured by an integrated circuit (hardware resource) or may be configured by a combination of at least one microcontroller and an integrated circuit.

The operation unit 352 is configured to receive a variety of input operations of a visitor. The diverse input operations include a calling to a resident, for example. The operation unit 352 is connected to the camera 326 via the control unit 351. The operation unit 352 is configured to output a calling signal for notifying that there is a calling input operation to the camera 356. The microphone 353 and the speaker 354 configure a phone call unit for transmitting voice data of a message and the like of a visitor toward a resident (in the present example, the living room master unit 302 installed in a living room of a building in which the entrance slave unit 305 is installed or the information terminal 303 carried by a resident) and outputting voice data of a message and the like of the resident toward the visitor.

The person detection sensor 355 is a sensor for detecting a person in front of the entrance slave unit 305, and is configured by an infrared sensor, for example. The person detection sensor 355 is connected to the camera 356 via the control unit 351. The person detection sensor 25 is configured to output a detection signal for notifying detection of a person to the camera 356.

The camera 356 is a capturing device for capturing a person such as a visitor. The camera 356 may be configured by a video camera that is a web camera. For example, the camera 356 is activated based on the detection signal that is output from the person detection sensor 355 or based on the calling signal that is output from the operation unit 352. An image captured by the camera 356 is output to the image processing unit 357. The image processing unit 357 is configured by a processor and a memory, for example, and is configured to transmit the image data acquired from the camera 356 to the living room master unit 302 via the I/F 359, based on a control signal of the control unit 351.

The position information acquisition unit 358 is configured to acquire position information of the entrance slave unit 305. The position information is acquired using a GPS (Global Positioning System), for example. In the meantime, upon initial setting at the time the entrance slave unit 305 is installed in a building, the position information of the entrance slave unit 305 may be registered in advance in the position information acquisition unit 358 by a resident. The control unit 351 is configured to transmit the position information acquired by the position information acquisition unit 358 to the living room master unit 302, together with the identification information of the entrance slave unit 305. In the meantime, when the position information of the entrance slave unit 305 is updated, the control unit 351 can transmit the updated position information to the living room master unit 302.

The I/F 359 can perform communication with the living room master unit 302 via the signal line L1. The control unit 351 can transmit and receive predetermined data (for example, voice data and image data) to and from the living room master unit 302 via the I/F 359. Like this, the entrance slave unit 305 can transmit the predetermined data (for example, voice data and image data) to the living room master unit 302 and start communication by a two-way voice call or the like between the entrance slave unit and a user of the living room master unit 302 and the information terminal 3.

The living room master unit 302 includes a control unit 321, an operation unit (response button) 322, a microphone 323, a speaker 324, a display unit 325, an I/F 326 for entrance slave unit, an I/F 327 for server, and a storage unit 328.

The control unit 321 is a control unit for controlling operations of each unit of the living room master unit 302 and includes at least one microcontroller including one or more processors and one or more memories, and other electronic circuit including an active element such as a transistor and a passive element. Also, the control unit 321 may be configured by an integrated circuit (hardware resource) or may be configured by a combination of at least one microcontroller and an integrated circuit.

The operation unit 322 is configured to receive a variety of input operations of a resident. The diverse input operations include a response operation to a calling from the entrance slave unit 305, for example. The microphone 323 and the speaker 324 configure a phone call unit for inputting and outputting voice data when a resident talks with a visitor. The display unit 325 is configured to display a video (still image or moving picture) of a visitor captured by the camera 356 of the entrance slave unit 305. The IF 326 for entrance slave unit can perform communication with the entrance slave unit 305 via the signal line L1. The control unit 321 is configured to transmit and receive predetermined data (for example, voice data and image data) to and from the entrance slave unit 305 via the I/F 326 for entrance slave unit.

The I/F 327 for server can perform communication with the server 304 via the network N. Specifically, the I/F 327 for server can perform communication with the server 304 by a network communication means such as wireless local area network (LAN), radio, cellular, the Internet, Bluetooth (registered trademark), electromagnetic wave, infrared light, sonic wave, microwave and the like. Like this, the living room master unit 302 can transmit predetermined data (for example, voice data and image data) to the server 304 and start communication by a two-way voice call or the like between a user of the living room master unit 302 and a user of the information terminal 303. Also, the living room master unit 302 can transmit the predetermined data (for example, voice data and image data) of the entrance slave unit 305 acquired via the I/F 326 for entrance slave unit to the server 304, and start communication by a two-way voice call or the like between a visitor and the information terminal 303. In the meantime, the I/F 327 for server of the living room master unit 302 may also be configured to directly perform communication with the information terminal 303.

The storage unit 328 is configured by a memory including a ROM and a RAM, for example. The control unit 321 can store data (for example, voice data and image data) transmitted from the entrance slave unit 305 in the storage unit 328, and transmit the data to the server 304. Also, the control unit 321 can store the data transmitted from the server 304 (data transmitted from the information terminal 303) in the storage unit 328, and transmit the data to the entrance slave unit 305. In this way, the living room master unit 302 can start communication by a two-way voice call or the like between a visitor to the building in which the entrance slave unit 305 is installed and a user of the information terminal 303 by transmitting and receiving the predetermined data (for example, voice data and image data) between the living room master unit and the entrance slave unit 305 and server 304 (the information terminal 303 via the server 304).

Also, in the storage unit 328, the identification information of the entrance slave unit 305 transmitted upon initial setting or update of the entrance slave unit 305 is stored.

Figure 15:
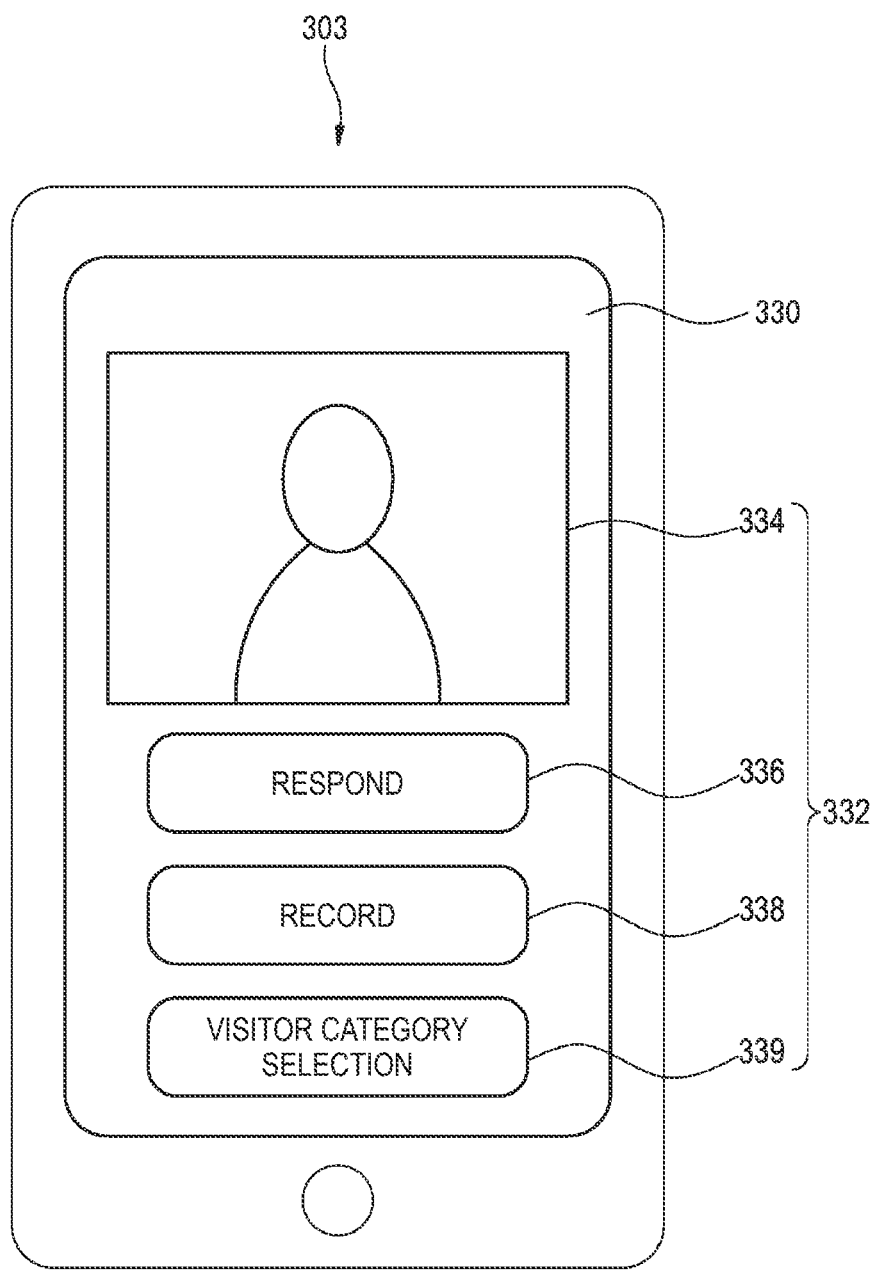
FIG. 15 depicts a configuration of an information terminal provided for the intercom system shown in FIG. 13.

FIG. 15 depicts a configuration of the information terminal 303.

The information terminal 303 is a device that is used for a resident (user) in a residence in which the entrance slave unit 305 is installed to respond to a calling from the entrance slave unit 305. The information terminal 303 includes a smartphone, a tablet computer and other portable information terminal carried by a resident, for example. The entrance slave unit 305 and the information terminal 303 can perform communication with each other via the living room master unit 302 and the server 304.

As shown in FIG. 15, the information terminal 303 includes a display unit 330 capable of displaying a predetermined user interface 332. The display unit 330 is a touch screen type display such as a liquid crystal monitor, an organic EL display and the like, and is configured to display an image (operation image and the like). The information terminal 303 includes a processor and a memory, and is configured to execute predetermined computer software (for example, application software for voice call and image display), based on data (for example, image data and voice data) transmitted from the entrance slave unit 305. For example, the information terminal 303 can execute the predetermined application software, based on an input on the user interface 332 displayed on the display unit 330. The user interface 332 includes an image display unit 334 on which a display image of a still image or a moving picture is displayed based on image data of a front area captured by the camera 356 of the entrance slave unit 305. Also, the user interface 332 includes a response permission receiving unit 336 for permitting a user to respond to a calling of a visitor. When the user touches the response permission receiving unit 336, a two-way voice communication starts so as to respond to a calling of the visitor. Also, the user interface 332 includes a recording receiving unit 338 for allowing the user to select recording of a display image displayed on the image display unit 334. When the user touches the recording receiving unit 338, a display image that is displayed on the image display unit 334 can be recorded. Also, the user interface 332 includes a visitor category selection unit 339 for allowing a user to classify/select a visitor category of a person in the display image displayed on the image display unit 334. When the user touches the visitor category selection unit 339, a person in the display image displayed on the image display unit 334 can be classified and selected into a predetermined visitor category. For example, the user may input a visitor category in the visitor category selection unit 339 by characters or may select a desired visitor category from a list of a plurality of visitor category candidates.

As shown in FIG. 14, the server 304 includes a storage unit 340 and a control unit 342. The storage unit 340 is configured by a memory including a ROM and a RAM, for example. The control unit 342 includes at least one microcontroller including one or more processors and one or more memories, and other electronic circuit including an active element such as a transistor and a passive element. Also, the control unit 342 may be configured by an integrated circuit (hardware resource) or may be configured by a combination of at least one microcontroller and an integrated circuit.

The control unit 342 can store data (for example, voice data and image data) transmitted from the living room master unit 302 in the storage unit 340, and transmit the data to the information terminal 303. Also, the control unit 342 can store the data transmitted from the information terminal 303 in the storage unit 340, and transmit the data to the living room master unit 302. In this way, the server 304 can start communication by a two-way voice call or the like between the user of the living room master unit 302 and the user of the information terminal 303 by transmitting and receiving the predetermined data (for example, voice data and image data) between the living room master unit 302 and the information terminal 303. Also, in a case where the predetermined data is the data transmitted from the entrance slave unit 305, it is possible to start communication by a two-way voice call or the like between a visitor to a building in which the entrance slave unit 305 is installed and the user of the information terminal 303. In the meantime, as described above, the data can be transmitted and received between the living room master unit 302 and the information terminal 303 without via the server 304.

Figures 16, 17:
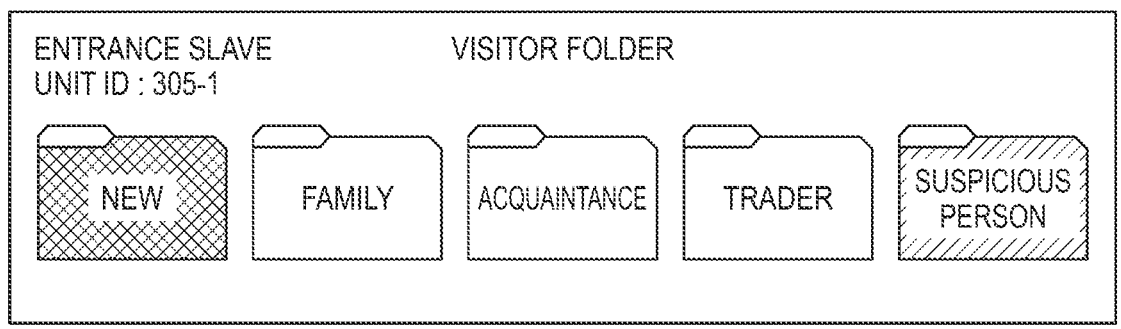
FIG. 16 depicts an example of a visitor folder that is stored in a storage unit of a server provided for the intercom system shown in FIG. 13.
FIG. 17 depicts an example of the visitor folder that is stored in the storage unit of the server provided for the intercom system shown in FIG. 13.

Also, in the storage unit 340, a visitor folder corresponding to each entrance slave unit 305 is stored (refer to FIG. 16). The visitor folder has a plurality of sub-folders corresponding to visitor categories (for example, New, Family, Acquaintance, Trader and Suspicious person). In each of the sub-folders, image data that is classified/selected into the visitor categories via the visitor category selection unit 339 of the information terminal 303 by the user of the entrance slave unit 305 is stored. The control unit 342 is configured to update the visitor folder stored in the storage unit 340, based on the data received from the entrance slave unit 305 via the living room master unit 302 and the visitor category information received from the corresponding information terminal 303.

Instead of the visitor folder, a visitor table corresponding to each entrance slave unit 305 may be stored (refer to FIG. 17). The visitor table includes image data, and visitor category information of the image data.

Also, in a case where image data is included in the sub-folder "Suspicious person" corresponding to any entrance slave unit 305, the control unit 342 transmits the suspicious person information including the image data to a user of another entrance slave unit 305 (for example, the living room master unit 302 or the information terminal 303). Thereby, the user of the entrance slave unit 305 can check the image data captured by the camera 356 of another entrance slave unit 305 and classified as a suspicious person, and classify/select the image data into the visitor category and store the same in the visitor folder thereof, as needed.

Figure 18:
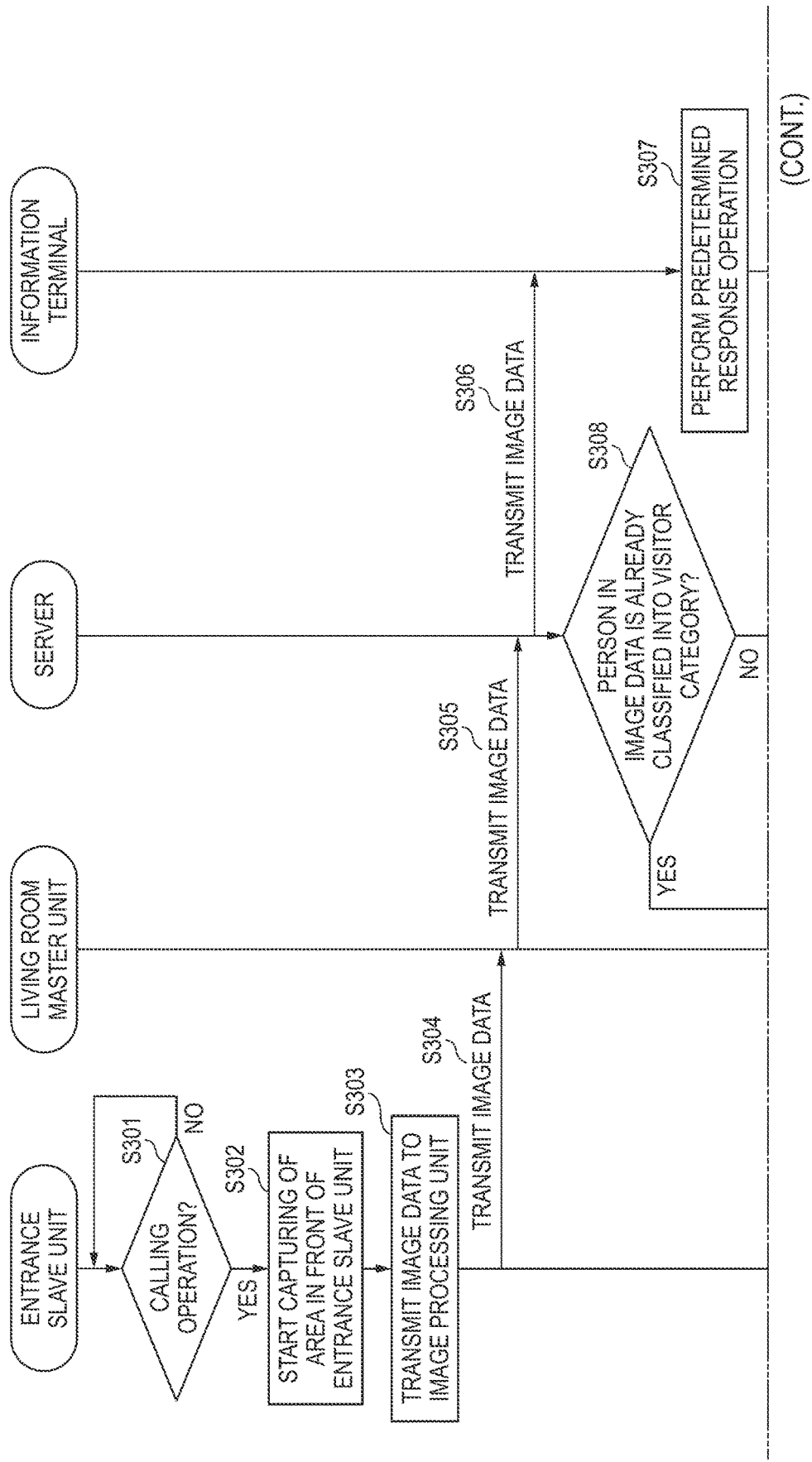
FIG. 18 is a flowchart for illustrating operations of a visitor category classifying function that is executed by the intercom system shown in FIG. 13.

Subsequently, operations of a visitor category classifying function that is executed by the intercom system 301 are described with reference to FIG. 18. In the below, an example where a response operation to a calling and a classification/selection operation of the visitor category are performed by the user of the information terminal 303 is described.

First, the control unit 351 of the entrance slave unit 305 determines whether there is a calling operation from a visitor by the operation unit 352 (step S301). When it is determined in step S301 that there is a calling operation from a visitor (Yes in step S301), the control unit 351 outputs a calling signal to the camera 356 and the camera 356 starts capturing of an area (specifically, the visitor) in front of the entrance slave unit 305 (step S302). On the other hand, even when it is determined that the person detection sensor 355 detects a visitor, the control unit 351 outputs a calling signal to the camera 356 and the camera 356 starts capturing of an area in front of the entrance slave unit 305.

Then, the camera 356 transmits the captured image data to the image processing unit 357 (step S303). The control unit 351 transmits the image data received by the image processing unit 357 to the living room master unit 302 via the I/F 359 (step S304). In the meantime, when there is voice data of a message and the like of the visitor, the control unit 351 transmits the voice data to the living room master unit 302 together with the image data. Also, in a case where the identification information is not registered in the storage unit 328 of the living room master unit 302 upon initial setting or update of the entrance slave unit 305, the control unit 351 may transmit the identification information of the entrance slave unit 305 to the living room master unit 302, together with the image data and the like.

The control unit 321 of the living room master unit 302 transmits the data (for example, image data and voice data) received from the entrance slave unit 305 to the server 304 via the I/F 327 for server, together with the identification information of the entrance slave unit 305 stored in the storage unit 328 (step S305). Then, the control unit 342 of the server 304 transmits the data (for example, the image data and voice data) received from the living room master unit 302 to the information terminal 303 (step S306). The user of the information terminal 303 performs a predetermined response operation (for example, a call or an unlocking of an electric lock) for the data received from the control unit 342 of the server 304, via the user interface 332 (step S307).

Then, the control unit 342 of the server 304 determines whether a person of the image data captured by the camera 356 of the entrance slave unit 305 and received from the living room master unit 302 is already classified into a visitor category (step S308). For example, the control unit compares the image data captured by the camera 356 of the entrance slave unit 305 and the image data stored in the sub-folder corresponding to each visitor category of the visitor folder stored in the storage unit 340, and performs face recognition. When it is determined in step S308 that the person included in the image data is not classified into the visitor category (No in step S308), the control unit 342 stores the image data captured by the camera 356 of the entrance slave unit 305 in the sub-folder "New" (step S309). When the predetermined response operation is over in step S307, the user of the information terminal 303 transmits a request signal requesting transmission of the image data stored in the sub-folder "New" to the control unit 342 of the server 304 (step S310). The control unit 342 of the server 304 transmits the image data stored in the sub-folder "New" to the information terminal 303, based on the image data transmission request signal from the information terminal 303 (step S311). In the meantime, address information of the image data, other than the image data, may be transmitted.

The user of the information terminal 303 classifies/selects the image data received from the server 304 into the visitor category by the visitor category selection unit 339 of the user interface 332 (step S312), and transmits visitor category information to the server 304 (step S313). Then, the control unit 342 of the server 304 moves the image data stored in the sub-folder "New" to the sub-folder of a predetermined visitor category, based on the visitor category information received from the information terminal 303 (step S314). In the meantime, in a case where the visitor table of FIG. 17 is used instead of the visitor folder, the control unit 342 of the server 304 transmits the image data of which the visitor category in the visitor table is "New" to the information terminal 303, in step S311, and re-records the visitor category from "New" to a predetermined visitor category, based on the visitor category information received from the information terminal 303, in step S314.

In the meantime, the predetermined response operation and the classification/selection of the visitor category in S307, S310, S312 and S313 are performed by the user of the information terminal 303, as described above. However, the present invention is not limited thereto. For example, the user of the living room master unit 302 may perform the same. In this case, the user of the living room master unit 302 may classify/select the image data into a predetermined visitor category by operating the visitor category selection unit displayed on the display unit 325.

Also, after the user of the information terminal 303 performs the predetermined response operation in step S307, the user acquires the image data of the sub-folder "New" stored in the storage unit 340 of the server 304, and classifies the same into the predetermined visitor category. However, the present invention is not limited thereto. For example, the user of the information terminal 303 may classify/select the image data into a predetermined visitor category upon calling (before performing the predetermined response operation) and transmit the visitor category information to the server 304. In this case, instead of storing the image data in the sub-folder "New" in step S309, the control unit 342 of the server 304 may store the image data in the sub-folder of the predetermined visitor category, based on the visitor category information received from the information terminal 303. In this case, the operations in steps S310, S311 and S314 are not required.

Also, in steps S310 and S311, the control unit 342 of the server 304 transmits the image data, based on the request signal from the information terminal 303. However, the image data stored in the sub-folder "New" may be transmitted to the information terminal 303 after a predetermined time period elapses, without the request signal from the information terminal 303.

Also, when it is determined in step S308 that the person included in the image data is classified into the visitor category (No in step S308), the control unit 342 of the server 304 may transmit the visitor category information of the image data to the entrance slave unit 305 via the living room master unit 302. Thereby, the entrance slave unit 305 can perform a predetermined operation, in response to the visitor category information. For example, in a case where the visitor category is "Acquaintance", a message "Mr. A, I was waiting for you" may be output from the speaker 354 of the entrance slave unit 305, and in a case where the visitor category is "Suspicious person", a message "You cannot call. Please, get back" may be output.

Also, the control unit 342 of the server 304 transmits the data received from the living room master unit 302 to the information terminal 303, in step S306, but may transmit the data received from the living room master unit 302 to the information terminal 303, based on a result of the determination in step S308. For example, the determination of step S308 is performed, and when it is determined that the image data captured by the camera 356 of the entrance slave unit 305 is image data stored in the sub-folder "Suspicious person" of the visitor folder, the data may not be transmitted to the information terminal 303. In this way, in a case where the visitor category is "Suspicious person", the response operation to the calling is not performed in the information terminal 303, so that it is possible to prevent a calling of a suspicious person.

Figure 19:
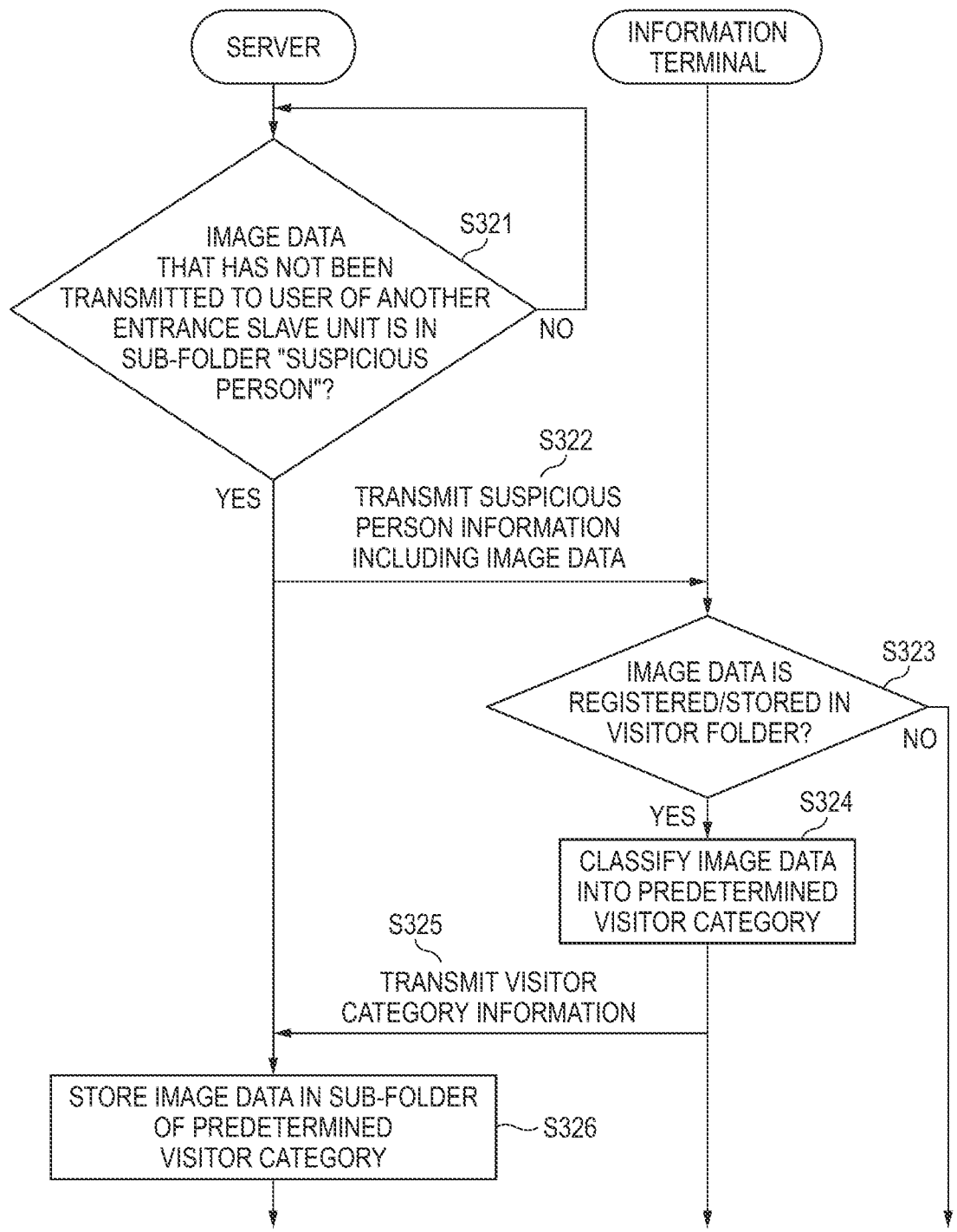
FIG. 19 is a flowchart for illustrating operations of a suspicious person information sharing function that is executed by the intercom system shown in FIG. 13.

Subsequently, operations of a suspicious person information sharing function that is executed by the intercom system 301 are described with reference to FIG. 19. Hereinbelow, an example where the classification/selection operation of the visitor category is performed by the user of the information terminal 303 is described.

First, the control unit 342 of the server 304 determines whether the image data stored in the sub-folder "Suspicious person" of the visitor folder of the plurality of entrance slave units 305-1 to 305-n installed in any predetermined range (predetermined region), which is stored in the storage unit 340, has been transmitted to the user of another entrance slave unit 305 (the information terminal 303 corresponding to another entrance slave unit 305) (step S321). For example, the control unit 342 periodically checks the sub-folder "Suspicious person" of each entrance slave unit 305, and determines whether the image data stored therein has been already transmitted to the information terminal 303 corresponding to another entrance slave unit 305.

When it is determined in step S321 that the image data stored in the sub-folder "Suspicious person" has not been transmitted to the information terminal 303 corresponding to another entrance slave unit 305 (Yes in step S321), the control unit 342 transmits suspicious person information including the image data to the information terminal 303 corresponding to another entrance slave unit 305 (step S322). For example, the predetermined range is set to Seto City, Aichi Prefecture, and when the image data stored in the sub-folder "Suspicious person" of the entrance slave unit 305-1 of the plurality of entrance slave units 305-1 to 305-n installed in Ceto City has not been transmitted to the information terminals 303-2 to 303-n corresponding to other entrance slave units 305-2 to 305-n, the control unit 342 transmits the suspicious person information including the image data to the information terminals 303-2 to 303-n corresponding to the entrance slave units 305-2 to 305-n.

The user of the information terminal 303 having received the suspicious person information including the image data determines whether or not to register/store the received image data in the visitor folder of the information terminal of the user (step S323). When it is determined to register/store the suspicious person information in the visitor folder of the information terminal of the user (Yes in step S323), the user of the information terminal 303 operates the visitor category selection unit 339 to classify/select the suspicious person information into a predetermined visitor category (step S324). Then, the user of the information terminal 303 transmits the classified visitor category information to the control unit 342 of the server 304 (step S325).

The control unit 342 of the server 304 stores, based on the visitor category information received from the information terminal 303, the image data in the sub-folder of the predetermined visitor category of the visitor folder of the entrance slave unit 305 corresponding to the information terminal 303 of a transmission source (step S326). Thereby, the user of the entrance slave unit 305 can check the suspicious person information classified as a suspicious person by the user of another entrance slave unit 305, and can classify the image data into the visitor category, based on the user's determination criterion, as needed. For example, when it is determined that the image data included in the suspicious person information is image data of a trader, the user can register/store the image data in the sub-folder "Trader" of the information terminal of the user.

In the meantime, the classification of the visitor category is performed by the user of the information terminal 303, as described above. However, the present invention is not limited thereto. For example, the classification of the visitor category may be performed by the user of the living room master unit 302. In this case, the control unit 342 of the server 304 transmits the suspicious person information including the image data to the living room master unit 302 corresponding to another entrance slave unit 305. The user of the living room master unit 302 can classify/select the image data into a predetermined visitor category by operating the visitor category selection unit displayed on the display unit 325.

In the meantime, in step S321, the control unit 342 determines whether the image data not transmitted to the information terminal 303 of another entrance slave unit 305 is included in the sub-folder "Suspicious person". However, the present invention is not limited thereto. For example, when the user of the entrance slave unit 305 registers the image data in the sub-folder "Suspicious person", the suspicious person information including the image data may be transmitted to the information terminal corresponding to another entrance slave unit.

As described above, the intercom system 301 of the third embodiment includes the plurality of entrance slave units 305 each of which is attached to each residence and includes the operation unit 352 and the camera 356, the plurality of living room master units 302 each of which is associated with the corresponding entrance slave unit 305 and is configured to perform communication with the associated entrance slave unit 305, the plurality of information terminals 303 each of which is associated with the corresponding entrance slave unit 305, and the server 304 having the storage unit 342 and capable of performing communication with the plurality of living room master units 302 and the plurality of information terminals 303. The server 304 is configured to receive the identification information of each of the entrance slave units 305 and the image data captured by the camera 356 from each of the plurality of entrance slave units 305 via each of the plurality of associated living room master units 302, to receive the visitor category information of the image data captured by the camera 356 of each of the associated entrance slave units 305 from each of the plurality of information terminals 303 or each of the plurality of living room master units 302, and to store the image data and the corresponding visitor category information in the storage unit 340 in association with the identification information of each of the entrance slave units 305.

Thereby, it is possible to provide the intercom system 301 having a configuration capable of collectively managing the information associated with the plurality of entrance slave units 305 and contributing to improvement on local crime prevention by storing the image data captured by the camera 356 of each of the entrance slave units 305 and the visitor category information thereof in the storage unit 340 of the server 304.

Fourth Embodiment

Figure 20:
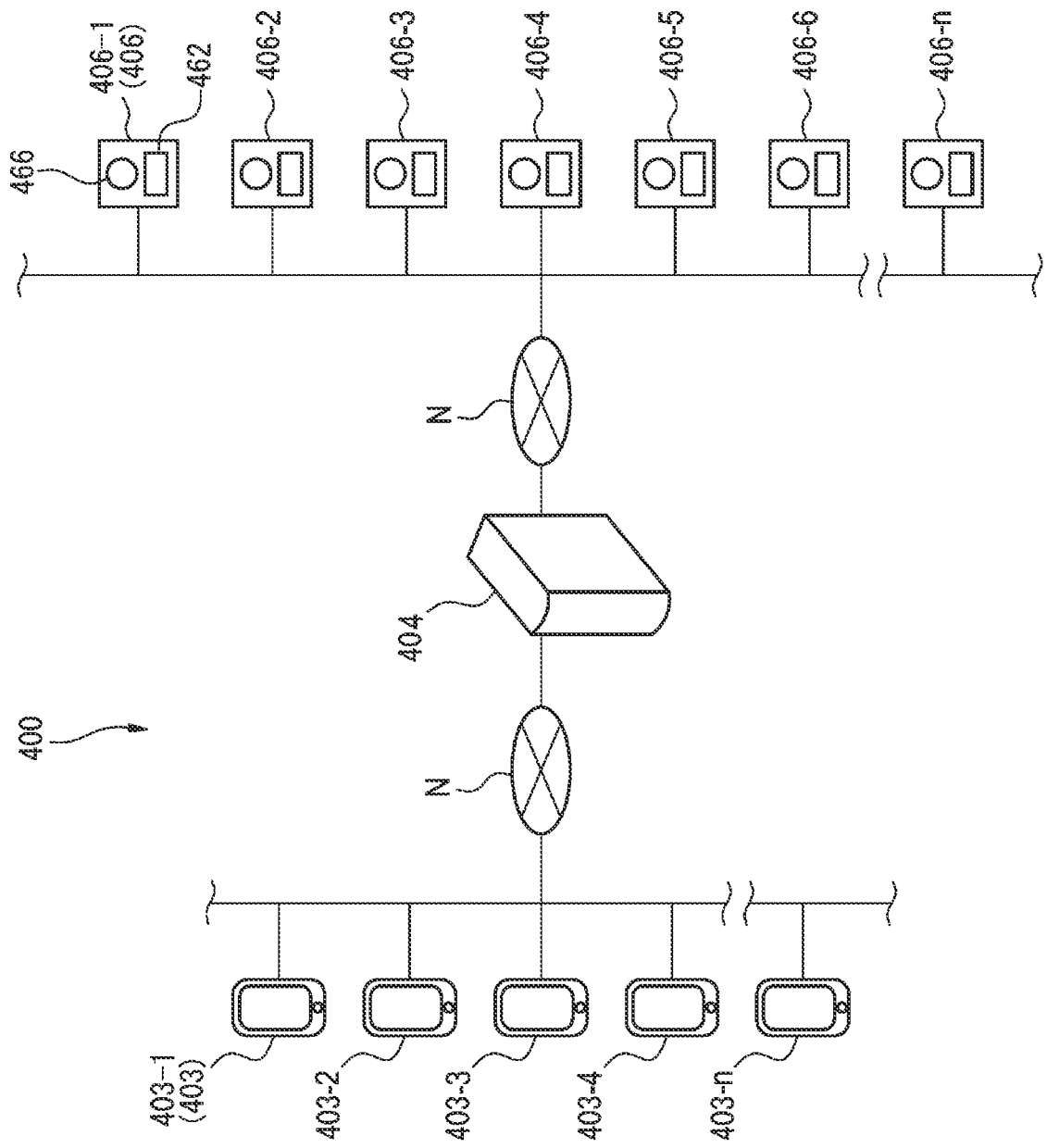
FIG. 20 depicts a configuration of a doorbell system in accordance with a fourth embodiment and a sixth embodiment of the present invention.

FIG. 20 depicts a configuration of a doorbell system in accordance with a fourth embodiment. In the fourth embodiment, the detailed descriptions of the same/similar elements and same/similar processes as/to the third embodiment are omitted. In particular, since the operations of the visitor category classifying/selecting function of the information terminal 403 and the operations of the suspicious person information sharing function are similar to the third embodiment, the detailed descriptions thereof are omitted.

As shown in FIG. 20, a doorbell system 400 includes a plurality of doorbells 406-1 to 406-$n$, a plurality of information terminals 403-1 to 403-$n$ (an example of the external device), and a server 404. The plurality of doorbells 406-1 to 406-$n$ and the plurality of information terminals 403-1 to 403-$n$ can perform communication with the server 404 on an external network via a network N. As a communication device configured to relay each of the doorbells 406-1 to 406-$n$ and each of the information terminals 403-1 to 403-$n$ and the network N, for example, a Wi-Fi router may be used. Hereinbelow, the doorbell 406-1 (hereinbelow, referred to as the doorbell 406) of the plurality of doorbells 406-1 to 406-$n$ is representatively described. Also, the information terminal 403-1 (hereinbelow, referred to as the information terminal 403) of the plurality of information terminals 403-1 to 403-$n$ is representatively described.

Figure 21:
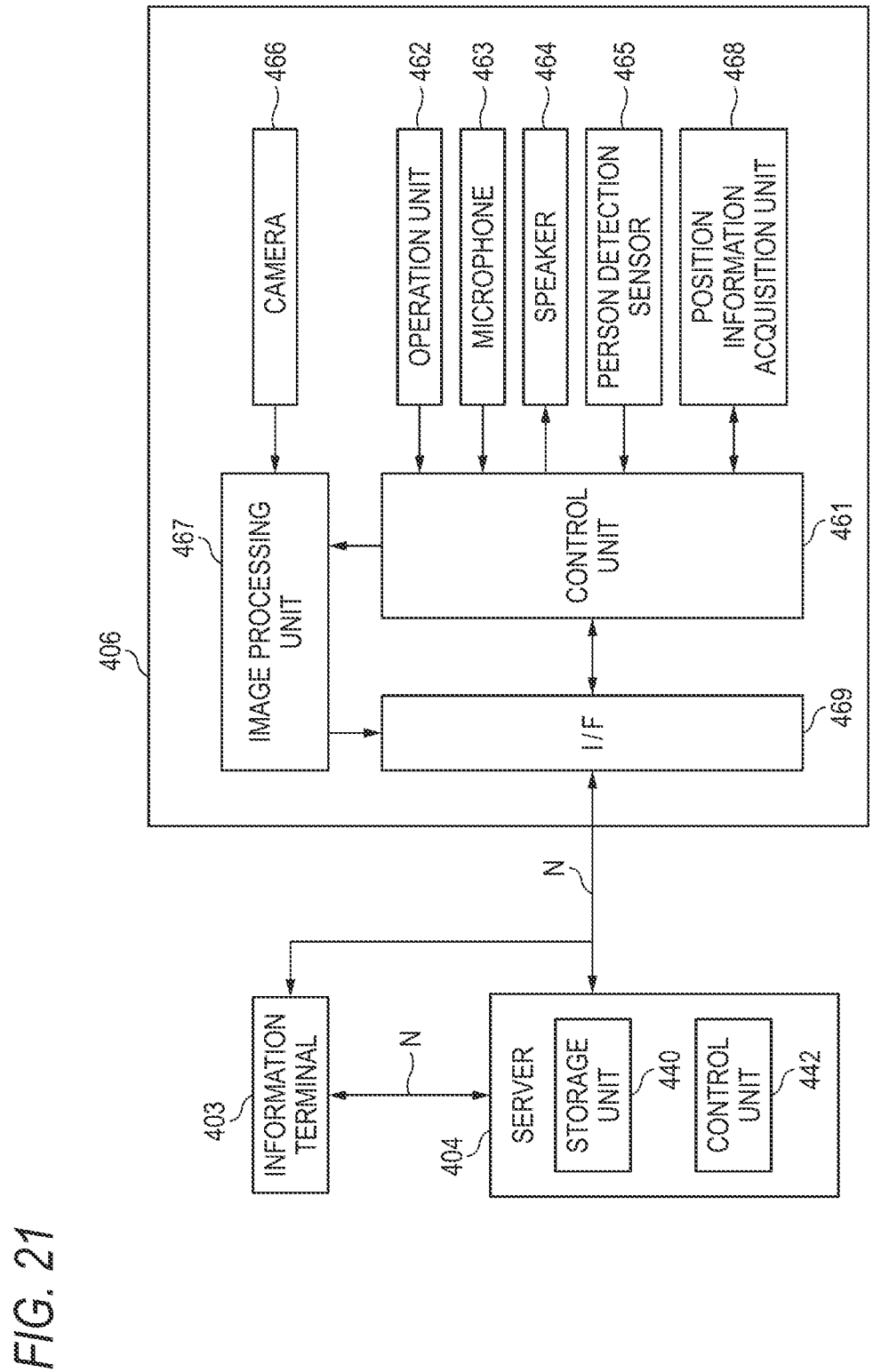
FIG. 21 is a functional block diagram depicting a configuration of a doorbell provided for the doorbell system shown in FIG. 20.

FIG. 21 is a functional block diagram depicting a configuration of the doorbell 406.

The doorbell 406 is used so as for a visitor to call a resident for phone call, and is installed in an entrance of each building (a detached house or the like), for example. In the present example, it is assumed that the plurality of doorbells 406-1 to 406-$n$ is each installed in an entrance of each building within a predetermined range (predetermined region). Each doorbell 406 is electrically connected to a power system of the building, to which the doorbell is attached, by a predetermined wire, so that power is supplied thereto from the power system. In the meantime, the doorbell 406 may include a battery for backup and/or primary power.

As shown in FIG. 21, the doorbell 406 includes a control unit 461, an operation unit (calling button) 462, a microphone 463, a speaker 464, a person detection sensor 465, a camera 466, an image processing unit 467, a position information acquisition unit 468, and an I/F 469.

The control unit 461 is a control unit for controlling operations of each unit of the doorbell 406, and includes at least one microcontroller including one or more processors and one or more memories, and other electronic circuit including an active element such as a transistor and a passive element. Also, the control unit 461 may be configured by an integrated circuit (hardware resource) or may be configured by a combination of at least one microcontroller and an integrated circuit.

The operation unit 462 is configured to receive a variety of input operations of a visitor. The diverse input operations include a calling to a resident, for example. The operation unit 462 is connected to the camera 466 via the control unit 461. The operation unit 462 is configured to output a calling signal for notifying that there is a calling input operation to the camera 466. The microphone 463 and the speaker 464 configure a phone call unit for transmitting voice data of a message and the like of a visitor toward a resident (in the present example, the information terminal 403 of a resident in a building in which the doorbell 406 is installed) and outputting voice data of a message and the like of the resident toward the visitor.

The person detection sensor 465 is a sensor for detecting a person in front of the doorbell 406, and is configured by an infrared sensor, for example. The person detection sensor 465 is connected to the camera 466 via the control unit 461. The person detection sensor 465 is configured to output a detection signal for notifying detection of a person to the camera 466.

The camera 466 is a capturing device for capturing a person such as a visitor. The camera 466 may be configured by a video camera that is a web camera. For example, the camera 466 is activated based on the detection signal that is output from the person detection sensor 465 or based on the calling signal that is output from the operation unit 462. An image captured by the camera 466 is output to the image processing unit 467. The image processing unit 467 is configured by a processor and a memory, for example, and is configured to transmit the image data acquired from the camera 466 to the server 404 via the I/F 469, based on a control signal of the control unit 461.

The position information acquisition unit 468 is configured to acquire position information of the doorbell 406. The position information is acquired using a GPS, for example. In the meantime, upon initial setting at the time the doorbell 406 is installed in a building, the position information of the doorbell 406 may be registered in advance in the position information acquisition unit 468 by a resident. The control unit 461 is configured to transmit the position information acquired by the position information acquisition unit 468 to the server 404. In the meantime, when the position information of the doorbell 406 is updated, the control unit 461 can transmit the updated position information to the server 404.

The I/F 469 can perform communication with the server 404 via the network N. Like this, the doorbell 404 can transmit the predetermined data (for example, voice data and image data) to the server 404 and start communication by a two-way voice call or the like between a visitor and a user of the information terminal 403. In the meantime, the I/F 469 of the doorbell 406 may also be configured to directly perform communication with the information terminal 403.

The information terminal 403 is a device that is used so that a resident (user) in a residence in which the doorbell 406 is installed responds to a calling from the doorbell 406, for example. The information terminal 403 includes, for example, a smartphone, a tablet computer and other portable information terminal carried by the resident. The doorbell 406 and the information terminal 403 can perform communication with each other via the server 404.

The server 404 includes a storage unit 440 and a control unit 442. The control unit 442 can store data (for example, voice data and image data) transmitted from the doorbell 406 in the storage unit 440, and transmit the data to the information terminal 403. Also, the control unit 442 can store the data transmitted from the information terminal 403 in the storage unit 440, and transmit the data to the doorbell 406. In this way, the server 404 can start communication by a two-way voice call or the like between a visitor to a building in which the doorbell 406 is installed and a user of the information terminal 403 by transmitting and receiving the predetermined data (for example, voice data and image data) between the doorbell 406 and the information terminal 403.

Figure 22:
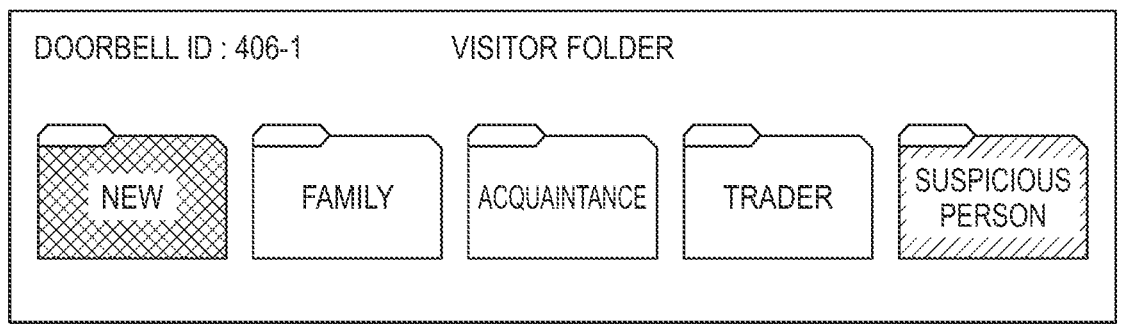
FIG. 22 depicts an example of a visitor folder that is stored in a storage unit of a server provided for the doorbell system shown in FIG. 20.

Also, in the storage unit 440, a visitor folder corresponding to each doorbell 406 is stored (refer to FIG. 22). The visitor folder has a plurality of sub-folders corresponding to visitor categories (for example, New, Family, Acquaintance, Trader and Suspicious person). In each of the sub-folders, image data that is classified/selected into the visitor categories via the visitor category selection unit 439 of the information terminal 403 by the user of the doorbell 406 is stored. The control unit 442 is configured to update the visitor folder stored in the storage unit 440, based on the data received from the doorbell 406 and the visitor category information received from the corresponding information terminal 403. In the meantime, instead of the visitor folder, a visitor table corresponding to each doorbell 406 may be stored.

Also, in a case where the image data is included in the sub-folder "Suspicious person" corresponding to any doorbell 406, the control unit 442 transmits the suspicious person information including the image data to the user of another doorbell 406 (for example, the information terminal 403). Thereby, the user of the doorbell 406 can check the image data captured by the camera 446 of another doorbell 406 and classified as a suspicious person, and classify/select the image data into the visitor category and store the same in the visitor folder thereof, as needed.

Figure 23:
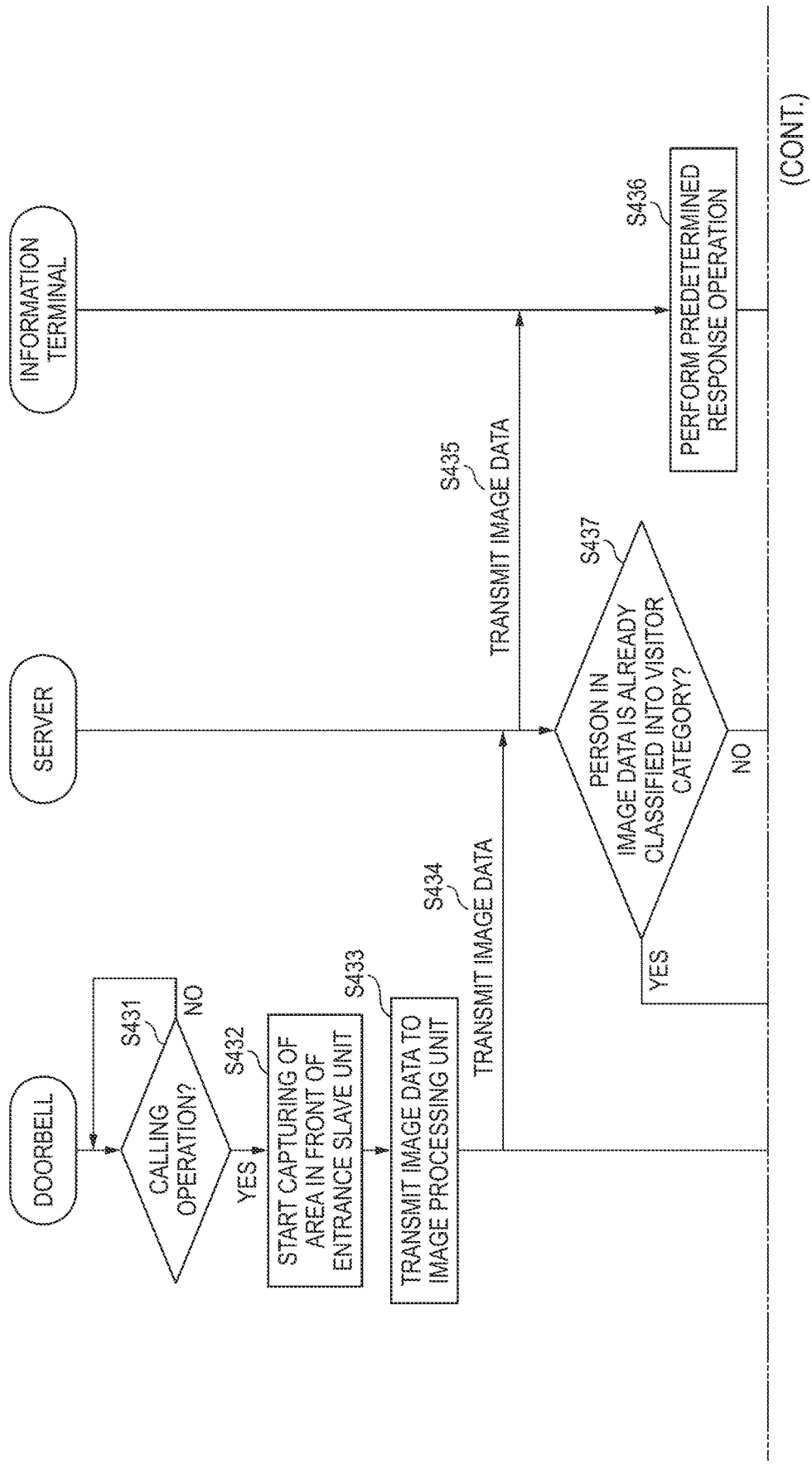
FIG. 23 is a flowchart for illustrating operations of a visitor category classifying function that is executed by the doorbell system shown in FIG. 20.

Subsequently, operations of a visitor category classifying function that is executed by the doorbell system 400 are described with reference to FIG. 23.

First, the control unit 461 of the doorbell 406 determines whether there is a calling operation from a visitor by the operation unit 452 (step S431). When it is determined in step S431 that there is a calling operation from a visitor (Yes in step S431), the control unit 461 outputs a calling signal to the camera 466 and the camera 466 starts capturing of an area (specifically, the visitor) in front of the doorbell 406 (step S432). In the meantime, even when it is determined that the person detection sensor 465 detects a visitor, the control unit 461 outputs a calling signal to the camera 466 and the camera 466 starts capturing of an area in front of the doorbell 406.

Then, the camera 466 transmits the captured image data to the image processing unit 467 (step S433). The control unit 461 transmits the image data received by the image processing unit 467 to the server 404 via the I/F 469, together with the identification information of the doorbell 406 (step S434). In the meantime, when there is voice data of a message and the like of the visitor, the control unit 461 transmits the voice data to the server 404 together with the image data.

Then, the control unit 442 of the server 404 transmits the data (for example, image data and voice data) received from the doorbell 406 to the information terminal 403 (step S435). The user of the information terminal 403 performs a predetermined response operation (for example, a call or an unlocking of an electric lock) for the data received from the control unit 442 of the server 404, via the user interface 432 (step S436).

Then, the control unit 442 of the server 404 determines whether a person in the image data captured by the camera 446 of the doorbell 406 and received from the doorbell 406 is already classified into a visitor category (step S437). For example, the control unit 442 compares the image data captured by the camera 466 of the doorbell 406 and the image data stored in the sub-folder corresponding to each visitor category of the visitor folder stored in the storage unit 440, and performs face recognition. When it is determined in step S437 that the person included in the image data is not classified into the visitor category (No in step S437), the control unit 442 stores the image data captured by the camera 446 of the doorbell 406 in the sub-folder "New" (step S438). When the predetermined response operation is over in step S436, the user of the information terminal 403 transmits a request signal requesting transmission of the image data stored in the sub-folder "New" to the control unit 442 of the server 404 (step S439). The control unit 442 of the server 404 transmits the image data stored in the sub-folder "New" to the information terminal 403, based on the image data transmission request signal from the information terminal 403 (step S440). In the meantime, the control unit 442 may transmit address information of the image data, not the image data.

The user of the information terminal 403 classifies/selects the image data received from the server 404 into the visitor category by the visitor category selection unit 439 of the user interface 432 (step S441), and transmits visitor category information to the server 304 (step S442). Then, the control unit 442 of the server 404 moves the image data stored in the sub-folder "New" to the sub-folder of the predetermined visitor category, based on the visitor category information received from the information terminal 403 (step S443). In the meantime, in a case where the visitor table is used instead of the visitor folder, the control unit 442 of the server 404 re-records the visitor category from "New" to a predetermined visitor category, based on the visitor category information received from the information terminal 403.

In the meantime, after the user of the information terminal 403 performs the predetermined response operation, the user classifies the image data into the predetermined visitor category. However, the present invention is not limited thereto. For example, the user of the information terminal 403 may classify/select the image data into a predetermined visitor category upon calling (before performing the predetermined response operation) and transmit the visitor category information to the server 404. In this case, instead of storing the image data in the sub-folder "New", the control unit 442 of the server 404 may store the image data in the sub-folder of the predetermined visitor category, based on the visitor category information received from the information terminal 403.

Also, in steps S439 and S440, the control unit 442 of the server 404 transmits the image data, based on the request signal from the information terminal 403. However, the image data stored in the sub-folder "New" may be transmitted to the information terminal 403 after a predetermined time period elapses, without a request signal from the information terminal 403.

Also, when it is determined in step S437 that the person included in the image data is classified into the visitor category (Yes in step S437), the control unit 442 of the server 404 may transmit the visitor category information of the image data to the doorbell 406. Thereby, the doorbell 406 can perform a predetermined operation, in response to the visitor category information.

Also, the control unit 442 of the server 404 transmits the data received from the doorbell 406 to the information terminal 403, in step S435, but may transmit the data received from the doorbell 406 to the information terminal 403, based on a result of the determination in step S437. For example, in a case where the visitor category is "Suspicious person", a response operation to the calling is not performed in the information terminal 403, so that it is possible to prevent a calling of a suspicious person.

Subsequently, operations of a suspicious person information sharing function that is executed by the doorbell system 400 are described.

First, the control unit 442 of the server 404 determines whether the image data stored in the sub-folder "Suspicious person" of the visitor folder of the plurality of doorbells 406-1 to 406-n installed in any predetermined range (predetermined region), which is stored in the storage unit 440, has been transmitted to the user of another doorbell 406. For example, the control unit 442 periodically checks the sub-folder "Suspicious person" of each doorbell 406, and determines whether the image data stored therein has been already transmitted to the information terminal 403 corresponding to another doorbell 406.

When it is determined that the image data stored in the sub-folder "Suspicious person" has not been transmitted to the information terminal 403 corresponding to another doorbell 406, the control unit 442 transmits suspicious person information including the image data to the information terminal 403 corresponding to another doorbell 406. Alternatively, when the user of the doorbell 406 registers the image data in the sub-folder "Suspicious person", the control unit 442 may transmit the suspicious person information including the image data to the information terminal 403 corresponding to another doorbell 406.

The user of the information terminal 403 having received the suspicious person information including the image data operates the visitor category selection unit 439 to classify/select the suspicious person information into a predetermined visitor category and transmits the classified visitor category information to the control unit 442 of the server 404, when registering/storing the received image data in the visitor folder of the information terminal of the user.

The control unit 442 of the server 404 stores, based on the visitor category information received from the information terminal 403, the image data in the sub-folder of the predetermined visitor category of the visitor folder of the doorbell 406 corresponding to the information terminal 403 of a transmission source. Thereby, the user of the doorbell 406 can check the suspicious person information classified as a suspicious person by the user of another doorbell 406, and can classify the image data into the visitor category, based on the user's determination criterion, as needed.

As described above, the doorbell system 400 of the fourth embodiment includes the plurality of doorbells 406 each of which is attached to each residence and includes the operation unit 462 and the camera 466, the plurality of information terminals 403 associated with the plurality of corresponding doorbells 406, and the server 404 having the storage unit 440 and capable of performing communication with the plurality of doorbells 406 and the plurality of information terminals 403. The control unit 442 of the server 404 is configured to receive the identification information of each of the doorbells 406 and the image data captured by the camera 466 from each of the plurality of doorbells 406, to receive the visitor category information of the image data captured by the camera 466 of each of the associated doorbells 406 from each of the plurality of information terminals 403, and to store the image data and the corresponding visitor category information in the storage unit 440 in association with the identification information of each of the doorbells 406.

Thereby, it is possible to provide the doorbell system 400 having a configuration capable of collectively managing the information associated with the plurality of doorbells 406 and contributing to improvement on local crime prevention by storing the image data captured by the camera 466 of each of the doorbells 406 and the visitor category information thereof in the storage unit 440 of the server 404.

In the third embodiment, when a visitor is detected by the person detection sensor 355 of the entrance slave unit 305, a resident is called. However, the present invention is not limited thereto. For example, when the image data detected by the person detection sensor 355 and captured by the camera 356 is received, the control unit 321 of the living room master unit 302 performs authentication (for example, face recognition) on the received image data, based on the image data and visitor information stored in in advance in the storage unit 328, and may call a resident only when the authentication is satisfied (after step S305 in FIG. 18). Also, the control unit 321 of the living room master unit 302 may be configured to transmit an authentication result including the visitor information to the server 304, together with the image data, and the control unit 342 of the server 304 may be configured to update the visitor folder stored in the storage unit 340 and to perform the determination in step S308, based on the authentication result received from the living room master unit 302. For example, in a case where the visitor information included in the authentication result received from the living room master unit 302 is "Family", the control unit 342 may store the image data in the sub-folder of which the visitor category is "Family", and determine in step S308 that the visitor category has been already classified (Yes in step S308).

Similarly, in the fourth embodiment, when a visitor is detected by the person detection sensor 465 of the doorbell 406, a resident is called. However, the present invention is not limited thereto. For example, when the image data detected by the person detection sensor 465 and captured by the camera 466 is received, the image processing unit 467 of the doorbell 406 performs authentication (for example, face recognition) on the received image data, based on the image data and visitor information stored in in advance, and may call a resident only when the authentication is satisfied (after step S324 in FIG. 23). Also, the image processing unit 467 of the doorbell 406 may be configured to transmit an authentication result including the visitor information to the server 404, together with the image data, and the control unit 442 of the server 404 may be configured to update the visitor folder stored in the storage unit 440 and to perform the determination in step S437, based on the authentication result received from the doorbell 406.

Hereinbelow, a fifth embodiment and a sixth embodiment are described with reference to the accompanying drawings. In the fifth embodiment and the sixth embodiment, the detailed descriptions of the same/similar elements and same/similar processes as/to the third and fourth embodiments are omitted.

Fifth Embodiment

Figure 24:
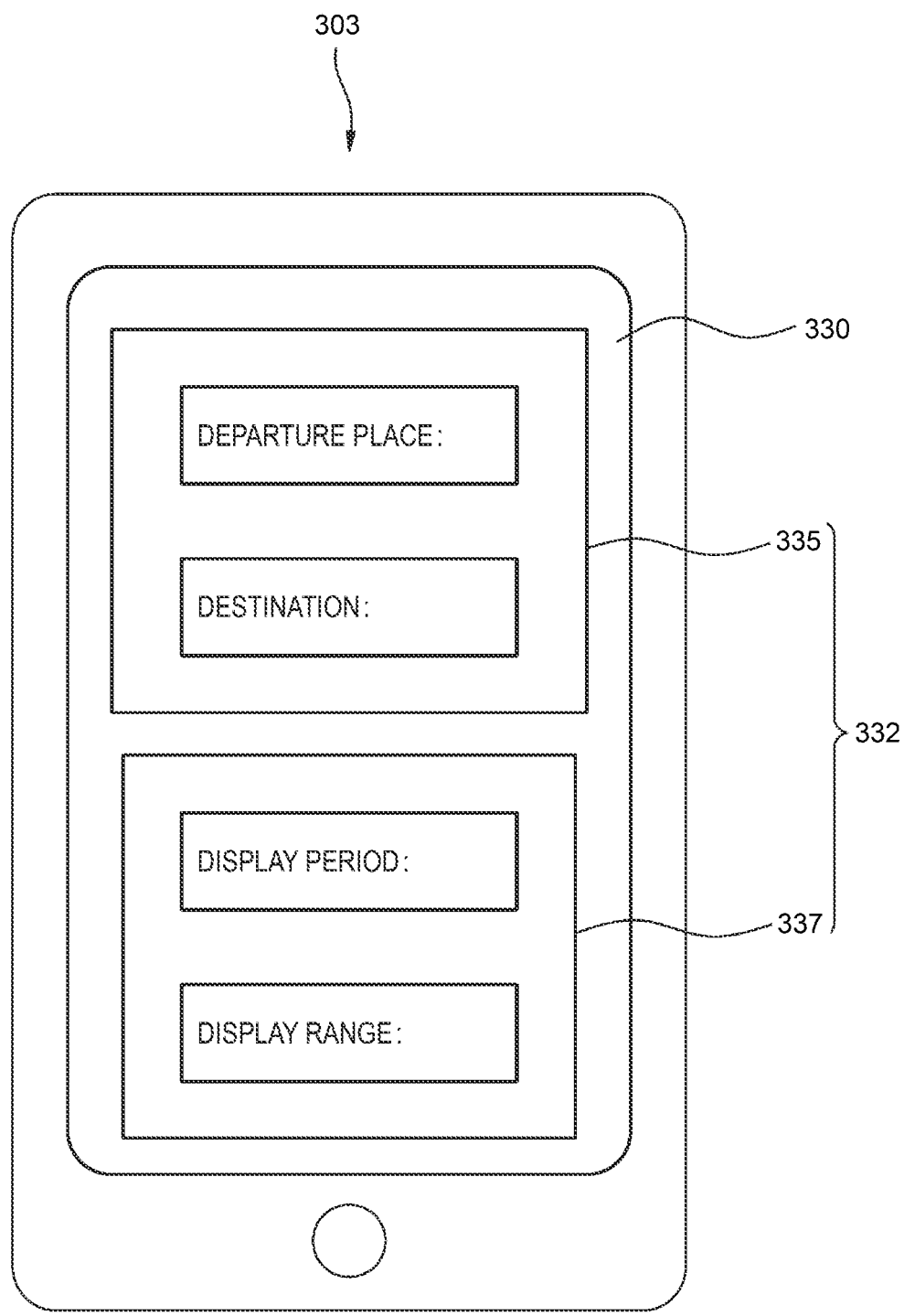
FIG. 24 depicts an example of a route search screen of an information terminal provided for the intercom system shown in FIG. 13.

As shown in FIG. 24, in the fifth embodiment, the user interface 332 of the information terminal 303 includes a route search setting unit 335 for causing the user to set route search conditions (information of a departure place and a destination). The user can input information of the setting conditions in each of predetermined columns of the route search setting unit 335 with characters or select desired conditions from a list of a plurality of candidates and input the information. Also, the user interface 332 includes a suspicious person information setting unit 337 for causing the user to set suspicious person information conditions (for example, a display period and a display range) that are to be displayed on a map together with a guide route from a departure place to a destination. The user can input information of the setting conditions in each of predetermined columns of the suspicious person information setting unit 337 with characters or select desired conditions from a list of a plurality of candidates and input the information. The information input via the user interface 332 is transmitted to the server 304. In the meantime, predetermined values may be set in advance in the columns of the display period and the display range, and when there is no input from the user, the preset predetermined values may be transmitted to the server 304.

Also, in the fifth embodiment, in the storage unit 340 of the server 304, an information table (an example of the suspicious person information) including the identification information of the entrance slave unit 305, the position information of the entrance slave unit 305, and a suspicious person corresponding time, for example, is stored (refer to FIG. 27). Also, in the storage unit 340, map information is stored. For example, the control unit 341 is configured to periodically acquire the map information from another server via the network, and to store and update the same in the storage unit 340.

The control unit 342 is configured to execute suspicious person determination processing by using data received from the entrance slave unit 305 via the living room master unit 302 and suspicious person determination data stored in the storage unit 340. When it is determined by suspicious person determination that a visitor included in the data received from the entrance slave unit 305 is a suspicious person, the control unit 342 updates the information table stored in the storage unit 340, based on the data received from the entrance slave unit 305.

Also, the control unit 342 is configured to search for a route based on the map information stored in the storage unit 340 and the user input information transmitted from the information terminal 303, and to calculate a guide route. Also, the control unit 342 is configured to extract/generate the suspicious person information (for example, information of a position and a time of a suspicious person when captured by the camera 356 of the entrance slave unit 305) associated with the information terminal 303 from the suspicious person information of the information table (FIG. 27) stored in the storage unit 340, based on the user input information transmitted from the information terminal 303.

Figure 25:
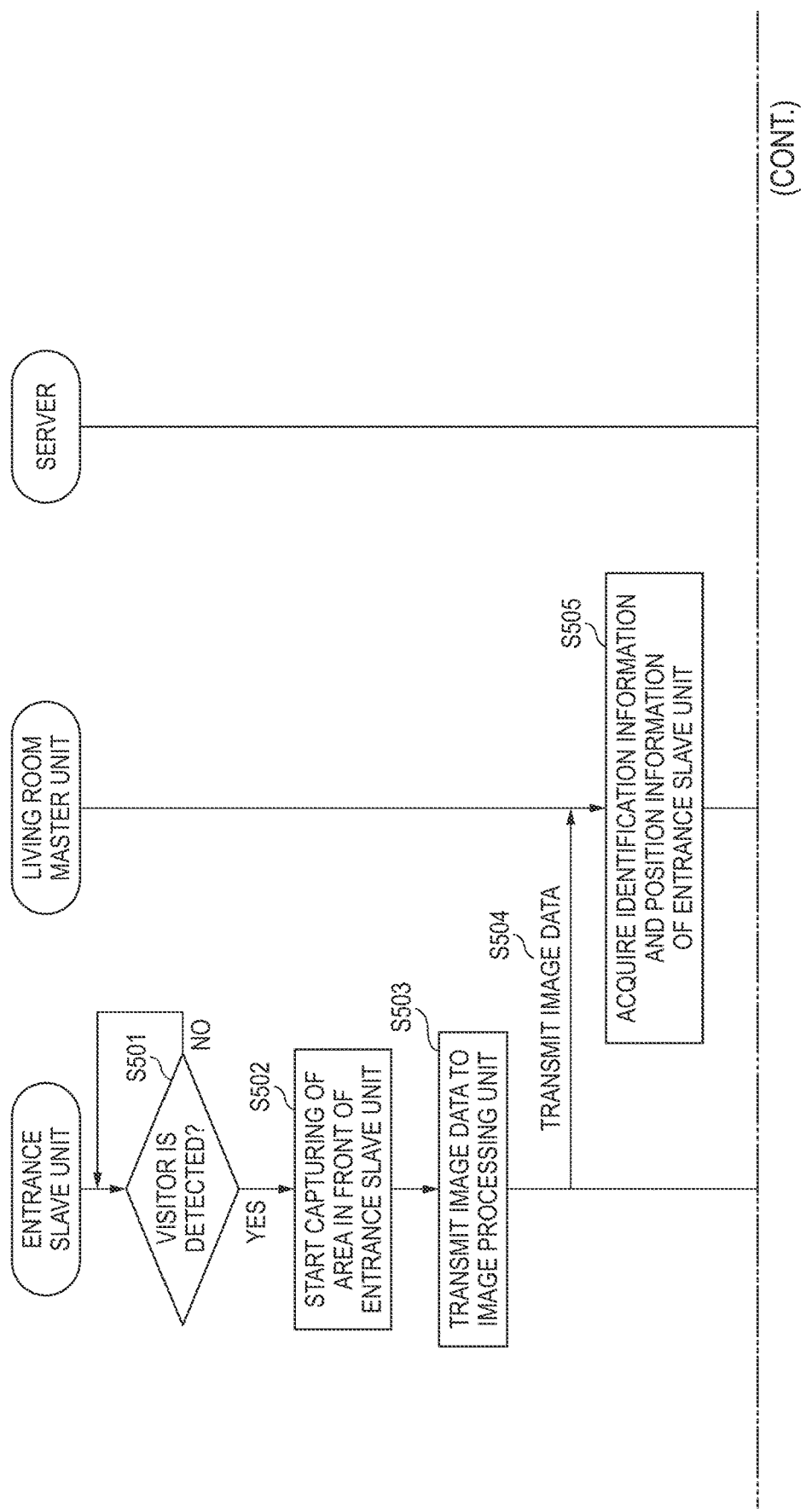
FIG. 25 is a flowchart for illustrating operations of a suspicious person information registering function that is executed by the intercom system shown in FIG. 13.
Figure 26:
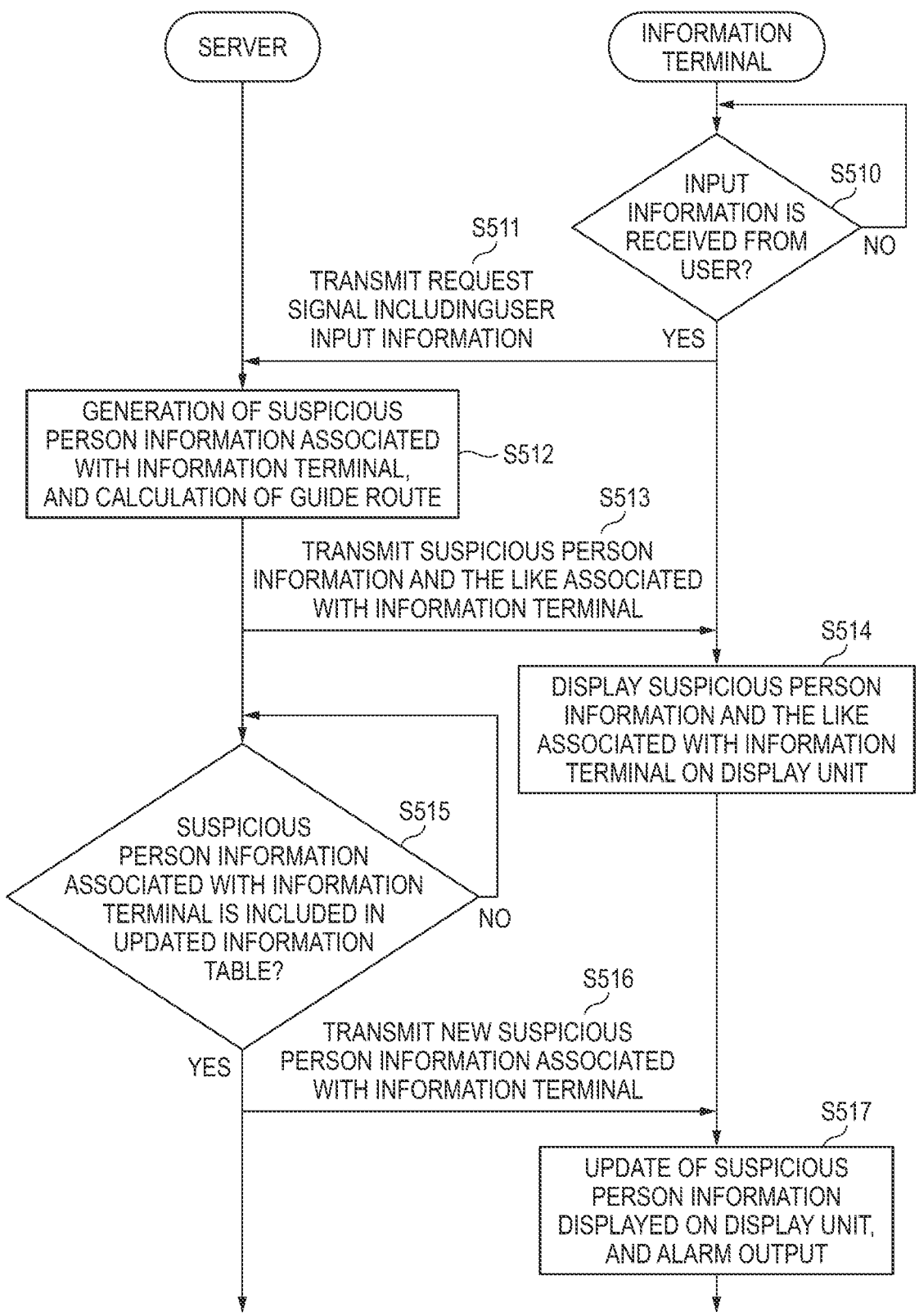
FIG. 26 is flowchart for illustrating operations of a suspicious person information display function that is executed by the intercom system shown in FIG. 13.

Subsequently, operations of a suspicious person information registering function that is executed by the intercom system 301 is described with reference to FIG. 25.

First, the control unit 351 of the entrance slave unit 305 determines whether a front person (a visitor or a passerby: hereinbelow, referred to as a visitor) is detected by the person detection sensor 355 (step S501). When it is determined in step S501 that a visitor is detected by the person detection sensor 355 (Yes in step S501), the control unit 351 starts capturing of an area (specifically, the visitor) in front of the entrance slave unit 305 by the camera 356 (step S502). Then, the camera 356 transmits the captured image data to the image processing unit 357 (step S503). Then, the control unit 351 transmits the image data received by the image processing unit 357 to the living room master unit 302 via the I/F 359 (step S504). In the meantime, in a case where the identification information and the position information are not registered in the storage unit 328 of the living room master unit 302 upon initial setting or update of the entrance slave unit 305, the control unit 351 may transmit the identification information and position information of the entrance slave unit 305 to the living room master unit 302, together with the image data.

The control unit 321 of the living room master unit 302 acquires the identification information and position information of the entrance slave unit 305 from the storage unit 328 (step S505), and transmits the image data received from the entrance slave unit 305 to the server 304 via the I/F 327 for server, together with the identification information and position information of the entrance slave unit 305 (step S506). On the other hand, in a case where the identification information and the position information are registered in the storage unit 340 of the server 304 upon initial setting or update of the entrance slave unit 305, the control unit 351 may transmit the image data and only the identification information of the entrance slave unit 305.

The control unit 342 of the server 304 compares the image data received from the entrance slave unit 305 via the living room master unit 302 with the suspicious person determination data stored in the storage unit 340, and determines whether the visitor included in the image data corresponds to a suspicious person (step S507). For example, face recognition is performed based on the image data of a suspicious person stored in the storage unit 340 and the image data of the visitor received from the entrance slave unit 305. When it is determined in step S507 that the visitor included in the image data corresponds to a suspicious person (Yes in step S507), the control unit 342 updates the information table stored in the storage unit 340, based on the identification information and position information of the entrance slave unit 305 and the image data (step S508). Specifically, the entrance slave unit identification information, the entrance slave unit position information and a suspicious person corresponding time are written in the information table of FIG. 27. In the meantime, in the information table, address information of the image data of a suspicious person stored in the storage unit 340 or the image data itself may be included. Alternatively, the latest image data of a suspicious person received from the entrance slave unit 305 may be stored in the storage unit 340, and address information of the latest image data or the image data itself may be included in the information table.

Subsequently, operations of a suspicious person information display function that is executed by the intercom system 301 is described with reference to FIGS. 24 and 26 to 28.

The user who wants to search for a route to a destination activates the predetermined application software via the user interface 332 displayed on the display unit 330 of the information terminal 303, and inputs predetermined information (step S510). For example, the user inputs a departure place (for example, a current position), a destination, a display setting (a display period, a display range and the like) of suspicious person information in the route search setting unit 335 and the suspicious person information setting unit 337. The display period is to set a period up to a past time from a current time in which the acquired suspicious person information is displayed. For example, when the user sets "up to 2 hours ago", only the latest information up to 2 hours ago from a current time can be displayed. The display range is to set a distance range from a departure place (for example, a current position) in which the acquired suspicious person information is displayed. For example, when the user sets a departure place to "current position" and a display range to "radius 500 M", only the suspicious person information in an appropriate range from a current position to a radius 500 meters can be displayed. In this way, by performing the display setting of the suspicious person information, the user can perceive the suspicious person information in a predetermined time within a predetermined range including a guide route, and also perceive accurately only the necessary suspicious person information.

When the user input information is received (Yes in step S510), the information terminal 303 transmits a request signal including current position information and input information (a departure place, a destination, information of the display setting of the suspicious person information, and the like) from the user to the server 304 via the network N (step S511). The control unit 342 of the server 304 having received the request signal from the information terminal 303 generates, based on the information (a current position, a departure place, a destination, information of the display setting of the suspicious person information, and the like) included in the request signal and the information table stored in the storage unit 340, suspicious person information (suspicious person information associated with the information terminal 303) about a corresponding suspicious person (step S512). The corresponding suspicious person means a suspicious person satisfying conditions of a suspicious person input by the user. For example, in the above example ("a current position", "up to 2 hours ago" and "radius 500 M"), the corresponding suspicious person is a suspicious person who is captured from a current time up to 2 hours ago by the entrance slave unit 305 located in a range from a current position to a radius 500 meters and determined as a suspicious person. In the suspicious person information about the corresponding suspicious person, information about a position (entrance slave unit position information) of a suspicious person and a time (suspicious person corresponding time) at the time when the corresponding suspicious person was captured by the camera 356 of the entrance slave unit 305 is included.

Also, the control unit 342 of the server 304 calculates a guide route, based on the input information (a departure place, a destination, and the like) included in the request signal from the information terminal 303 (step S512), and transmits the calculated guide route information, the map information stored in the storage unit 340 and the suspicious person information associated with the information terminal 303 to the information terminal 303 that is a transmission source of the request signal (step S513). In the meantime, the guide route may be the shortest route from a departure place to a destination or a route that avoids a suspicious person, based on the suspicious person information. For example, when there is a lot of suspicious person information near the shortest route, the control unit 342 may set another route with less suspicious person information, as the guide route.

Figure 28:
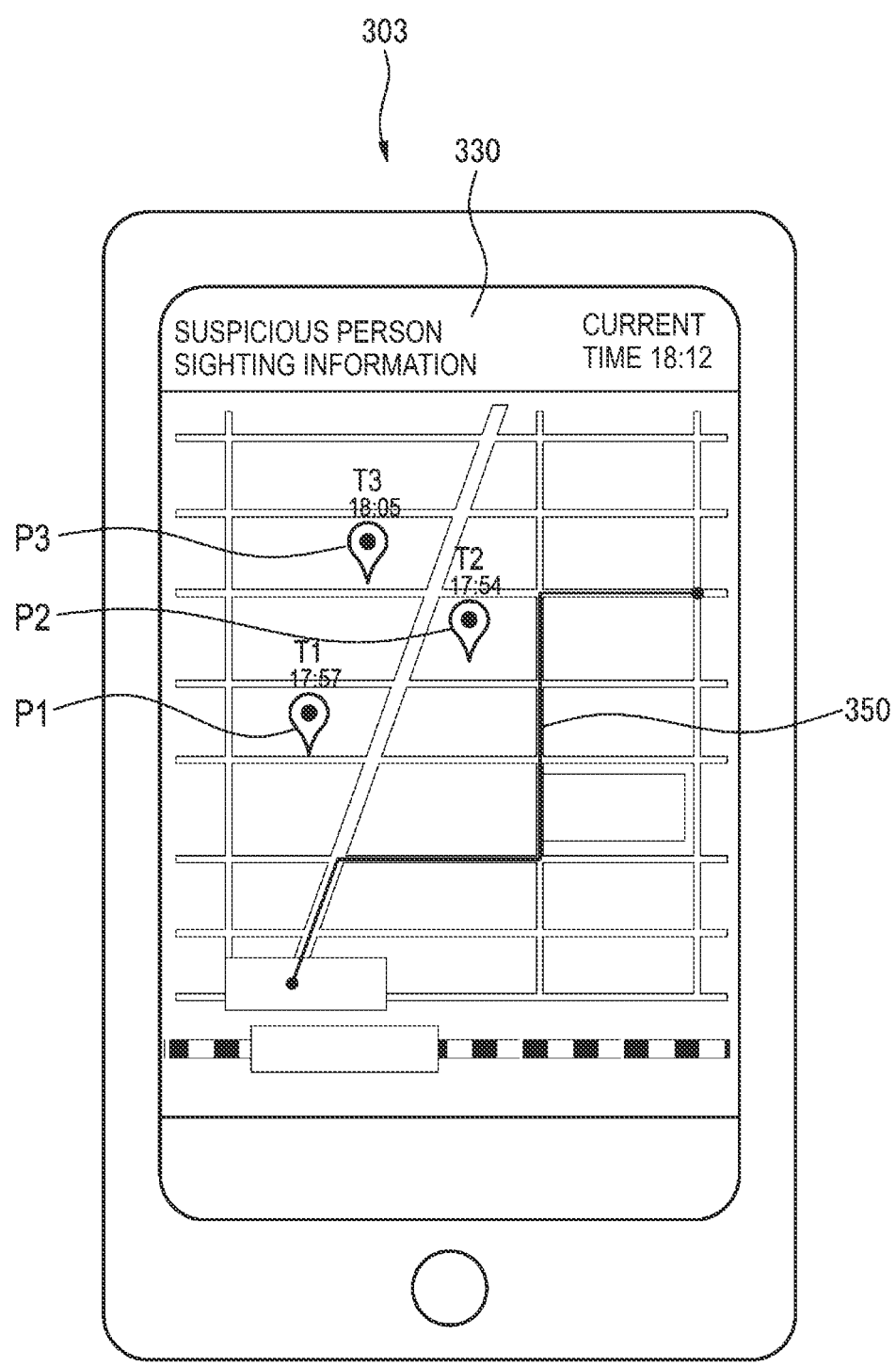
FIG. 28 depicts an example of a route search result screen of the information terminal on which the suspicious person information is displayed.

Then, the information terminal 303 having received the guide route information, the map information and the suspicious person information associated with the information terminal 303 from the control unit 342 of the server 304 displays the received information on the display unit 330 (step S514). As shown in FIG. 28, on the display unit 330, a map on which a guide route 350, positions P1 to P3 of a suspicious person from a predetermined past time to a current time and corresponding times T1 to T3 are superimposed is displayed. When a route search ending operation is input from the user, the information terminal 303 ends the display of the route search result screen shown in FIG. 28, and transmits a stop signal to the server 304.

When updating the information table stored in the storage unit 340 until the stop signal is received from the information terminal 303, the control unit 342 of the server 304 determines whether the suspicious person information associated with the information terminal 303 is included in the updated information (step S515). When it is determined in step S515 that the suspicious person information associated with the information terminal 303 is included in the updated information (Yes in step S515), the control unit 342 of the server 304 transmits new suspicious person information associated with the information terminal 303 to the information terminal 303 (step S516).

The information terminal 303 having received the new suspicious person information from the control unit 342 of the server 304 updates/displays the suspicious person information displayed on the display unit 330 (step S517). Thereby, the user of the information terminal 303 can perceive the latest suspicious person information in real time. Also, when it is determined that a suspicious person is approaching the guide route 350 or the information terminal 303 (a position of the user), based on the newly received suspicious person information, the information terminal 303 outputs an alarm from a speaker (not shown) (step S517).

As described above, the intercom system 301 of the fifth embodiment includes the plurality of entrance slave units 305-1 to 305-*n* each of which is attached to each residence and includes the operation unit 352 and the camera 356, the plurality of living room master units 302-1 to 302-*n* each of which is configured to perform communication with the corresponding entrance slave unit 305, the server 304 (control unit 342) capable of performing communication with the plurality of living room master units 302-1 to 302-*n*, and the information terminal 303 having the display unit 330 and configured to perform communication with the control unit and to transmit the request signal including the user input information to the server 340. The server 304 is configured to receive the identification information of each of the entrance slave units 305-1 to 305-*n* and the image data captured by the camera 356 via each of the plurality of living room master units 302-1 to 302-*n*, to generate the suspicious person information (information table) about a suspicious person, based on the identification information and the image data, and to transmit, to the information terminal 303, the suspicious person information associated with the information terminal 303 of the suspicious person information generated based on the user input information included in the request signal from the information terminal 303. The information terminal 303 is configured to display the information of the guide route set based on the user input information, the suspicious person information, and the map information on the display unit 330.

In this way, it is possible to provide the intercom system 301 having a configuration capable of contributing to improvement on local crime prevention by generating the suspicious person information, based on the identification information and the image data from the plurality of entrance slave units 305 each of which is attached to each residence and notifying the user of the suspicious person information associated with the information terminal 303. Also, the suspicious person information is displayed together with the map and guide route displayed on the display unit 330 of the information terminal 303, so that the user can easily perceive the suspicious person information near the guide route.

Sixth Embodiment

In the sixth embodiment, the detailed descriptions of the same elements and processes as the fifth embodiment are omitted. In particular, since the configurations of the information terminal 403 and the server 404 and the operations of the suspicious person information display function are the same as the configurations of the information terminal 303 and the server 304 of the fifth embodiment, the detailed descriptions thereof are omitted.

The operations of the suspicious person information registering function that is executed by the doorbell system 400 are described with reference to FIG. 29.

First, the control unit 461 of the doorbell 406 determines whether a front person (a visitor or a passerby: hereinbelow, referred to as a visitor) is detected by the person detection sensor 465 (step S621). When it is determined in step S621 that a visitor is detected by the person detection sensor 465 (Yes in step S621), the control unit 461 starts capturing of an area (specifically, the visitor) in front of the doorbell 406 by the camera 466 (step S622). Then, the camera 466 transmits the captured image data to the image processing unit 467 (step S623). Then, the control unit 461 transmits the image data received by the image processing unit 467 to the server 404 via the I/F 469, together with the identification information of the doorbell 406 and position information acquired by the position information acquisition unit 468 of the doorbell 406 (step S624). In the meantime, in a case where the identification information and the position information of the doorbell 406 are registered in the storage unit 442 of the server 404 upon initial setting or update of the doorbell 406, the control unit 461 may transmit the image data and only the identification information of the doorbell 406.

The control unit 442 of the server 404 compares the image data received from the doorbell 406 with the suspicious person determination data stored in the storage unit 440, and determines whether the visitor included in the image data corresponds to a suspicious person (step S625). For example, face recognition is performed based on the image data of a suspicious person stored in the storage unit 440 and the image data of the visitor received from the doorbell 406. When it is determined in step S625 that the visitor included in the image data corresponds to a suspicious person (Yes in step S625), the control unit 442 updates the information table stored in the storage unit 440, based on the identification information and position information of the doorbell 406 and the image data (step S626). Specifically, the doorbell identification information, the doorbell position information and a suspicious person corresponding time are written in the information table of FIG. 5. In the meantime, in the information table, address information of the image data of a suspicious person stored in the storage unit 440 or the image data itself may be included. Alternatively, the latest image data of a suspicious person received from the doorbell 406 may be stored in the storage unit 440, and address information of the latest image data or the image data itself may be included in the information table.

The operations of the suspicious person information display function that is executed by the doorbell system 400 are similar to the operations of the suspicious person information display function that is executed by the intercom system 301 shown in FIGS. 24 and 26 to 28. The control unit 442 of the server 404 calculates a guide route, based on the user input information (a departure place, a destination, and the like) included in the request signal from the information terminal 403, and transmits the calculated guide route information, the map information stored in the storage unit 440 and the suspicious person information associated with the information terminal 403 to the information terminal 403 that is a transmission source of the request signal. The information terminal 403 displays, on the display unit 430, the information received from the control unit 442 of the server 404.

As described above, the doorbell system 400 of the sixth embodiment includes the plurality of doorbells 406-1 to 406-*n* each of which is attached to each residence and includes the operation unit 462 and the camera 466, the server 404 (the control unit 442) capable of performing communication with the plurality of doorbells 406-1 to 406-*n*, and the information terminal 403 having the display unit 430 and configured to perform communication with the server 404 and to transmit the request signal including the user input information to the server 404. The server 404 is configured to acquire the identification information of each of the plurality of doorbells 406-1 to 406-*n* and the image data captured by the camera 466, to generate the suspicious person information about a suspicious person, based on the identification information and the image data, and to transmit, to the information terminal 403, the suspicious person information associated with the information terminal 403 of the suspicious person information generated based on the user input information included in the request signal from the information terminal 403. The information terminal 403 displays, on the display unit 430, the information of the guide route 350 set based on the input information from the user, the suspicious person information, and the map information.

In this way, it is possible to provide the doorbell system 400 having a configuration capable of contributing to improvement on local crime prevention by generating the suspicious person information, based on the identification information and image data from each of the plurality of doorbells 406-1 to 406-*n* each of which is attached to each residence and notifying the user of the suspicious person information associated with the information terminal 403. Also, the suspicious person information is displayed together with the map and guide route displayed on the display unit 430 of the information terminal 403, so that the user can easily perceive the suspicious person information near the guide route.

In the fifth embodiment and the sixth embodiment, when a visitor is detected by the person detection sensor 355 of the entrance slave unit 305 or the person detection sensor 465 of the doorbell 406, it is determined whether the visitor corresponds to a suspicious person. However, the present invention is not limited thereto. For example, when the operation unit 351 of the entrance slave unit 305 or the operation unit 462 of the doorbell 406 is pressed by a visitor, it may be determined whether the visitor corresponds to a suspicious person.

Also, in the fifth embodiment and the sixth embodiment, the image data of a suspicious person that is used as the suspicious person determination data is the image data that is registered as a suspicious person by the user of the camera 356 of the entrance slave unit 305 or the camera 466 of the doorbell 406 having captured the image data with the living room master unit 302 or the information terminal 303. However, the present invention is not limited thereto. For example, for the registered image data of a suspicious person, image data of a suspicious person who has a high percentage (for example, 60% or higher) of being determined or registered as a suspicious person by a user of another entrance slave unit 305-1 to 305-*n* or doorbell 406-1 to 406-*n* different from the user having performed the registration may be used as the suspicious person determination data.

Also, in the fifth embodiment and the sixth embodiment, the suspicious person information associated with the information terminal 303 includes the information about a position and a time of a suspicious person. However, the present invention is not limited thereto. As described above, in a case where the information table includes the address information of the image data of a suspicious person or the image data itself, the image data of a suspicious person may be included in the suspicious person information associated with the information terminal 303. For example, when a cursor is placed on marks of the positions P1 to P3 of a suspicious person superimposed on the map displayed on the display unit 330, the image data of the suspicious person may be displayed. In the meantime, the image data is subjected to predetermined image processing, as needed, and is then displayed, from a standpoint of privacy.

Also, in the fifth embodiment and the sixth embodiment, the storage unit 340 of the server 340 stores the map information, and the control unit 342 of the server 340 calculates the guide route, based on the user input information (a departure place, a destination and the like), and transmits the calculated guide route information, the map information stored in the storage unit 340 and the suspicious person information to the information terminal 303. However, the present invention is not limited thereto. For example, the information terminal 303 may receive the map information and the guide route information from a server different from the server 340 via the network, and display the same on the display unit 330, together with the suspicious person information received from the server 340. Alternatively, the information terminal 303 may store the map information in advance (which may be periodically received/updated from another server via the network), calculate the guide route based on the user input information and the like, and display, on the display unit 330, the calculated guide route information and the map information, together with the suspicious person information received from the server 340.

Also, in the fifth embodiment and the sixth embodiment, the information terminal 303 determines that a suspicious person is approaching the guide route 350 or the information terminal 303 (user), based on the suspicious person information that is received in real time. However, the present invention is not limited thereto. For example, the control unit 341 of the server 304 may determine whether a suspicious person is approaching the guide route 350 or the information terminal 303, based on the suspicious person information associated with the information terminal 303 that is updated in real time, and transmit a result of the determination to the information terminal 303, together with the new suspicious person information, in step S516.

In the meantime, the present invention is not limited to the above embodiments, and can be appropriately changed and modified. In addition, the materials, shapes, sizes, values, forms, numbers, arrangement places and the like of the constitutional elements in the above embodiments are arbitrary and are not particularly limited inasmuch as the present invention can be achieved.

The subject application is based on Japanese Patent Application Nos. 2018-029976, 2018-029977, 2018-029978, and 2018-029979 filed on Feb. 22, 2018, the contents of which are incorporated as appropriate.

The invention claimed is:

1. An intercom system comprising:
a plurality of entrance slave units each of which is attached to each residence and comprises an operation unit and a camera;
a plurality of living room master units each of which comprises a first one or more memories and a first one or more processors, each of the plurality of living room master units is configured to perform communication with the corresponding entrance slave unit;
a control unit having a second one or more memories configured to store a program and a second one or more processors capable of performing communication with the plurality of living room master units; and
an external device having a display unit, and configured to perform communication with the control unit and to transmit a request signal comprising user input information to the control unit,
wherein the second one or more processors of the control unit are configured to execute the program to:
acquire identification information of each of the plurality of entrance slave units and image data captured by the camera via each of the plurality of living room master units,
generate suspicious person information about a suspicious person, based on the identification information and the image data, and
transmit, to the external device, the suspicious person information associated with the external device among the generated suspicious person information, based on the user input information included in the request signal from the external device, and
wherein the external device is configured to display, on the display unit, information of a guide route set based on the user input information, the suspicious person information, and map information.

2. The intercom system according to claim 1,
wherein the suspicious person information associated with the external device is the suspicious person information generated based on the identification information and the image data acquired from an entrance slave unit existing in a predetermined region comprising the guide route.

3. The intercom system according to claim 1,
wherein the suspicious person information associated with the external device comprises a position and a time up to a predetermined past time from a current time of the suspicious person.

4. The intercom system according to claim 1,
wherein the guide route is set based on input information from the user and the suspicious person information.

5. The intercom system according to claim 1
wherein when the second one or more processors of the control unit newly generates suspicious person information associated with the external device until a stop signal is received from the external device, the second one or more processors of the control unit is configured to transmit the newly generated suspicious person information to the external device.

6. The intercom system according to claim 5,
wherein when the external device or the second one or more processors of the control unit determines that a suspicious person is approaching the guide route or the external device, based on the suspicious person information, the external device outputs an alarm.

* * * * *